US012651783B2

(12) United States Patent
Jung et al.

(10) Patent No.: US 12,651,783 B2
(45) Date of Patent: Jun. 9, 2026

(54) BATTERY PACK AND VEHICLE INCLUDING THE SAME

(71) Applicant: LG ENERGY SOLUTION, LTD., Seoul (KR)

(72) Inventors: In-Hyuk Jung, Daejeon (KR); Jin-Oh Yang, Daejeon (KR); Kwang-Keun Oh, Daejeon (KR); Hae-Won Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 742 days.

(21) Appl. No.: 17/944,452

(22) Filed: Sep. 14, 2022

(65) Prior Publication Data

US 2023/0111495 A1     Apr. 13, 2023

(30) Foreign Application Priority Data

Oct. 12, 2021   (KR) ........................ 10-2021-0135353
Aug. 12, 2022   (KR) ........................ 10-2022-0101127

(51) Int. Cl.
 H01M 10/613 (2014.01)
 H01M 10/655 (2014.01)
   (Continued)

(52) U.S. Cl.
 CPC ....... H01M 10/613 (2015.04); H01M 10/655 (2015.04); H01M 50/213 (2021.01);
   (Continued)

(58) Field of Classification Search
 CPC ... H01M 10/613; H01M 10/655; H01M 50/22
 See application file for complete search history.

(56) References Cited

U.S. PATENT DOCUMENTS

2002/0022178 A1 2/2002 Asaka et al.
2003/0017383 A1 1/2003 Ura et al.
   (Continued)

FOREIGN PATENT DOCUMENTS

CN  101483227 A 7/2009
CN  204029910 U 12/2014
   (Continued)

OTHER PUBLICATIONS

U.S. Office Action for U.S. Appl. No. 17/944,431, dated Nov. 24, 2023.
   (Continued)

*Primary Examiner* — Olatunji A Godo
(74) *Attorney, Agent, or Firm* — Birch, Stewart, Kolasch & Birch, LLP

(57) ABSTRACT

Disclosed is a battery pack including plurality of battery cells; a bus bar assembly having a first side and a second side, the second side of the bus bar assembly provided to a first side of the plurality of battery cells and electrically connected to the plurality of battery cells; a cooling unit disposed at the second side of the bus bar assembly and arranged between the plurality of battery cells along a longitudinal direction of the battery pack; and a side structure unit configured to accommodate the cooling unit and the plurality of battery cells and configured to form a first section of an outer surface of the battery pack.

23 Claims, 39 Drawing Sheets

(51) Int. Cl.
  *H01M 50/213* (2021.01)
  *H01M 50/22* (2021.01)
  *H01M 50/505* (2021.01)

(52) U.S. Cl.
  CPC ......... *H01M 50/22* (2021.01); *H01M 50/505*
  (2021.01); *H01M 2220/20* (2013.01)

(56) References Cited

U.S. PATENT DOCUMENTS

| | | |
|---|---|---|
| 2007/0259258 A1 | 11/2007 | Buck |
| 2008/0311468 A1 | 12/2008 | Hermann et al. |
| 2009/0181288 A1 | 7/2009 | Sato |
| 2009/0208836 A1 | 8/2009 | Fuhr et al. |
| 2009/0214940 A1 | 8/2009 | Haussmann |
| 2009/0301700 A1 | 12/2009 | German et al. |
| 2010/0116570 A1 | 5/2010 | Sugawara et al. |
| 2011/0091759 A1 | 4/2011 | Song |
| 2011/0293986 A1 | 12/2011 | Kozu |
| 2012/0177970 A1 | 7/2012 | Marchio et al. |
| 2012/0244397 A1 | 9/2012 | TenHouten et al. |
| 2013/0136970 A1 | 5/2013 | Kurokawa et al. |
| 2013/0143101 A1 | 6/2013 | Nakagawa et al. |
| 2013/0202928 A1 | 8/2013 | Beulque et al. |
| 2013/0230760 A1 | 9/2013 | Pan et al. |
| 2014/0017531 A1 | 1/2014 | Uehara et al. |
| 2014/0054629 A1 | 2/2014 | Kim |
| 2014/0212695 A1 | 7/2014 | Lane et al. |
| 2014/0255748 A1 | 9/2014 | Jan et al. |
| 2015/0050532 A1 | 2/2015 | Waigel et al. |
| 2015/0099146 A1 | 4/2015 | Kim et al. |
| 2015/0118530 A1 | 4/2015 | Lee |
| 2015/0140388 A1 | 5/2015 | Harada et al. |
| 2016/0133890 A1 | 5/2016 | Lee et al. |
| 2016/0172727 A1 | 6/2016 | Chan et al. |
| 2016/0359210 A1 | 12/2016 | Hasegawa |
| 2017/0047572 A1 | 2/2017 | Biskup et al. |
| 2017/0125755 A1 | 5/2017 | Kim et al. |
| 2017/0162922 A1 | 6/2017 | Sumpf, Jr. et al. |
| 2017/0324128 A1 | 11/2017 | Milton et al. |
| 2018/0069212 A1* | 3/2018 | Mastrandrea ....... H01M 50/262 |
| 2018/0130992 A1 | 5/2018 | Xu et al. |
| 2018/0212222 A1 | 7/2018 | Barton et al. |
| 2018/0223070 A1 | 8/2018 | O'Neil et al. |
| 2018/0277817 A1 | 9/2018 | Mastrandrea et al. |
| 2018/0366701 A1* | 12/2018 | Morimitsu ........ H01M 10/0422 |
| 2019/0001838 A1 | 1/2019 | Choi et al. |
| 2019/0044123 A1 | 2/2019 | Nishimura et al. |
| 2019/0119021 A1 | 4/2019 | Baker et al. |
| 2019/0148681 A1 | 5/2019 | Park et al. |
| 2019/0198952 A1 | 6/2019 | Choi et al. |
| 2019/0296321 A1 | 9/2019 | Newman et al. |
| 2019/0348661 A1 | 11/2019 | Bae |
| 2019/0389318 A1 | 12/2019 | Lee et al. |
| 2020/0036062 A1 | 1/2020 | Hirsch et al. |
| 2020/0076022 A1 | 3/2020 | Kawakami et al. |
| 2020/0127249 A1 | 4/2020 | Yoon et al. |
| 2020/0176836 A1 | 6/2020 | Hwang et al. |
| 2020/0259152 A1* | 8/2020 | Lee ...................... H01M 50/50 |
| 2020/0259155 A1 | 8/2020 | Lee et al. |
| 2020/0274117 A1 | 8/2020 | Kang et al. |
| 2020/0321589 A1 | 10/2020 | Watahiki et al. |
| 2020/0350644 A1 | 11/2020 | Cho et al. |
| 2020/0395587 A1 | 12/2020 | Ryu et al. |
| 2021/0074965 A1 | 3/2021 | Kwag |
| 2021/0159567 A1 | 5/2021 | Pires et al. |
| 2021/0167343 A1 | 6/2021 | Kwag |
| 2021/0167347 A1 | 6/2021 | Kwag |
| 2021/0257704 A1 | 8/2021 | Sawada et al. |
| 2021/0273298 A1 | 9/2021 | Babinot et al. |
| 2021/0384569 A1 | 12/2021 | Lee et al. |
| 2022/0081529 A1 | 3/2022 | O'Neil et al. |
| 2022/0255145 A1 | 8/2022 | Lee et al. |
| 2022/0263159 A1 | 8/2022 | Flannery |
| 2022/0263201 A1 | 8/2022 | Wang et al. |
| 2022/0285761 A1 | 9/2022 | Fang et al. |
| 2022/0294059 A1 | 9/2022 | Gu et al. |
| 2023/0111495 A1 | 4/2023 | Jung et al. |
| 2023/0113374 A1 | 4/2023 | Oh et al. |
| 2023/0113884 A1* | 4/2023 | Yang .................. H01M 50/528 |
| | | 429/120 |
| 2023/0113945 A1 | 4/2023 | Jung et al. |
| 2023/0155205 A1 | 5/2023 | Flannery |
| 2024/0128604 A1 | 4/2024 | Zhu et al. |
| 2024/0322350 A1 | 9/2024 | Muratsu et al. |
| 2024/0347810 A1 | 10/2024 | Oh et al. |
| 2025/0316785 A1 | 10/2025 | Yang et al. |
| 2025/0385391 A1 | 12/2025 | Jung et al. |
| 2026/0045646 A1 | 2/2026 | Yoon et al. |

FOREIGN PATENT DOCUMENTS

| | | |
|---|---|---|
| CN | 205900676 U | 1/2017 |
| CN | 206505995 U | 9/2017 |
| CN | 208111627 U | 11/2018 |
| CN | 109103405 A | 12/2018 |
| CN | 105977578 B | 1/2019 |
| CN | 109390505 A | 2/2019 |
| CN | 208873849 U | 5/2019 |
| CN | 111164795 A | 5/2020 |
| CN | 217522193 U | 9/2022 |
| EP | 2 600 436 A1 | 6/2013 |
| EP | 3 637 494 A1 | 4/2020 |
| EP | 3 675 212 A1 | 7/2020 |
| GB | 2549512 A | 10/2017 |
| JP | 3-190052 A | 8/1991 |
| JP | 2006-73331 A | 3/2006 |
| JP | 3919257 B2 | 5/2007 |
| JP | 2008-251471 A | 10/2008 |
| JP | 2008-311130 A | 12/2008 |
| JP | 2009-123371 A | 6/2009 |
| JP | 2009-134937 A | 6/2009 |
| JP | 2009-522535 A | 6/2009 |
| JP | 2009-193961 A | 8/2009 |
| JP | 2010-113999 A | 5/2010 |
| JP | 2010-528406 A | 8/2010 |
| JP | 4733248 B2 | 7/2011 |
| JP | 2012-9388 A | 1/2012 |
| JP | 2012-28244 A | 2/2012 |
| JP | 5173227 B2 | 4/2013 |
| JP | 2013-105545 A | 5/2013 |
| JP | 2013-196932 A | 9/2013 |
| JP | 2014-42011 A | 3/2014 |
| JP | 5816877 B2 | 11/2015 |
| JP | 5893133 B2 | 3/2016 |
| JP | 2016-66624 A | 4/2016 |
| JP | 2016-516273 A | 6/2016 |
| JP | 2018-18661 A | 2/2018 |
| JP | 2018-533161 A | 11/2018 |
| JP | 2018-195403 A | 12/2018 |
| JP | 2019-519883 A | 7/2019 |
| JP | 2020-95778 A | 6/2020 |
| JP | 2021-136238 A | 9/2021 |
| JP | 2022-135559 A | 9/2022 |
| KR | 10-2010-0134111 A | 12/2010 |
| KR | 10-1093695 B1 | 12/2011 |
| KR | 10-2013-0126159 A | 11/2013 |
| KR | 10-2013-0133160 A | 12/2013 |
| KR | 10-2015-0015169 A | 2/2015 |
| KR | 10-2015-0048501 A | 5/2015 |
| KR | 10-2016-0142171 A | 12/2016 |
| KR | 10-2017-0022460 A | 3/2017 |
| KR | 10-1870251 B1 | 6/2018 |
| KR | 10-2019-0006984 A | 1/2019 |
| KR | 10-1977454 B1 | 5/2019 |
| KR | 10-2019-0078521 A | 7/2019 |
| KR | 10-2019-0097231 A | 8/2019 |
| KR | 10-2019-0106541 A | 9/2019 |
| KR | 10-2018-0112487 A | 10/2019 |
| KR | 10-2019-0132631 A | 11/2019 |
| KR | 10-2020-0012547 A | 2/2020 |
| KR | 10-2020-0048207 A | 5/2020 |
| KR | 10-2020-0065192 A | 6/2020 |
| KR | 10-2020-0084402 A | 7/2020 |
| KR | 10-2020-0097511 A | 8/2020 |

(56)  References Cited

FOREIGN PATENT DOCUMENTS

| KR | 10-2021-0019891 A | 2/2021 |
|----|----|----|
| KR | 10-2021-0061829 A | 5/2021 |
| KR | 10-2021-0067636 A | 6/2021 |
| KR | 10-2021-0067756 A | 6/2021 |
| KR | 10-2021-0080256 A | 6/2021 |
| KR | 10-2021-0092756 A | 7/2021 |
| KR | 10-2021-0108127 A | 9/2021 |
| WO | WO 2009/154855 A2 | 12/2009 |
| WO | WO 2011/149075 A1 | 12/2011 |
| WO | WO 2015/155919 A1 | 10/2015 |
| WO | WO 2017/110036 A1 | 6/2017 |
| WO | WO 2017/196801 A1 | 11/2017 |
| WO | WO 2018/124494 A2 | 7/2018 |
| WO | WO 2018/221004 A1 | 12/2018 |
| WO | WO 2019/058938 A1 | 3/2019 |
| WO | WO 2019/132291 A1 | 7/2019 |
| WO | WO 2019/244392 A1 | 12/2019 |
| WO | WO 2020/071394 A1 | 4/2020 |
| WO | WO 2020/094365 A1 | 5/2020 |
| WO | WO 2021/074571 A1 | 4/2021 |
| WO | WO 2021/102340 A1 | 5/2021 |
| WO | WO 2024/144159 A1 | 7/2024 |

OTHER PUBLICATIONS

U.S. Office Action for U.S. Appl. No. 17/944,768, dated May 13, 2025.

Xue et al., "Improvement in thermal conductivity of through-plane aligned boron nitride/silicone rubber composites," Materials and Design 165, Jan. 3, 2019, pp. 1-8.

U.S. Office Action for U.S. Appl. No. 17/844,431, dated Apr. 4, 2024.

U.S. Office Action for U.S. Appl. No. 17/944,846, dated May 19, 2025.

European Communication pursuant to Article 94(3) EPC for European Application No. 22 767 579.0, dated Jul. 21, 2025.

U.S. Office Action for U.S. Appl. No. 18/018,812, dated Jul. 24, 2025.

Extended European Search Report for European Application No. 22881266.5, dated Feb. 3, 2025.

Korean Notice of Allowance dated May 31, 2024 for Application No. 10-2022-0101127 with English translation.

Korean Office Action dated Nov. 20, 2023 for Application No. 10-2022-0101127 with English translation.

U.S. Office Action for U.S. Appl. No. 17/944,431, dated Sep. 30, 2024.

U.S. Office Action for U.S. Appl. No. 17/944,768, dated Nov. 24, 2025.

U.S. Office Action for U.S. Appl. No. 17/944,846, dated Jan. 16, 2026.

U.S. Office Action for U.S. Appl. No. 17/944,672, dated Feb. 20, 2026.

U.S. Office Action for U.S. Appl. No. 17/944,768, dated Feb. 13, 2026.

Indian Office Action and Search Report for Indian Application No. 202417011796, dated Mar. 25, 2026, with English translation.

* cited by examiner

BATTERY PACK AND VEHICLE INCLUDING THE SAME

CROSS-REFERENCE TO RELATED APPLICATION

The present application claims the benefit of Korean Patent Application No. 10-2021-0135353 filed on Oct. 12, 2021 and Korean Patent Application No. 10-2022-0101127 filed on Aug. 12, 2022 with the Korean Intellectual Property Office, the entire disclosures of all these applications being incorporated herein by reference.

TECHNICAL FIELD

The present disclosure relates to a battery pack and a vehicle including the battery pack.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack or a battery rack by using at least one battery module and adding other components.

In general, a conventional battery pack is configured to include a plurality of battery cells and a cell frame for accommodating the plurality of battery cells. The conventional cell frame is generally configured as an assembly of a plurality of plates, such as a front plate, a rear plate, a side plate, a lower plate and an upper plate, to accommodate the plurality of battery cells and to secure rigidity.

However, the conventional battery pack is disadvantageous in terms of cost competitiveness and manufacturing efficiency since the manufacturing cost increases and the assembly process is complicated due to the characteristics of the cell frame structure configured as an assembly of a plurality of plates.

Moreover, the conventional battery pack is disadvantageous in terms of energy density since the size of the entire battery pack is increased according to the cell frame structure configured as an assembly of a plurality of plates.

DISCLOSURE

Technical Problem

Therefore, the present disclosure is directed to providing a battery pack capable of securing rigidity while increasing energy density, and a vehicle including the battery pack.

In addition, the present disclosure is also directed to providing a battery pack capable of improving cost competitiveness and manufacturing efficiency, and a vehicle including the battery pack.

Moreover, the present disclosure is directed to providing a battery pack capable of improving cooling performance, and a vehicle including the battery pack.

Technical Solution

In one aspect of the present disclosure,

In one aspect of the present disclosure, there is provided a battery pack including plurality of battery cells; a bus bar assembly having a first side and a second side, the second side of the bus bar assembly provided to a first side of the plurality of battery cells and electrically connected to the plurality of battery cells; a cooling unit disposed at the second side of the bus bar assembly and arranged between the plurality of battery cells along a longitudinal direction of the battery pack; and a side structure unit configured to accommodate the cooling unit and the plurality of battery cells and configured to form a first section of an outer surface of the battery pack.

The side structure unit may be configured to support the plurality of battery cells, secure rigidity of the plurality of battery cells and form a side appearance of the battery pack.

The side structure unit may be made of a plastic resin material.

The side structure unit may include a bottom rib provided at a bottom portion thereof to support a second side of the plurality of battery cells.

The bottom rib may be formed to protrude downward further than the second side of the plurality of battery cells.

The bottom rib may be provided to expose a venting portion of the plurality of battery cells and not to interfere with the venting portion.

The bottom rib may be configured to cover one side of the second side of the plurality of battery cells.

A filling member may be configured to cover a first side and a second side of the battery pack to form a pack case structure of the battery pack together with the side structure unit.

The filling member may form a second section of the outer surface of the battery pack together with the first section of the outer surface of the battery pack formed by the side structure unit.

The filling member may be made of a potting resin.

The filling member may be made of a silicon resin.

The filling member may be continuously filled between the bus bar assembly and the plurality of battery cells without an isolated space or a separated space between the bus bar assembly and the plurality of battery cells in a longitudinal direction of the plurality of battery cells.

The filling member may be filled in a portion other than an outer side of a side surface of the side structure unit.

The side structure unit may include an upper portion that contacts the bus bar assembly, a bottom portion at a second side of the plurality of battery cells, and a bottom rib provided at the bottom portion to contact the second side of the plurality of battery cells.

A portion of the filling member may be located at the bottom portion the side structure unit, and covers the second side of the plurality of battery cells.

In another aspect of the present disclosure, there is also provided a battery pack case structure including at least one battery pack.

In another aspect of the present disclosure, there is provided a vehicle including the battery pack case structure.

A longitudinal direction of the at least one battery pack may be arranged approximately perpendicular to a length direction of the vehicle so that the side structure unit provides protection to the plurality of battery cells during a front or rear collision of the vehicle.

The plurality of battery cells may be in compression in a height direction of a cylindrical can of each of the plurality of battery cells.

In another aspect of the present disclosure, there is provided a battery pack including a plurality of battery cells arranged in the battery pack; a side structure unit forming a support structure that arranges the plurality of battery cells in the battery pack, the side structure unit including a first main plate and a second main plate that support the plurality of battery cells from opposite sides; and a cooling unit disposed between the plurality of battery calls at a halfway point between the first main plate and the second main plate.

Each of the first main plate and the second main plate may include a cell accommodation portion that accommodates the plurality of battery cells respectively, and a gap may be located between the cooling unit and each of the first main plate and the second main plate.

A bus bar assembly may be provided to one side of the plurality of battery cells and electrically connected to the plurality of battery cells, and the bus bar assembly may be coupled to first main plate or the second main plate.

Each of the first main plate and the second main plate may include a bottom rib provided at a bottom portion thereof to support the second side of the plurality of battery cells.

Advantageous Effects

According to various embodiments as above, it is possible to provide a battery pack capable of securing rigidity while increasing energy density, and a vehicle including the battery pack.

In addition, according to various embodiments as above, it is possible to provide a battery pack capable of improving cost competitiveness and manufacturing efficiency, and a vehicle including the battery pack.

Moreover, according to various embodiments as above, it is possible to provide a battery pack capable of improving cooling performance, and a vehicle including the battery pack.

DESCRIPTION OF DRAWINGS

The accompanying drawings illustrate an example embodiment of the present disclosure and together with the foregoing disclosure, serve to provide further understanding of the technical features of the present disclosure, and thus, the present disclosure is not construed as being limited to the drawing.

FIG. 7 is a bottom view showing of the battery cell of FIG. 3.

FIG. 11 is an enlarged view for illustrating a main part of the connection bus bar unit of FIG. 9.

FIGS. 17 and 18 are diagrams for illustrating a coupling structure between the battery cells and the cooling units through the side structure unit of FIG. 15.

FIG. 24 is a bottom view showing the side structure unit when the side structure unit of FIG. 15 is coupled to the battery cells.

FIG. 25 is an enlarged bottom view showing a main part of the side structure unit of FIG. 24.

FIG. 34 is a diagram for illustrating a side structure unit of the battery pack of FIG. 30.

FIG. 36 is a diagram for illustrating an arrangement relationship of the battery cells and the cooling units through the side structure unit of FIG. 34.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
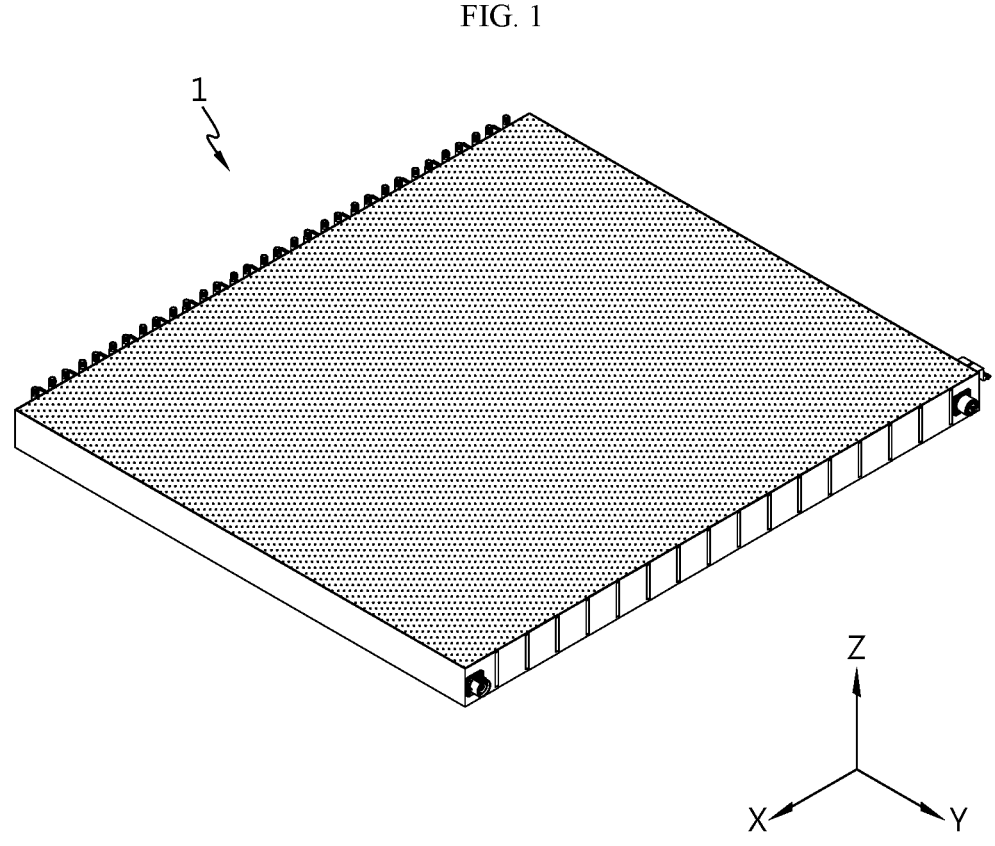
FIG. 1 is a diagram for illustrating a battery pack according to an embodiment of the present disclosure.
Figure 2:
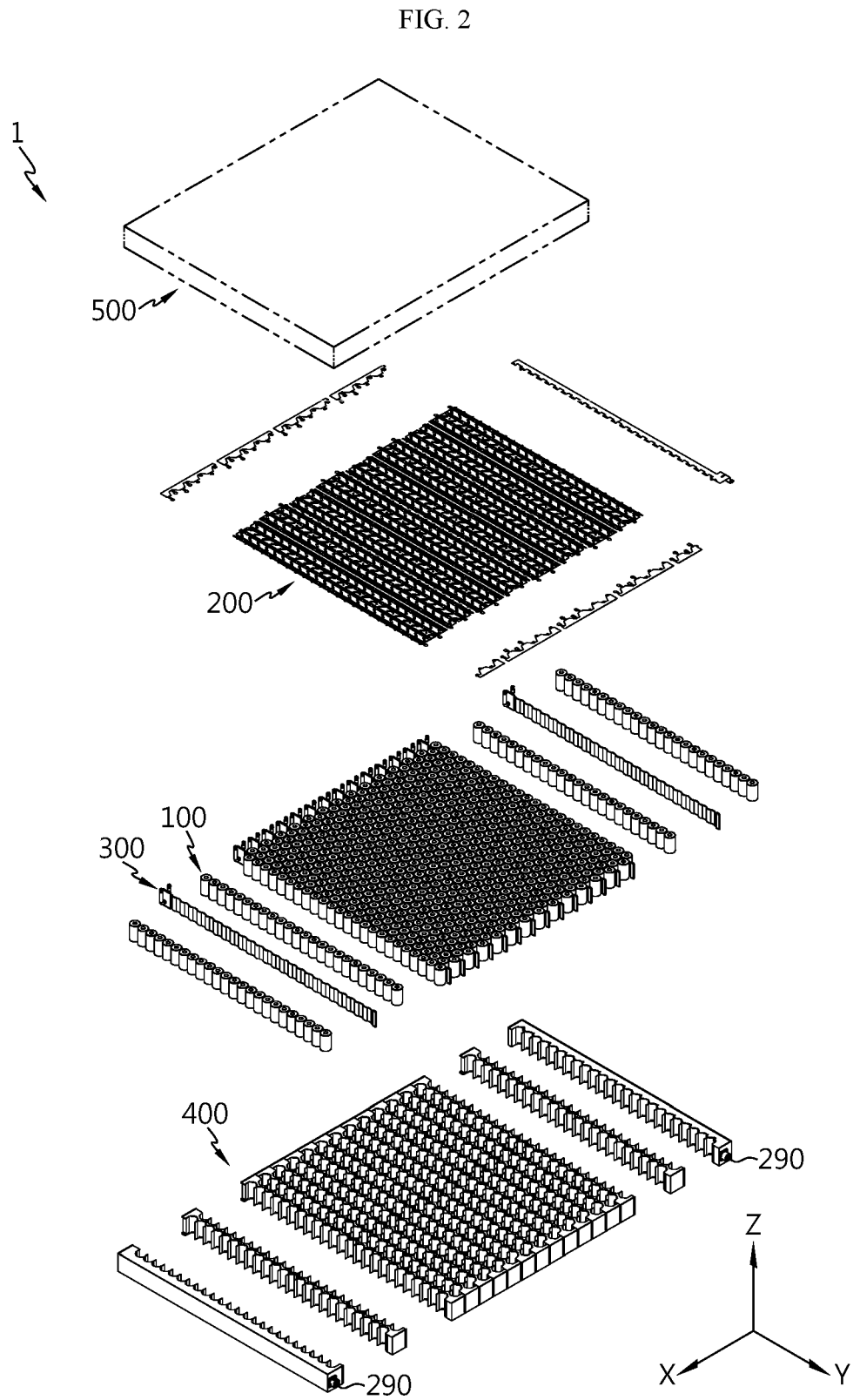
FIG. 2 is an exploded perspective view showing the battery pack of FIG. 1.

FIG. 1 is a diagram for illustrating a battery pack according to an embodiment of the present disclosure, and FIG. 2 is an exploded perspective view showing the battery pack of FIG. 1.

Referring to FIGS. 1 and 2, the battery pack 1 may be provided to an electric vehicle or a hybrid electric vehicle as an energy source. Hereinafter, the battery pack 1 provided to the electric vehicle or the like will be described later in more detail with reference to the related drawings.

The battery pack 1 may include a plurality of battery cells 100, a bus bar assembly 200, a cooling unit 300, a side structure unit 400, and a filling member 500.

The plurality of battery cells 100 may be provided as secondary batteries, such as cylindrical secondary batteries, pouch-type secondary batteries, or rectangular secondary batteries. Hereinafter, in this embodiment, the plurality of battery cells 100 will be described as cylindrical secondary batteries.

Hereinafter, each battery cell 100 will be described in more detail with reference to the related drawings.

Figure 3:
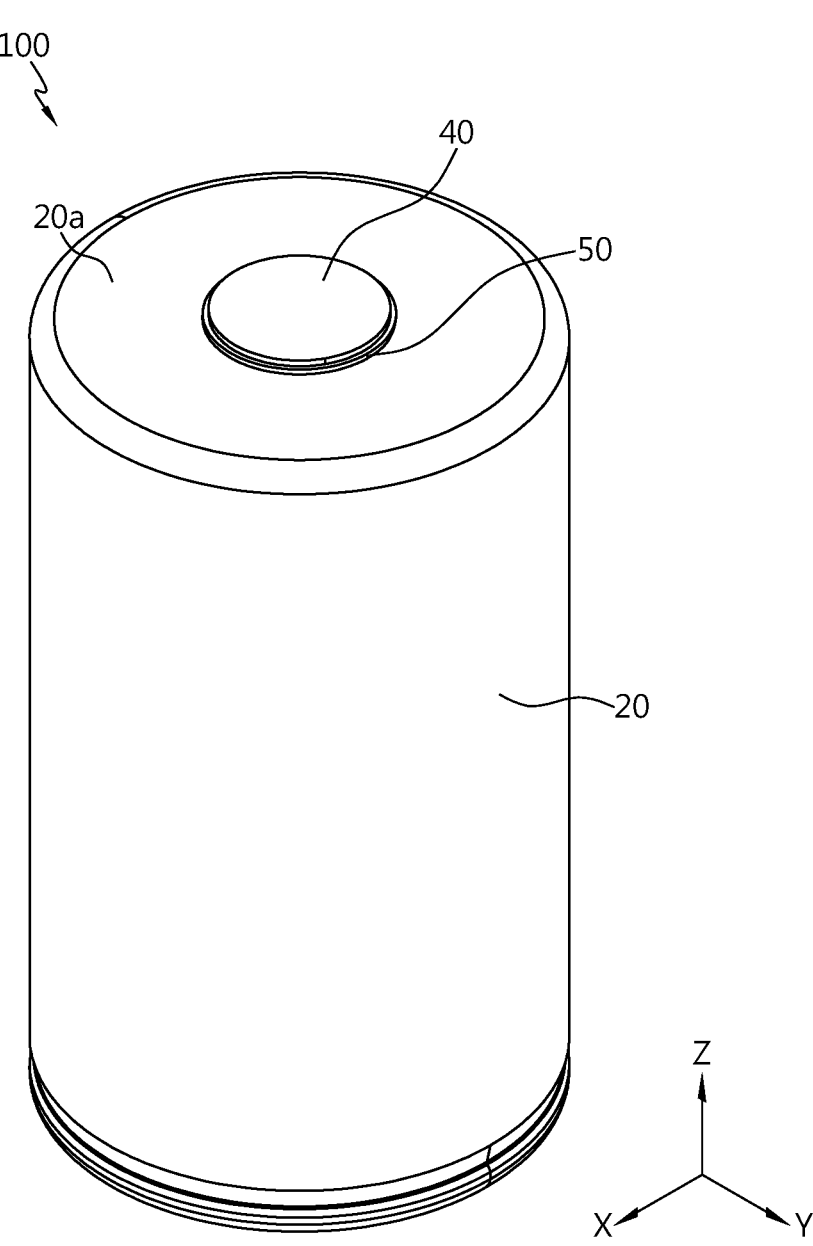
FIG. 3 is a diagram for illustrating a battery cell of the battery pack of FIG. 2.
Figure 4:
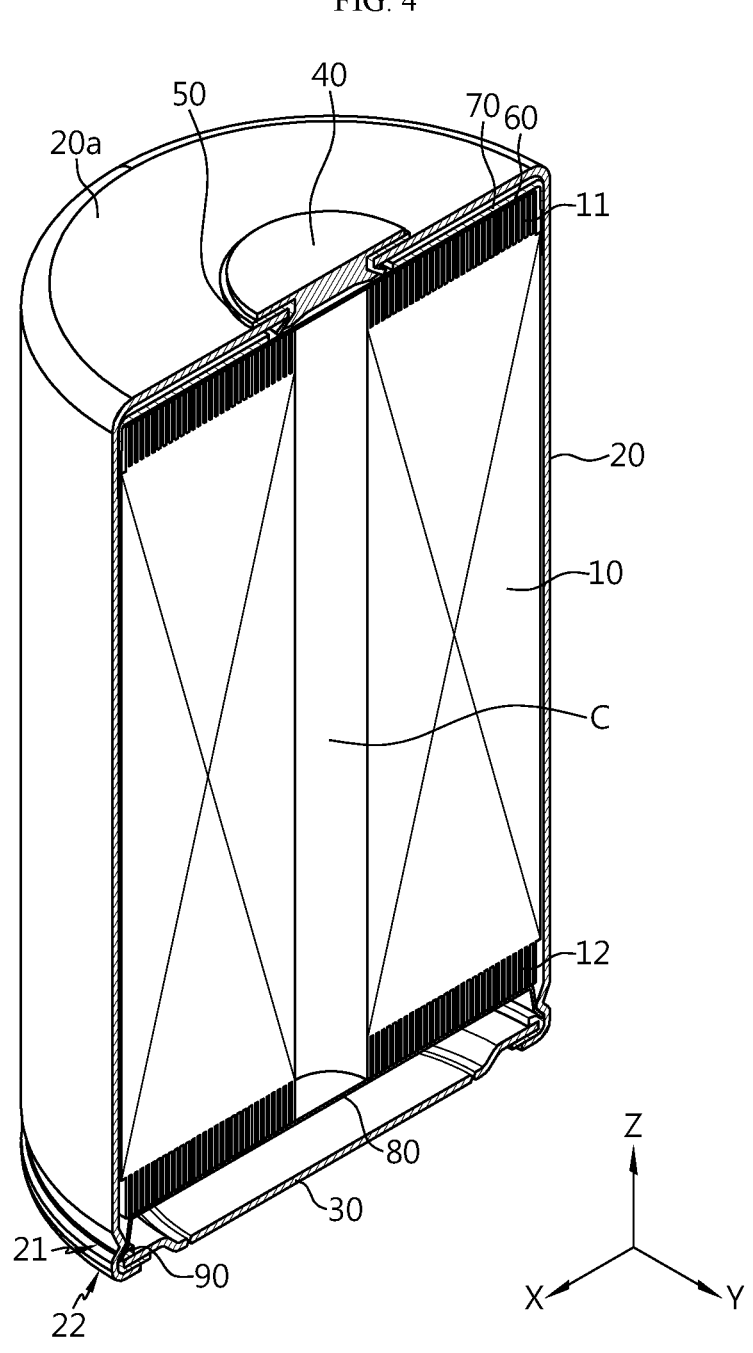
FIG. 4 is a partially sectioned view showing an inner structure of the battery cell of FIG. 3.
Figure 5:
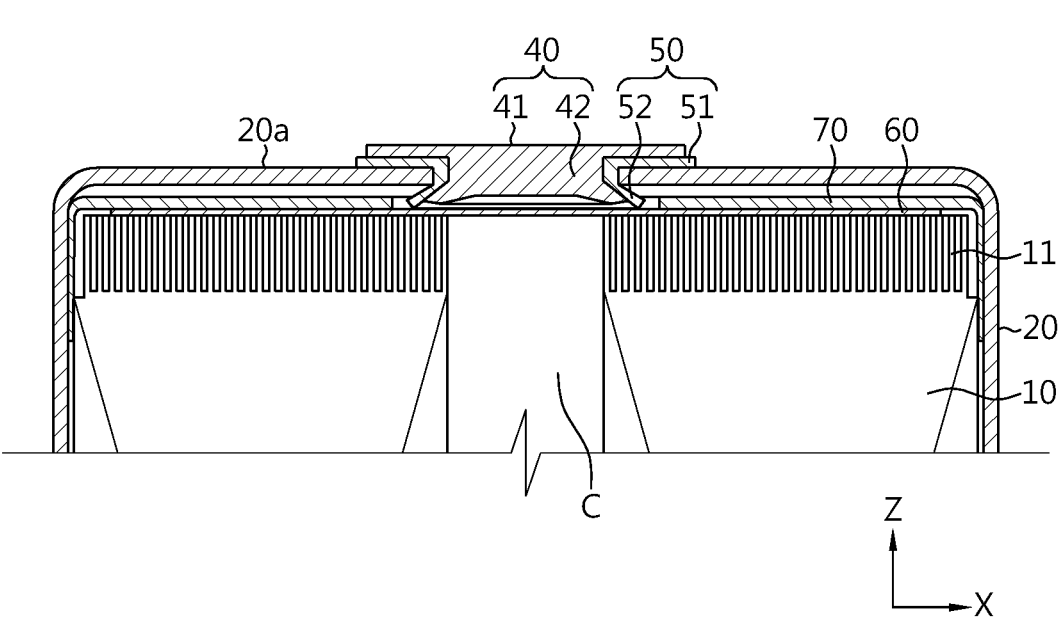
FIG. 5 is a partially sectioned view showing an upper structure of the battery cell of FIG. 3.
Figure 6:
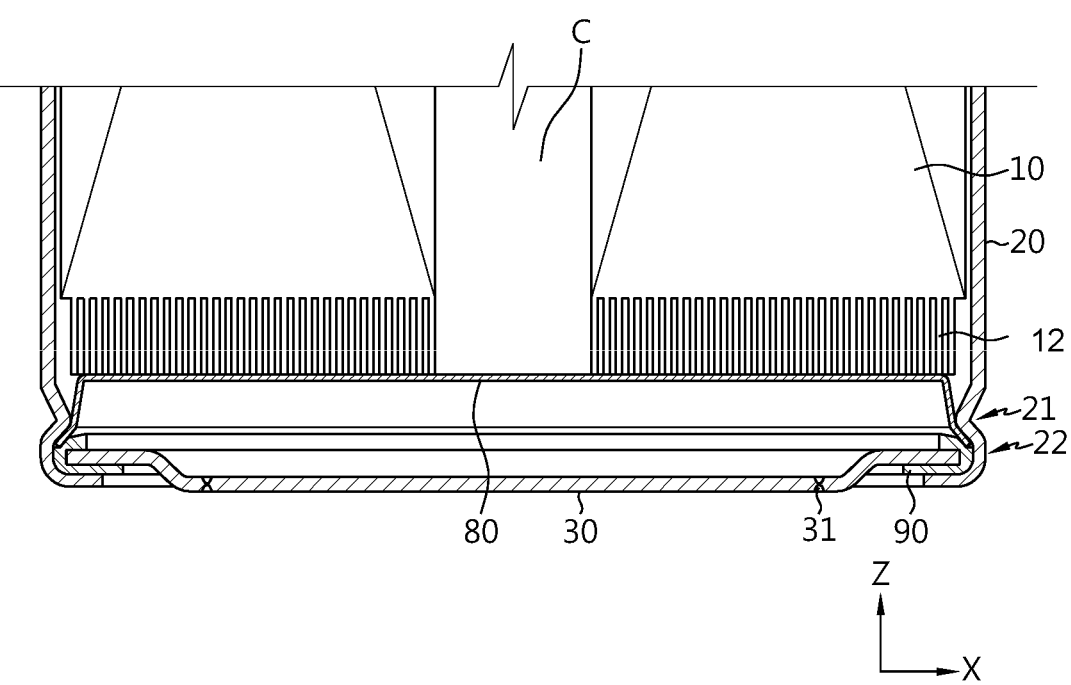
FIG. 6 is a partially sectioned view showing a lower structure of the battery cell of FIG. 3.
Figure 7:
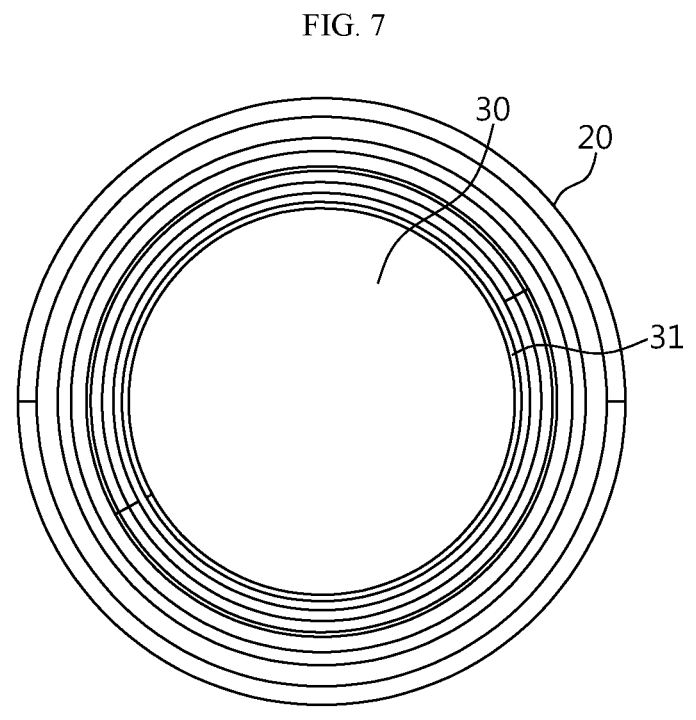

FIG. 3 is a diagram for illustrating a battery cell of the battery pack of FIG. 2, FIG. 4 is a partially sectioned view showing an inner structure of the battery cell of FIG. 3, FIG. 5 is a partially sectioned view showing an upper structure of the battery cell of FIG. 3, FIG. 6 is a partially sectioned view showing a lower structure of the battery cell of FIG. 3, and FIG. 7 is a bottom view showing of the battery cell of FIG. 3.

Referring to FIGS. 3 to 7, the battery cell 100 includes an electrode assembly 10, a battery can 20, a cap plate 30, and a first electrode terminal 40. The battery cell 100 may further include an insulation gasket 50 and/or an upper current collecting plate 60 and/or an insulation plate 70 and/or a lower current collecting plate 80 and/or a sealing gasket 90 in addition to the above components.

The electrode assembly 10 includes a first electrode plate having a first polarity, a second electrode plate having a second polarity, and a separator interposed between the first electrode plate and the second electrode plate. The first electrode plate is a positive electrode plate or a negative electrode plate, and the second electrode plate corresponds to an electrode plate having a polarity opposite to that of the first electrode plate.

The electrode assembly 10 may have, for example, a jelly-roll shape. That is, the electrode assembly 10 may be manufactured by winding a stack formed by sequentially stacking the first electrode plate, the separator and the second electrode plate at least once with reference to a winding center C. In this case, the separator may be provided on an outer peripheral surface of the electrode assembly 10 for insulation from the battery can 20.

The first electrode plate includes a first electrode current collector and a first electrode active material applied on one surface or both surfaces of the first electrode current collector. At one end of the first electrode current collector in the width direction (parallel to the Z-axis), an uncoated region where the first electrode active material is not applied is present. The uncoated region functions as a first electrode tab. The first electrode tab 11 is provided at an upper portion of the electrode assembly 10 accommodated in the battery can 20 in the height direction (parallel to the Z-axis).

The second electrode plate includes a second electrode current collector and a second electrode active material applied on one surface or both surfaces of the second electrode current collector. At the other end of the second electrode current collector in the width direction (parallel to the Z axis), an uncoated region where the second electrode active material is not applied is present. The uncoated region functions as a second electrode tab 12. The second electrode tab 12 is provided at an upper portion of the electrode assembly 10 accommodated in the battery can 20 in the height direction (parallel to the Z-axis).

The battery can 20 is a cylindrical container with an opening at a bottom thereof, and is made of a metal material with conductivity. The side and upper surfaces of the battery can 20 are integrally formed. The upper surface of the battery can 20 has an approximately flat shape. The battery can 20 accommodates the electrode assembly 10 through the opening formed at the bottom, and also accommodates the electrolyte together.

The battery can 20 is electrically connected to the second electrode tab 12 of the electrode assembly 10. Therefore, the battery can 20 has the same polarity as the second electrode tab 12.

The battery can 20 may include a beading portion 21 and a crimping portion 22 formed at the lower end thereof. The beading portion 21 is formed at a lower portion of the electrode assembly 10. The beading portion 21 is formed by press-fitting the outer peripheral surface of the battery can 20. The beading portion 21 prevents the electrode assembly 10 having a size corresponding to the width of the battery can 20 from coming out through the opening formed at the bottom of the battery can 20, and may function as a support on which the cap plate 30 is placed.

The crimping portion 22 is formed under the beading portion 21. The crimping portion 22 has an extended and bent shape so as to surround the outer peripheral surface of the cap plate 30 disposed below the beading portion 21 and a portion of the lower surface of the cap plate 30.

The cap plate 30 is a part made of a metal material with conductivity, and covers the opening formed at the bottom of the battery can 20. That is, the cap plate 30 forms the lower surface of the battery cell 100. The cap plate 30 is placed on the beading portion 21 formed at the battery can 20, and is fixed by the crimping portion 22. An airtight gasket 90 may be interposed between the cap plate 30 and the crimping portion 22 of the battery can 20 to secure the airtightness of the battery can 20.

The cap plate 30 may further include a venting portion 31 formed to prevent an increase in internal pressure due to gas generated inside the battery can 20. The venting portion 31 corresponds to a region having a thinner thickness compared to the surrounding region of the cap plate 30. The venting portion 31 is structurally weak compared to the surrounding region. Accordingly, when an abnormality occurs in the battery cell 100 to increase the internal pressure to a certain level or above, the venting portion 31 is ruptured so that the gas generated inside the battery can 20 is discharged.

A hole on the upper surface of the battery can 20 may be pre-formed prior to placement of the first electrode terminal 40 and an insulation gasket 50, but such is not required. For example, the hole may be formed as the first electrode terminal 40 is inserted, or a hole with a different diameter may be pre-formed or the upper surface may be notched or pre-notched, and the insertion of the first electrode terminal 40 may expand the hole to a desired size or puncture the notch to form a small hole that is then expanded to the desired size. Other methods of forming the hole may be used.

The battery cell 100 according to an embodiment of the present disclosure has a structure in which both a positive electrode terminal and a negative electrode terminal are present on an upper portion thereof, and thus the upper structure is more complicated than the lower structure. Accordingly, the venting portion 31 may be formed at the cap plate 30 that forms the lower surface of the battery cell 100 in order to smoothly discharge the gas generated in the battery can 20.

The venting portion 31 may be continuously formed in a circle on the cap plate 30. The present invention is not limited thereto, and the venting portion 31 may also be discontinuously formed in a circle on the cap plate 30, or may be formed in a straight shape or other shapes.

The first electrode terminal 40 is made of a metal material with conductivity and passes through the upper surface of the battery can 20 to be electrically connected to the first electrode tab 11 of the electrode assembly 10. Therefore, the first electrode terminal 40 has the first polarity. The first electrode terminal 40 is electrically insulated from the battery can 20 with the second polarity.

The first electrode terminal 40 includes an exposed terminal portion 41 and an inserted terminal portion 42. The exposed terminal portion 41 is exposed to the outside of the battery can 20. The exposed terminal portion 41 is located in the center of the upper surface of the battery can 20. The inserted terminal portion 42 is electrically connected to the first electrode tab 11 through the central portion of the upper surface of the battery can 20. The inserted terminal portion 42 may be riveted on the inner surface of the battery can 20.

The upper surface of the battery can 20 and the first electrode terminal 40 have opposite polarities and face the same direction. In addition, a step may be formed between the first electrode terminal 40 and the upper surface of the battery can 20. Specifically, when the entire upper surface of the battery can 20 has a flat shape or the upper surface of the battery can 20 has a shape protruding upward from the center thereof, the exposed terminal portion 41 of the first electrode terminal 40 may protrude upward further to the upper surface of the battery can 20. On the contrary, when the upper surface of the battery can 20 has a shape that is concavely recessed downward from the center, namely toward the electrode assembly 10, the upper surface of the battery can 20 may protrude upward further to the exposed terminal portion 41 of the first electrode terminal 40.

The insulation gasket 50 is interposed between the battery can 20 and the first electrode terminal 40 to prevent the battery can 20 and the first electrode terminal 40 having opposite polarities from contacting each other. Accordingly, the upper surface of the battery can 20 having an approximately flat shape may function as the second electrode terminal of the battery cell 100.

The insulation gasket 50 includes an exposed portion 51 and an insert portion 52. The exposed portion 51 is interposed between the exposed terminal portion 41 of the first electrode terminal 40 and the battery can 20. The insert portion 52 is interposed between the inserted terminal portion 42 of the first electrode terminal 40 and the battery can 20. The insulation gasket 50 may be made of, for example, a resin material having an insulation property.

In the case where the insulation gasket 50 is made of a resin material, the insulation gasket 50 may be coupled with the battery can 20 and the first electrode terminal 40 by thermal fusion, for example. In this case, the airtightness at the coupling interface between the insulation gasket 50 and the first electrode terminal 40 and at the coupling interface between the insulation gasket 50 and the battery can 20 may be strengthened.

In the upper surface of the battery can 20, the entire area except for the area occupied by the first electrode terminal 40 and the insulation gasket 50 corresponds to the second electrode terminal 20a having a polarity opposite to that of the first electrode terminal 40.

The battery cell 100 according to an embodiment of the present disclosure includes a first electrode terminal 40 having a first polarity and a second electrode terminal 20a electrically insulated from the first electrode terminal 40 and having a second polarity together at one side thereof in the longitudinal direction (parallel to the Z-axis). That is, in the battery cell 100 according to an embodiment of the present disclosure, since the pair of electrode terminals 40, 20a are positioned in the same direction, in the case of electrically connecting the plurality of battery cells 100, it is possible that electrical connection parts such as the bus bar assembly 200, explained later, are disposed at only one side of the battery cells 100. This may bring about structure simplification of the battery pack 1 and improvement of energy density.

Hereinafter, the bus bar assembly 200 for electrical connection with the plurality of battery cells 100 will be described in more detail.

Referring to FIG. 2 again, the bus bar assembly 200 may be provided at one side of the battery cells 100, specifically at an upper side (+Z-axis direction) of the battery cells 100, and may be electrically connected to the plurality of battery cells 100. The electrical connection of the bus bar assembly 200 may be parallel and/or series connections.

The bus bar assembly 200 is electrically connected to the first electrode terminal 40 (see FIG. 3) of the plurality of battery cells 100 having the first polarity and the second electrode terminal 20a (see FIG. 3) of the battery can 20 (see FIG. 3) having the second polarity, and may be electrically connected to an external charging/discharging line, or the like through a connector terminal 290, or the like. Here, the first polarity may be a positive polarity, and the second polarity may be a negative polarity.

Hereinafter, the configuration of the bus bar assembly 200 will be described in more detail.

Figure 8:
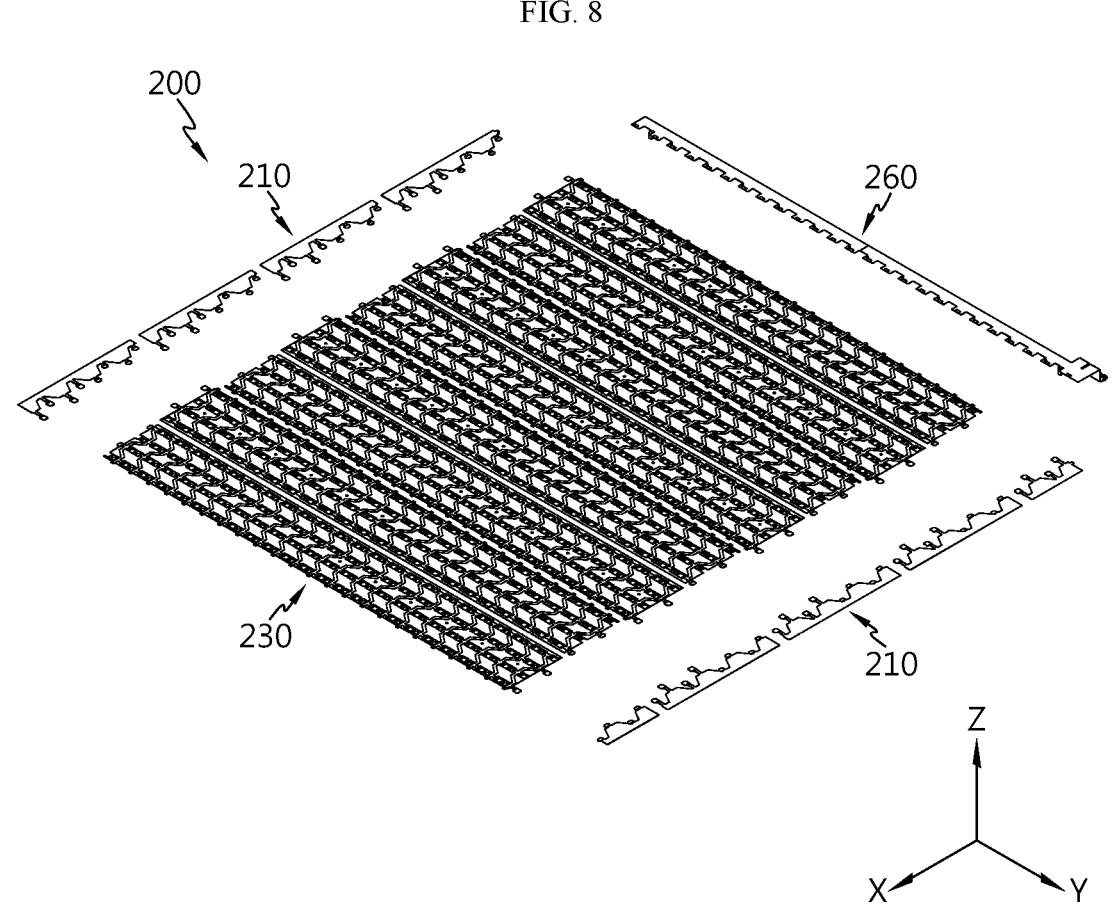
FIG. 8 is a diagram for illustrating a bus bar assembly of the battery pack of FIG. 2.
Figure 9:
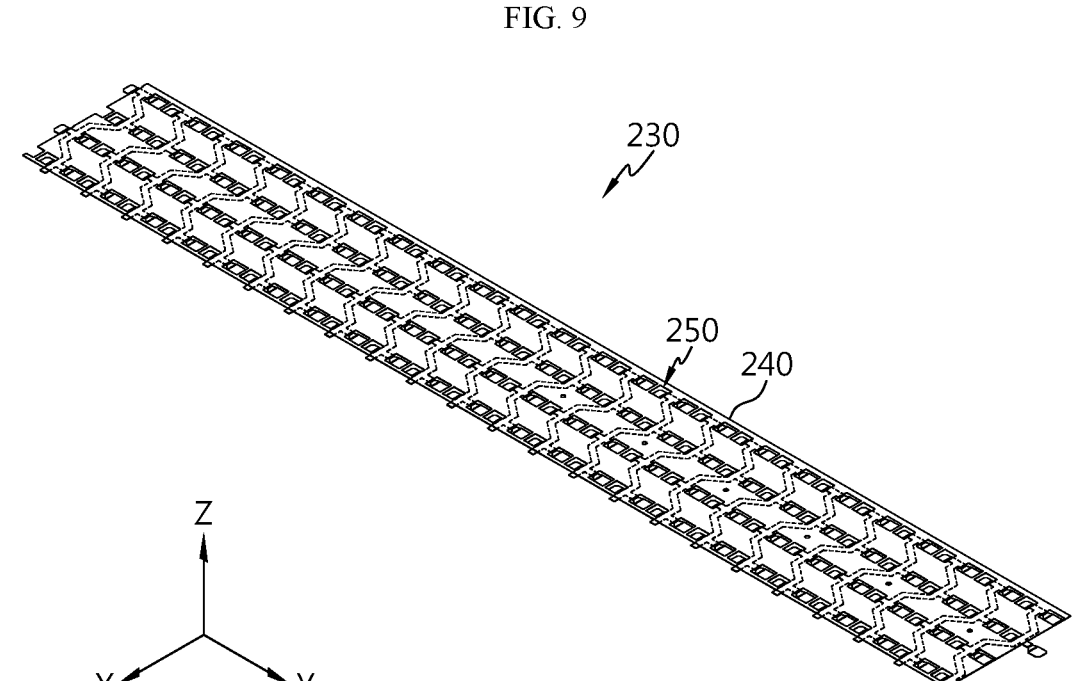
FIG. 9 is a diagram for illustrating a connection bus bar unit of the bus bar assembly of FIG. 8.
Figure 10:
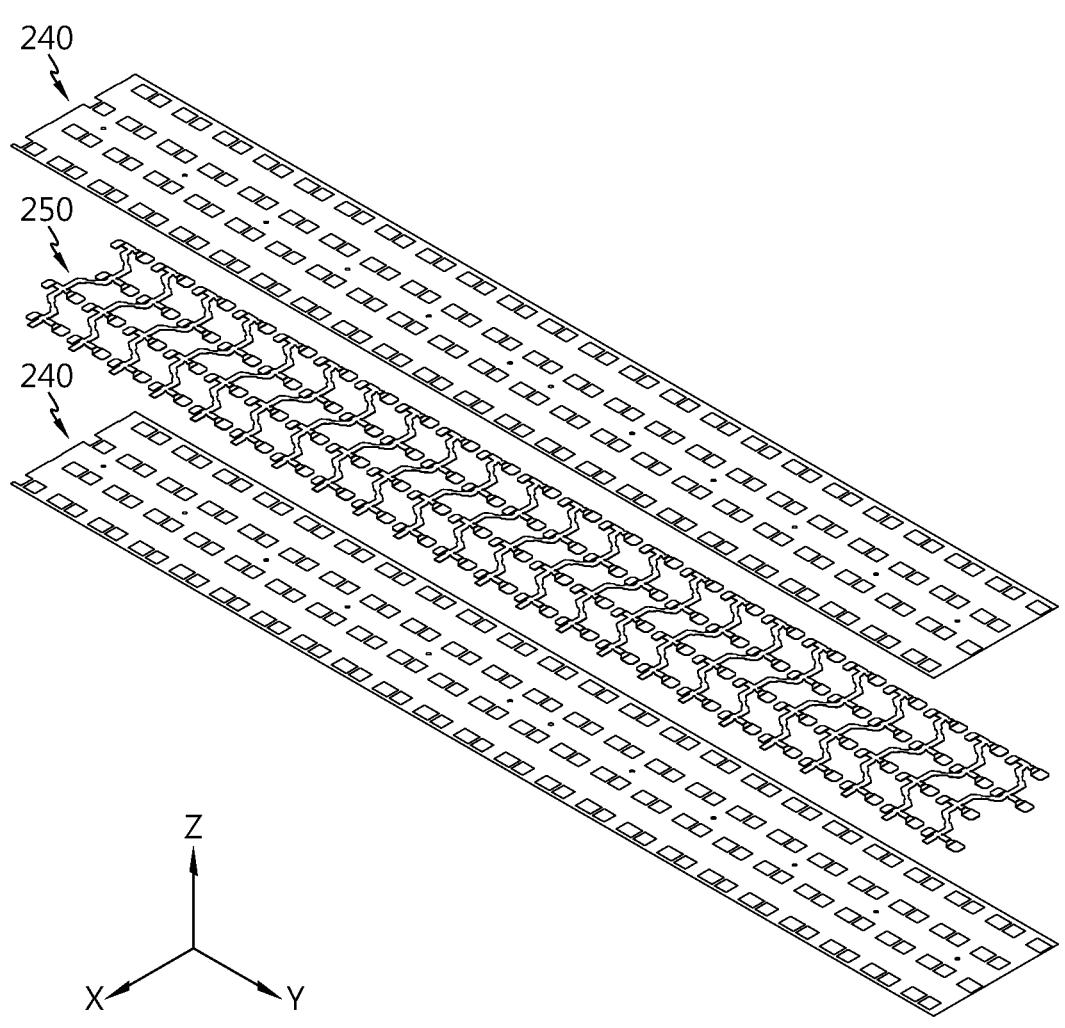
FIG. 10 is an exploded perspective view showing the connection bus bar unit of FIG. 9.
Figure 11:
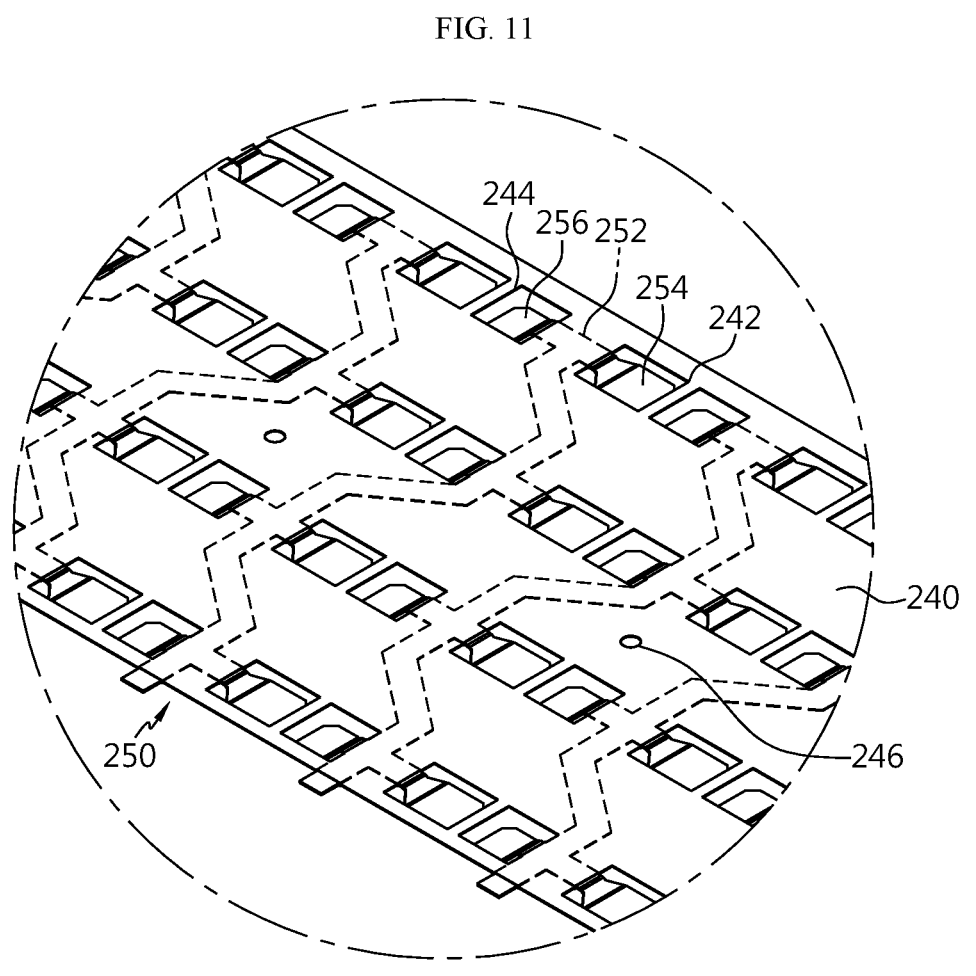

FIG. 8 is a diagram for illustrating a bus bar assembly of the battery pack of FIG. 2, FIG. 9 is a diagram for illustrating a connection bus bar unit of the bus bar assembly of FIG. 8, FIG. 10 is an exploded perspective view showing the connection bus bar unit of FIG. 9, and FIG. 11 is an enlarged view for illustrating a main part of the connection bus bar unit of FIG. 9.

Referring to FIGS. 8 to 11 along with FIG. 2, the bus bar assembly 200 may include a main bus bar unit 210, a connection bus bar unit 230, an interconnection board 260, and a connector terminal 290.

The main bus bar unit 210 may be provided in plural, and may be electrically connected to the battery cells 100 disposed at the outermost side in the longitudinal direction (Y-axis direction) of the battery pack 1. The main bus bar unit 210 may be electrically connected to the connector terminal 290, explained later.

The connection bus bar unit 230 may be disposed between the main bus bar units 210 in the longitudinal direction (Y-axis direction) of the battery pack 1, may be electrically connected to the plurality of battery cells 100, and may cover the plurality of battery cells 100.

The connection bus bar unit 230 may be provided in a single number having a size capable of covering all of the plurality of battery cells 100 or may be provided in plural to cover the plurality of battery cells 100. Hereinafter, in this embodiment, it will be described that the connection bus bar unit 230 is provided in plural.

Each of the plurality of connection bus bar units 230 may include a bus bar cover 240 and a sub bus bar 250.

The bus bar cover 240 covers an upper side of the plurality of battery cells 100 and may be provided in an approximately flat plate shape. The shape and size of the bus bar cover 240 may vary depending on the number or capacity of battery cells 100 required in the battery pack 1.

The bus bar cover 240 may be made of an insulating material. For example, the bus bar cover 240 may be made of a polyimide film. The present invention is not limited thereto, and it is also possible that the bus bar cover 240 is provided as other insulation members made of an insulating material.

The bus bar cover 240 may be provided in a pair to have a shape and size corresponding to each other in the upper and lower direction (Z-axis direction) of the battery pack 1, and the pair of bus bar covers 240 may be coupled to each other. Here, the sub bus bar 250, explained later, may be inserted between the pair of bus bar covers 240.

The bus bar cover 240 may include a positive electrode bus bar hole 242, a negative electrode bus bar hole 244 and a guide hole 246.

The positive electrode bus bar hole 242 has an open space of a predetermined size, and may be provided in plural. A positive electrode connection portion 254, explained later, may be exposed in the positive electrode bus bar hole 242. Here, the positive electrode bus bar hole 242 may be formed to have an open space larger than the size of the positive electrode connection portion 254, explained later, in order to improve process workability and to improve the efficiency of injecting the filling member 500, explained later.

The positive electrode bus bar hole 242 may more efficiently guide the electrical connection between the positive electrode connection portion 254, explained later, and the first electrode terminal 40 (see FIG. 3), which is a positive electrode of the battery cells 100.

Moreover, through the open space of the positive electrode bus bar hole 242, it is possible to significantly increase the injection efficiency of the filling member 500 when the filling member 500, explained later, is injected. Specifically, the filling member 500 provided as a potting resin 500, explained later, through the open space of the positive electrode bus bar hole 242 may be more directly injected in the vertical direction (Z-axis direction) from the upper side of the battery pack 1 to the lower side thereof, so the injection efficiency between the battery cells 100 may be significantly improved.

The negative electrode bus bar hole 244 is disposed to face the positive electrode bus bar hole 242, has an open space of a predetermined size like the positive electrode bus bar hole 242, and may be provided in plural. Here, the negative electrode bus bar hole 244 may be formed to have an open space larger than the size of the negative electrode connection portion 256, explained later, in order to improve process workability and to improve injection efficiency of the filling member 500, explained later.

The negative electrode bus bar hole 244 may more efficiently guide the electrical connection between the negative electrode connection portion 256, explained later, and the battery can 20 (see FIG. 3), specifically the second electrode terminal 20a, serving as the negative electrode of the battery cells 100.

Moreover, through the open space of the negative electrode bus bar hole 244, it is possible to significantly increase the injection efficiency of the filling member 500 when the filling member 500, explained later, is injected. Specifically, since the filling member 500 provided as the potting resin 500, explained later, may be more directly injected through the open space of the negative electrode bus bar hole 244 in the vertical direction (Z-axis direction) from the upper side of the battery pack 1 to the lower side, the injection efficiency between the battery cells 100 may be significantly improved.

The guide hole 246 may guide the assembly position of the bus bar assembly 200. Specifically, the guide hole 246 may fix the connection bus bar unit 230 to the side structure unit 400 to guide the correct arrangement of the connection bus bar unit 230.

The guide hole 246 may be provided in plural. Bus bar guide protrusions 416 of the side structure unit 400, explained later, may be inserted into the plurality of guide holes 246.

The sub bus bar 250 is for electrical connection with the first electrode terminals 40 serving as positive electrodes of the plurality of battery cells 100 and the second electrode terminals 20a serving as negative electrodes, and is provided to the upper side of the bus bar cover 240 or is inserted into the pair of bus bar covers 240. Hereinafter, in this embodiment, it will be described that the sub bus bar 250 is inserted or coupled into the bus bar cover 240.

The sub bus bar 250 may include a bus bar bridge 252, a positive electrode connection portion 254, and a negative electrode connection portion 256.

The bus bar bridge 252 may be inserted into the bus bar cover 240 and formed to have a predetermined length along the width direction (X-axis direction) of the battery pack 1. The bus bar bridge 252 may be provided in a shape corresponding to the arrangement structure of the battery cells 100 in the width direction (X-axis direction) of the battery pack 1 to increase the efficiency of electrical connection with the battery cells 100. Accordingly, in this embodiment, the bus bar bridge 252 may be arranged in a zigzag shape in the width direction (X-axis direction) of the battery pack 1.

The bus bar bridge 252 may be provided in plural. The plurality of bus bar bridges 252 may be inserted into the bus bar cover 240 and disposed to be spaced apart from each other by a predetermined distance in the longitudinal direction (Y-axis direction) of the battery pack 1.

The bus bar bridge 252 may be made of a conductive material. For example, the bus bar bridge 252 may be made of aluminum or copper as a metal material. The present disclosure is not limited thereto, and of course, the bus bar bridge 252 may be made of other materials for the electrical connection.

The positive electrode connection portion 254 integrally extends and protrudes from the bus bar bridge 252, and may be disposed in the positive electrode bus bar hole 242. The positive electrode connection portion 254 may be electrically connected to the first electrode terminal 40 (see FIG. 3) serving as a positive electrode of the battery cell 100. The electrical connection may be performed through a welding process for electrical connection such as laser welding or ultrasonic welding.

Since the positive electrode connection portion 254 and the positive electrode (first electrode terminal) 40 of the battery cell 100 are connected in the open space of the positive electrode bus bar hole 242, the welding process for the connection may be carried out directly in the open space during the connection without any further process.

The negative electrode connection portion 256 may extend integrally from the bus bar bridge 252 to protrude in a direction opposite to the positive electrode connection portion 254, and may be disposed in the negative electrode bus bar hole 244. The negative electrode connection portion 256 may be electrically connected to the second electrode terminal 20*a* (see FIG. 3) serving as a negative electrode of the battery cell 100. The electrical connection may be performed through a welding process for electrical connection such as laser welding or ultrasonic welding.

Since the negative electrode connection portion 256 and the negative electrode (second electrode terminal) 20*a* of the battery cell 100 are connected in the open space of the negative electrode bus bar hole 244, during the connection, the welding process for the connection may be carried out directly in the open space without any further process.

The interconnection board 260 is connected to the external sensing line and may be provided at one end (−Y-axis direction) of the battery pack 1. The arrangement position of the interconnection board 260 may be changed according to design or the like, and the interconnection board 260 may be provided at other positions capable of enabling connection with the external sensing line. Moreover, it may be possible that the interconnection board 260 is provided in plural according to the number or capacity of the battery cells 100 of the battery pack 1.

The interconnection board 260 may be provided to be exposed to the outside of the battery pack 1 for connection with the external sensing line. The external sensing line may connect the interconnection board 260 and a battery management system (not shown). The battery management system may determine the state of charge of the battery cells connected in parallel based on the voltage of the battery cells connected in parallel.

The interconnection board 260 may include a thermistor for checking the temperature state of the battery cells 100. The thermistor may be included in the interconnection board 260 or may be separately mounted outside the interconnection board 260.

The connector terminal 290 may be provided as a pair. The pair of connector terminal 290 are for connection with an external charging/discharging line, and may be provided as high voltage connector terminals.

Referring to FIG. 2 again, the cooling unit 300 is for cooling the battery cells 100, and is disposed at the lower side (−Z-axis direction) of the bus bar assembly 200, and may be disposed between the plurality of battery cells 100 along the longitudinal direction (Y-axis direction) of the battery pack 1.

The cooling unit 300 may be provided in plural.

The plurality of cooling units 300 may be disposed to face the plurality of battery cells 100 in the width direction (X-axis direction) of the battery pack 1. Here, the plurality of cooling units 300 may be disposed to contact the battery cells 100 facing each other to increase cooling performance.

Hereinafter, the cooling unit 300 will be described in more detail.

Figure 12:
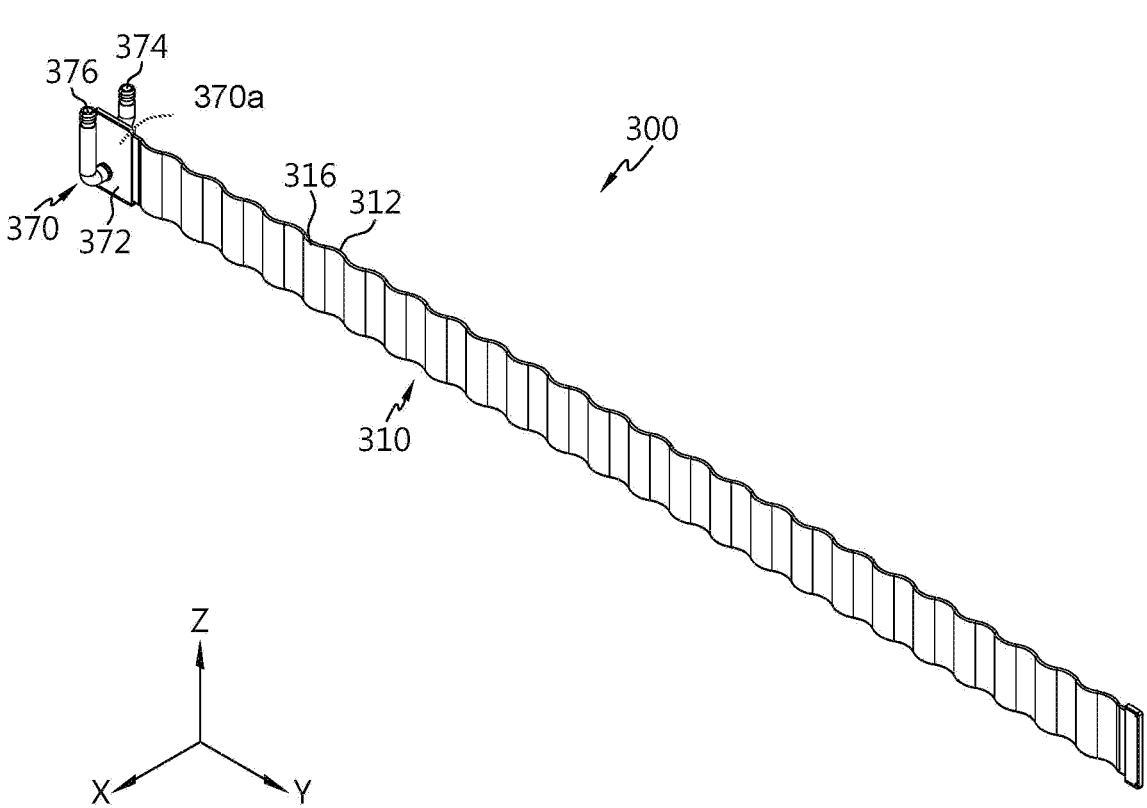
FIG. 12 is a diagram for illustrating a cooling unit of the battery pack of FIG. 2.
Figure 13:
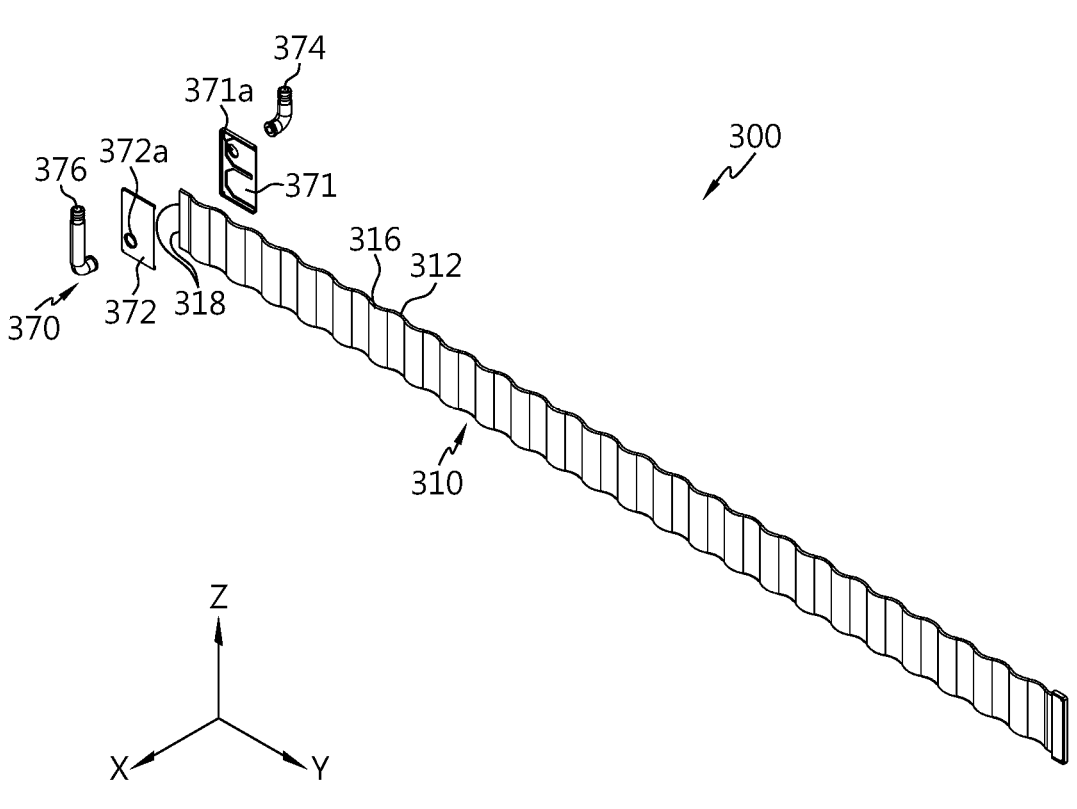
FIG. 13 is an exploded perspective view showing the cooling unit of FIG. 12
Figure 14:
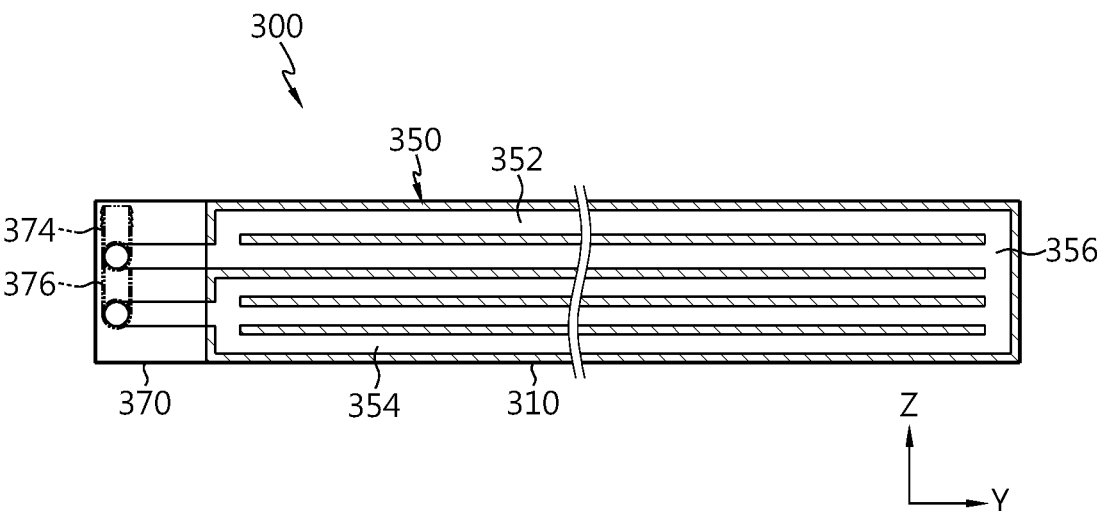
FIG. 14 is a sectional view showing the cooling unit of FIG. 12.

FIG. 12 is a diagram for illustrating a cooling unit of the battery pack of FIG. 2, FIG. 13 is an exploded perspective view showing the cooling unit of FIG. 1, and FIG. 14 is a sectional view showing the cooling unit of FIG. 12.

Referring to FIGS. 12 to 14 along with FIG. 2, the cooling unit 300 may include a cooling tube 310, a cooling channel 350, and a cooling fluid inlet/outlet portion 370.

The cooling tube 310 is formed in a predetermined length along the longitudinal direction (Y-axis direction) of the battery pack 1, is disposed between the plurality of battery cells 100, and may have a cooling channel 350 for circulation of a cooling fluid, explained later. In embodiments, the cooling fluid may be water, and reference to cooling fluid is not limited to water, but also includes one or more fluids that can also exchange heat with the surrounding.

The cooling tube 310 may be formed in a shape corresponding to the outer surface of the plurality of battery cells 100 facing each other in the width direction (X-axis direction) of the battery pack 1.

The cooling tube 310 has a plurality of convex portions 312 and concave portions 316 that are convex and concave in the width direction (X-axis direction) of the battery pack 1 to be alternately arranged along the longitudinal direction (Y-axis direction) of the battery pack 1.

The cooling tube 310 may be disposed in contact with the outer surface of the plurality of battery cells 100 to further increase the cooling performance of the battery cells 100. The cooling tube 310 may be adhesively fixed to the plurality of battery cells 100 through the filling member 500, explained later, or a separate adhesive member.

At one end (−Y-axis direction) of the cooling tube 310, a cooling fluid guide portion 318, explained later, for guiding a cooling fluid into the cooling channel 350 may be provided. The cooling fluid guide portion 318 is formed at one end (−Y-axis direction) of the cooling tube 310 in the longitudinal direction (Y-axis direction), and may be provided as a pair. Any one of the pair of cooling fluid guide portions 318 may communicate with an upper channel 352 of the cooling channel 350, explained later, and the other one of the pair of cooling fluid guide portions 318 may communicate with a lower channel 354 of the cooling channel 350, explained later. Specifically, any one of the pair of cooling fluid guide portions 318 may be provided at an upper side (+Z-axis direction) of the cooling tube 310 in the height direction (Z-axis direction) to communicate with the upper channel 352, explained later, the other one of the pair of cooling fluid guide portions 318 may be provided at a lower side (−Z-axis direction) of the cooling tube 310 in the height direction (Z-axis direction) to communicate with the lower channel 354, explained later.

The cooling channel 350 circulates the cooling fluid for cooling the battery cells 100, is provided in the cooling tube 310, and may be connected in communication with the cooling fluid inlet/outlet portion 370, explained later.

The cooling channel 350 may include an upper channel 352, a lower channel 354, and a connection channel 356.

The upper channel 352 is disposed at the upper side of the cooling tube 310 to be provided close to the bus bar assembly 200, and may be formed in a predetermined length along the longitudinal direction (Y-axis direction) of the cooling tube 310. The upper channel 352 may be connected in communication with a cooling fluid supply port 374 of the cooling fluid inlet/outlet portion 370.

One upper channel 352 or a plurality of upper channels 352 may be provided. Hereinafter, in this embodiment, in order to secure cooling performance, it will be described that the upper channel 352 is provided in plural.

The lower channel 354 is disposed at the lower side (−Z-axis direction) of the cooling tube 310 to be spaced apart from the at least one upper channel 352, and may be formed in a predetermined length along the longitudinal direction (Y-axis direction) of the cooling tube 310. The lower channel 354 may be connected in communication with a cooling fluid discharge port 376 of the cooling fluid inlet/outlet portion 370.

One lower channel 354 or a plurality of lower channels 354 may be provided. Hereinafter, in this embodiment, in order to secure cooling performance, it will be described that the lower channel 354 is provided in plural.

The connection channel 356 may connect the at least one upper channel, or a plurality of upper channels 352 in this embodiment, and the at least one lower channel, or a plurality of lower channels 354 in this embodiment.

The connection channel 356 may be provided at the other end (+Y-axis direction) of the cooling tube 310 opposite to the cooling fluid inlet/outlet portion 370 so as to secure the cooling channel 350 as much as possible.

In this embodiment, when the cooling fluid of the cooling channel 350 is circulated, the cooling fluid supplied from the cooling fluid supply port 374 is preferentially supplied to the upper channel 352 disposed close to the bus bar assembly 200, and then may flow toward the cooling fluid discharge port 376 via the connection channel 356 and the lower channel 354.

Accordingly, in this embodiment, since a cold cooling fluid is preferentially supplied to the area near the bus bar assembly 200, which has a relatively higher temperature distribution, within the battery pack 1, the cooling performance of the battery cells 100 will be significantly improved.

The cooling fluid inlet/outlet portion 370 may be connected to the cooling tube 310 to communicate with the cooling channel 350 of the cooling tube 310. The cooling fluid inlet/outlet portion 370 may be exposed to the outside of the side structure unit 400, explained later, and connected to communicate with an external cooling line.

The cooling fluid inlet/outlet portion 370 may be provided at one side (−Y-axis direction) of the side surface of the battery pack 1 in the longitudinal direction (Y-axis direction). The cooling tube 310 connected to the cooling fluid inlet/outlet portion 370 may be formed in a predetermined length toward the other side (+Y-axis direction) of the side surface of the battery pack 1 in the longitudinal direction (Y-axis direction) of the battery pack 1 from the cooling fluid inlet/outlet portion 370.

The cooling fluid inlet/outlet portion 370 may include an inlet/outlet portion body 370a, a cooling fluid supply port 374, and a cooling fluid discharge port 376.

The inlet/outlet portion body 370a may be connected to one end (−Y-axis direction) of the cooling tube 310. The inlet/outlet portion body 370a may include a supply port body 371 and a discharge port body 372.

The supply port body 371 covers one end (−Y-axis direction) of the cooling tube 310, and may be coupled with the discharge port body 372, explained later. In the supply port body 371, a supply port passing hole 371a through which the cooling fluid supply port 374, explained later, passes may be formed. The cooling fluid supply port 374, explained later, may pass through the supply port passing hole 371a and communicate with the upper channel 352, explained later, through the cooling fluid guide portion 318. Specifically, the cooling fluid supply port 374, explained later, may communicate with the upper channel 352, explained later, through the cooling fluid guide portion 318 located at the upper side (+Z-axis direction) of the cooling fluid guide portion 318 of the cooling tube 310.

The discharge port body 372 may be coupled with the supply port body 371 at a side opposite to the supply port body 371 with one end (−Y-axis direction) of the cooling tube 310 being interposed therebetween to cover one end (−Y-axis direction) of the cooling tube 310. Here, the discharge port body 372 and the supply port body 371 may be assembled with each other by press hemming.

In the discharge port body 372, a discharge port passing hole 372a through which the cooling fluid discharge port 376, explained later, passes may be formed. The cooling fluid discharge port 376, explained later, may pass through the discharge port passing hole 372a and communicate with the lower channel 354, explained later, through the cooling fluid guide portion 318. Specifically, the cooling fluid discharge port 376, explained later, may communicate with the lower channel 354, explained later, through the cooling fluid guide portion 318 located at the lower side (−Z-axis direction) of the cooling fluid guide portion 318 of the cooling tube 310.

The cooling fluid supply port 374 is provided to the supply port body 371 of the inlet/outlet portion body 370a, and may be connected in communication with the upper channel 352. Here, the cooling fluid supply port 374 may be coupled with the supply port body 371 by caulking. The cooling fluid supply port 374 may be connected in communication with the external cooling line.

The cooling fluid discharge port 376 is provided to the discharge port body 372 of the inlet/outlet portion body 370a, and may be connected in communication with the lower channel 374. Here, the cooling fluid discharge port 376 may be coupled with the discharge port body 372 by caulking. The cooling fluid discharge port 376 is disposed to be spaced apart from the cooling fluid supply port 374 by a predetermined distance, and may be connected in communication with the external cooling line.

Referring to FIG. 2 again, the side structure unit 400 may be made of a plastic resin material, support the battery cells 100, secure rigidity of the battery cells 100, and form a side appearance of the battery pack 1.

Hereinafter, the side structure unit 400 will be described in more detail with reference to the related drawings.

Figure 15:
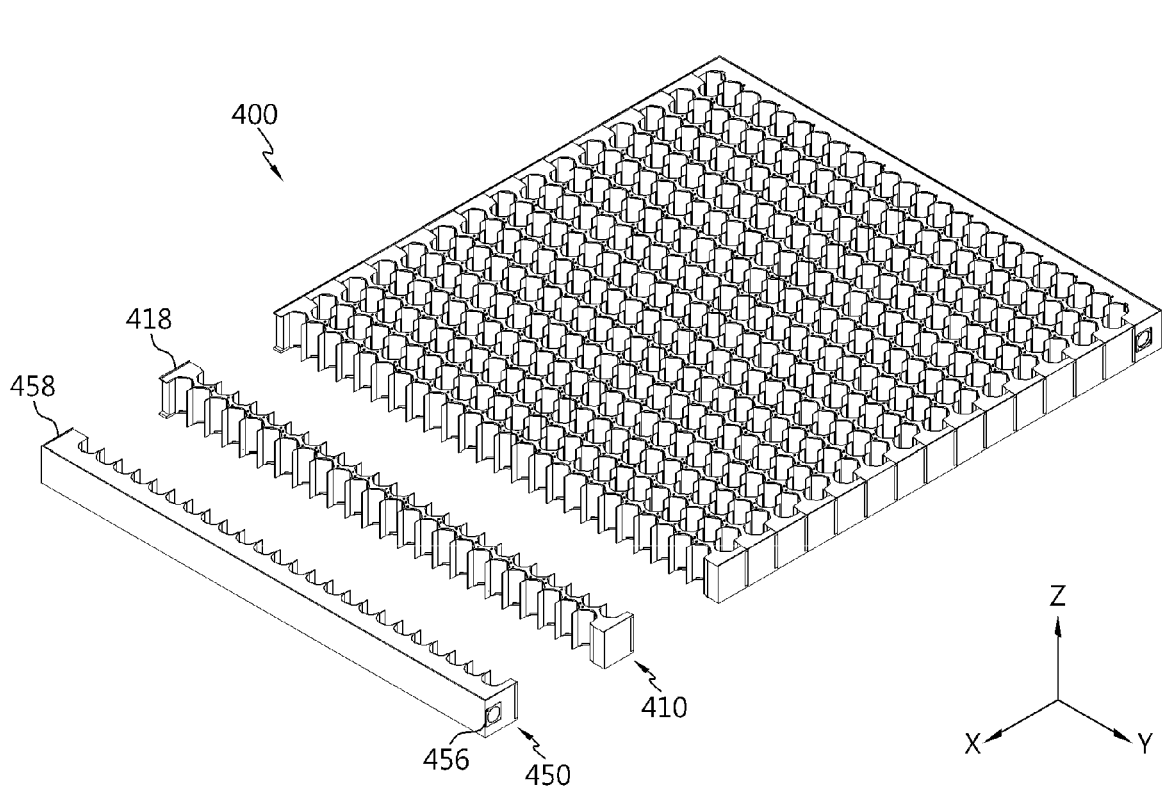
FIG. 15 is a diagram for illustrating a side structure unit of the battery pack of FIG. 2.
Figure 16:
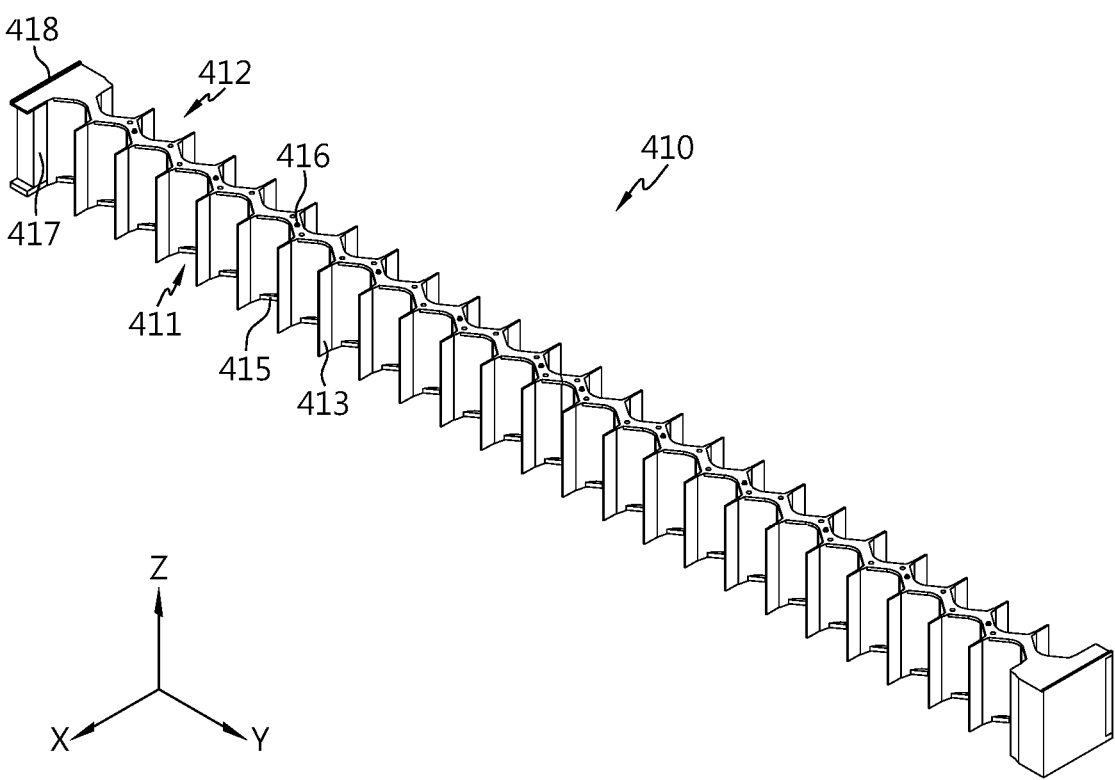
FIG. 16 is a diagram for illustrating a main plate of the side structure unit of FIG. 15.

FIG. 15 is a diagram for illustrating a side structure unit of the battery pack of FIG. 2, and FIG. 16 is a diagram for illustrating a main plate of the side structure unit of FIG. 15.

Referring to FIGS. 15 and 16, the side structure unit 400 may support the battery cells 100, secure the rigidity of the battery cells 100, and form the outer side of the side surface of the battery pack 1 (see FIG. 2) to function as a pack case that forms the appearance of the battery pack 1 (see FIG. 2).

The side structure unit 400 is formed in a predetermined length along the longitudinal direction (Y-axis direction) of the battery pack 1, and may accommodate and support the battery cells 100.

The side structure unit 400 may include a main plate 410 and an end plate 450.

The main plate 410 is formed in a predetermined length along the longitudinal direction (Y-axis direction) of the battery pack 1, and may accommodate the battery cells 100 to be arranged in two rows in the width direction (X-axis direction) of the battery pack 1. The main plate 410 is provided in plural, and the plurality of main plates 410 may be arranged to be spaced apart from each other by a predetermined distance along the width direction (X-axis direction) of the battery pack 1.

The plurality of main plates 410 may secure rigidity of the battery cells 100 and the cooling unit 300, and occupy a predetermined space in the battery pack 1 (see FIG. 2) to reduce the injection amount of the filling member 500, explained later. The filling member 500 made of silicon resin, explained later, has a relatively high cost, and thus it is possible to further secure the cost competitiveness in manufacturing the battery pack 1 by reducing the injection amount of silicon resin through the plurality of main plates 410.

Each of the plurality of main plates 410 may include a first cell accommodation portion 411, a second cell accommodation portion 412, an inter-wing 413, a bottom rib 415, a bus bar guide protrusion 416, a cooling unit insert groove 417, and a guide protrusion 418.

The first cell accommodation portion 411 may be provided at the front side (+X-axis direction) of the main plate 410 along the longitudinal direction (Y-axis direction) of the main plate 410. The first cell accommodation portion 411 may accommodate the plurality of battery cells 100 disposed in the longitudinal direction (Y-axis direction) of the battery pack 1. To this end, the first cell accommodation portion 411 may be provided in plural at the front side (+X-axis direction) of the main plate 410.

Each of the plurality of first cell accommodation portions 411 is provided in a concave shape corresponding to the outer surface of the battery cell 100, and may at least partially surround the outer surface of the battery cell 100.

The second cell accommodation portion 412 may be provided at the rear side (−X-axis direction) of the main plate 410 along the longitudinal direction (Y-axis direction) of the main plate 410. The second cell accommodation portion 412 may accommodate the plurality of battery cells 100 disposed in the longitudinal direction (Y-axis direction) of the battery pack 1. To this end, the second cell accommodation portion 412 may be provided in plural at the rear side (−X-axis direction) of the main plate 410.

Each of the plurality of second cell accommodation portion 412 is provided in a concave shape corresponding to the outer surface of the battery cell 100, and may at least partially surround the outer surface of the battery cell 100.

The plurality of second cell accommodation portions 412 may be arranged alternately with the plurality of first accommodation portions 411 in the front and rear direction (X-axis direction) of the main plate 410 to accommodate the battery cells 100 provided as the cylindrical secondary batteries as much as possible.

The inter-wing 413 is provided in plural, and the plurality of inter-wings 413 may be formed to protrude along the width direction (X-axis direction) of the main plate 410 to partition the plurality of first and second accommodation portions 411, 412 from each other. Specifically, the plurality of inter-wings 413 may be formed at both the front side (+X-axis direction) and the rear side (−X-axis direction) of the main plate 410 along the width direction (X-axis direction). More specifically, among the plurality of inter-wings 413, the inter-wings 413 protruding at the front side (+X-axis direction) of the main plate 410 may partition the plurality of first cell accommodation portions 411, and among the plurality of inter-wings 413, the inter-wings 413 protruding at the rear side (−X-axis direction) of the main plate 410 may partition the plurality of second cell accommodation portions 412.

The bottom rib 415 is provided at the bottom portion of the main plate 410, and when the battery cells 100 are accommodated in the main plate 410, the bottom rib 415 may support the bottom portion of the battery cells 100.

The bottom rib 415 may be formed to protrude in the lower direction (−Z-axis direction) further to the bottom portion of the battery cells 100 when the battery cells 100 are accommodated in the main plate 410.

The bus bar guide protrusion 416 is for fixing the connection bus bar unit 230 when assembling the bus bar assembly 200 and is provided to the upper surface of the main plate 410, and one bus bar guide protrusion 416 or a plurality of bus bar guide protrusions 416 may be provided. Hereinafter, in this embodiment, it will be described that the bus bar guide protrusion 416 is provided in plural.

When assembling the bus bar assembly 200, the plurality of bus bar guide protrusions 416 may be inserted into the guide hole 246 of the bus bar cover 240 to guide the correct positioning of the connection bus bar unit 230. Since the connection bus bar unit 230 is inserted and fixed or coupled into the plurality of bus bar guide protrusions 416, the welding process or the like for electrical connection of the bus bar assembly 200 may be performed more stably, and during the welding process, the welding quality may be further enhanced.

The cooling unit insert groove 417 is for accommodating the end of the cooling unit 300, and may be provided at the end of the main plate 410 in the longitudinal direction (Y-axis direction). The end of the cooling unit 300 may be fixed more stably since it is disposed in the cooling unit insert groove 417 when the main plates 410 are coupled.

The guide protrusion 418 may be provided to protrude to a predetermined height at both upper ends along the longitudinal direction (Y-axis direction) of the main plate 410. When the side structure unit 400 is completely assembled by coupling the main plates 410 and the end plate 450, explained later, the guide protrusion 418 may form the edge of the side structure unit 400 together with an end guide protrusion 458 of the end plate 450, explained later.

The end plate 450 is provided as a pair, and the pair of end plates 450 may be provided at both outermost sides in the width direction (X-axis direction) of the side structure unit 400. The pair of end plates 450 may accommodate and support the battery cells 100 together with the main plate 410 disposed at the opposite side.

The pair of end plates 450 may have a terminal hole 456 and an end guide protrusion 458.

The terminal hole 456 is for accommodating the connector terminal 290, and may be provided at one end of the end plate 450.

The end guide protrusion 458 is formed along the upper edge of the end plate 450, and may be provided to protrude at the same height as the guide protrusion 418. The end guide protrusion 458 may form the edge of the side structure unit 400 together with the guide protrusion 418 of the main plates 410 when the side structure unit 400 is completely assembled.

Hereinafter, the coupling structure of the battery cells 100 and the cooling units 300 through the side structure unit 400 will be described in more detail.

Figure 17:
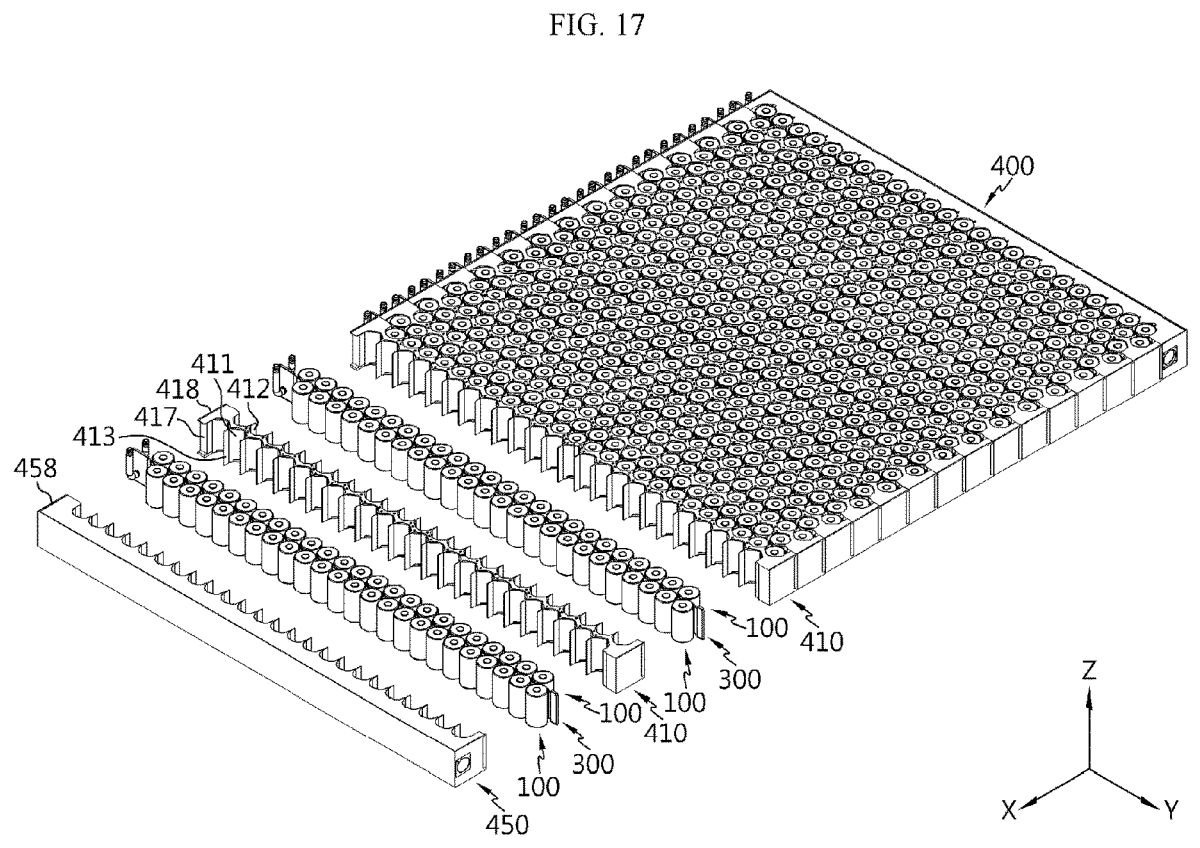
Figure 18:
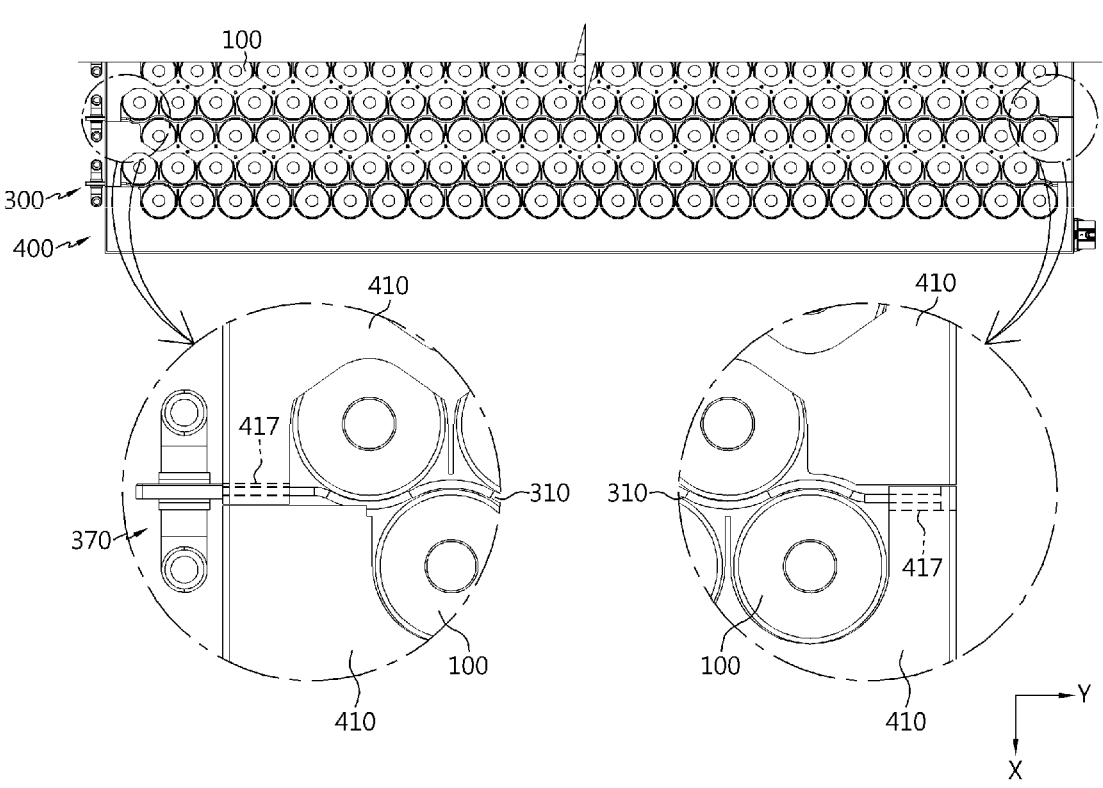

FIGS. 17 and 18 are diagrams for illustrating a coupling structure between the battery cells and the cooling units through the side structure unit of FIG. 15.

Referring to FIGS. 17 and 18, first, the cooling tube 310 of the cooling unit 300 may be inserted between the battery cells 100 arranged in two front and rear rows along the width direction (X-axis direction) of the battery pack 1 (see FIG. 2) among the battery cells 100. The side structure unit 400 may accommodate the battery cells 100 facing each other in the front and rear direction (X-axis direction) of the battery cells 100 between which the cooling tube 310 is inserted.

Specifically, in the width direction (X-axis direction) of the battery pack 1 (see FIG. 2), the end plate 450 disposed at the outermost side, the battery cells 100, the cooling tube 310, the battery cells 100, and the main plate 410 are arranged, and then, the battery cells 100, the cooling tube 310, the battery cells 100, and the main plate 410 may be arranged in order and coupled. After that, in the width direction (X-axis direction) of the battery pack 1 (see FIG. 2), the end plate 450 disposed at the opposite outermost side may be finally disposed and coupled to complete the coupling of the side structure unit 400 so that the battery cells 100 and the cooling units 300 may be accommodated in the side structure unit 400.

Here, both ends of the cooling unit 300 may be inserted into the cooling unit insert groove 417 when the main plates 410 are coupled and the main plate 410 and the end plate 450 are coupled, thereby preventing interference with the cooling unit 300 while fixing the cooling unit 300 more stably.

Meanwhile, the cooling fluid inlet/outlet portion 370 provided at one end of the cooling units 300 may be disposed to protrude out of the side structure unit 400 for connection with an external cooling line or the like.

The side structure unit 400 according to this embodiment may form a side outer structure of the battery pack 1 (see FIG. 2) by coupling the main plates 410 and the end plates 450 to each other while accommodating the battery cells 100 and the cooling units 300. That is, the side structure unit 400 may function as a pack case that forms the appearance of the battery pack 1.

Accordingly, the battery pack 1 (see FIG. 1) according to this embodiment may omit a separate additional pack case or pack housing structure by means of the side structure unit 400, thereby lowering the manufacturing cost and reducing the overall size of the battery pack 1 while further including the energy density.

Figure 19:
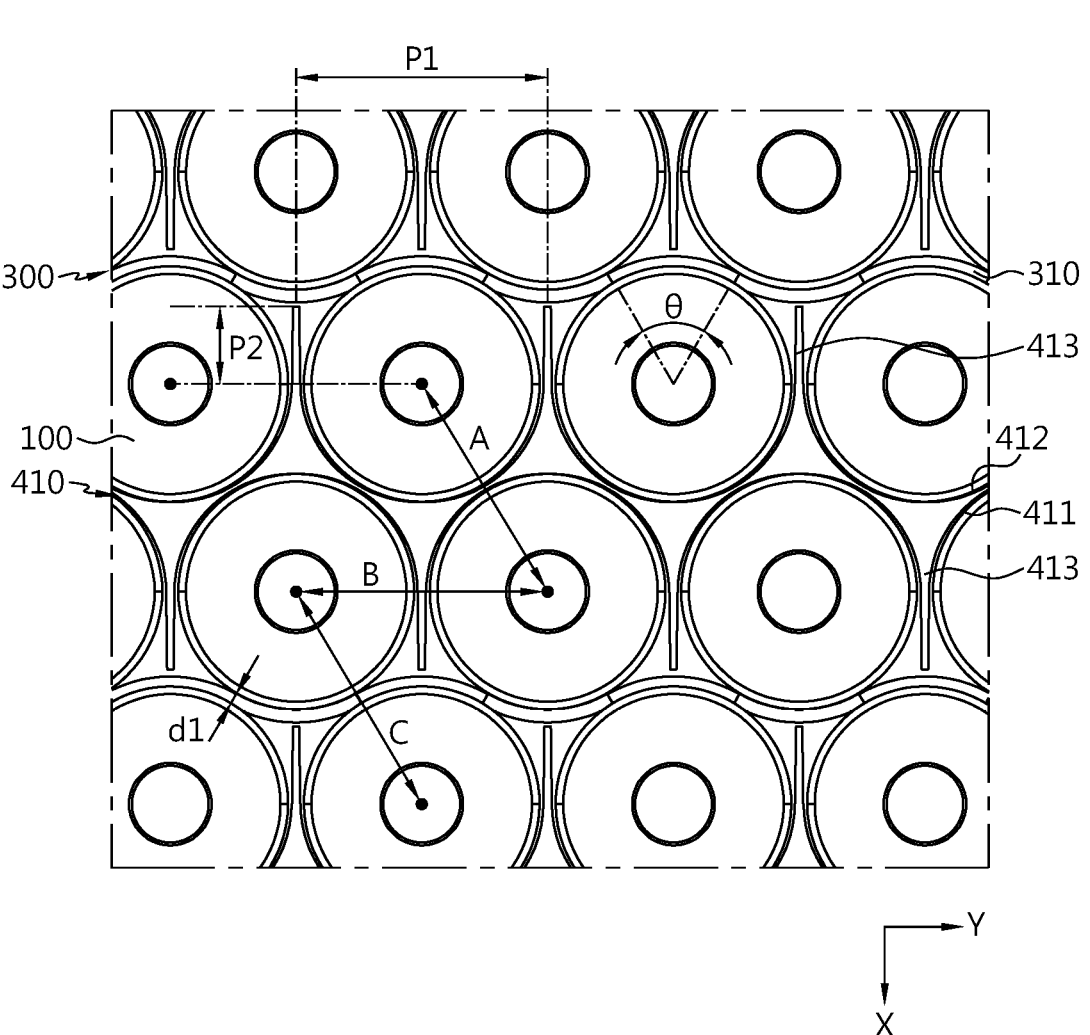
FIGS. 19 and 20 are diagrams for illustrating an arrangement relationship of the battery cells and the cooling units through the side structure unit of FIG. 15.
Figure 20:
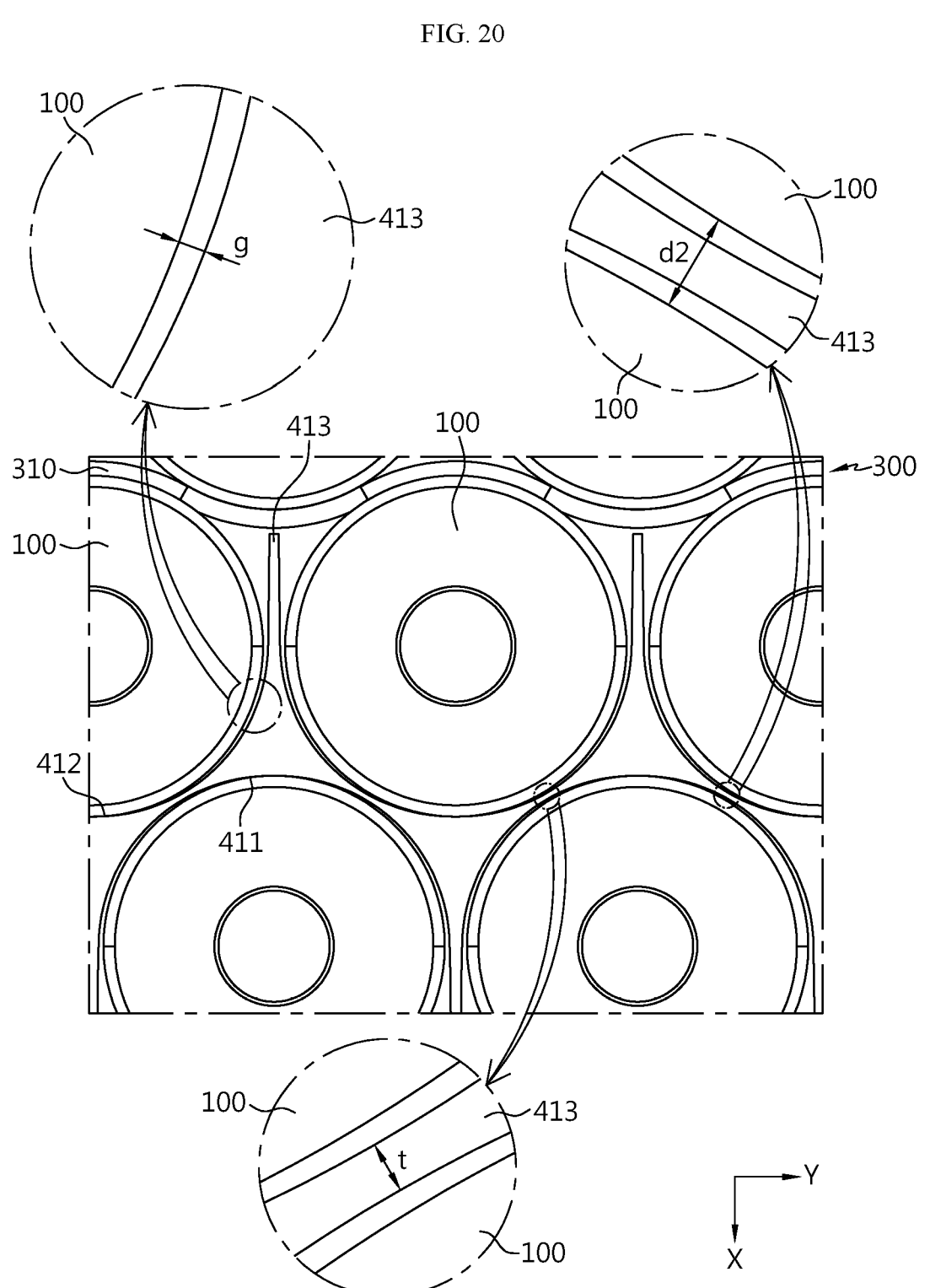

FIGS. 19 and 20 are diagrams for illustrating an arrangement relationship of the battery cells and the cooling units through the side structure unit of FIG. 15.

Referring to FIGS. 19 and 20, the distance A between the centers of the battery cells 100 provided between the first cell accommodation portion 411 and the second cell accommodation portion 412 of the main plate 410 is a distance set for close contact with the main plate 410, and may be changed according to the thickness of the main plate 410.

In addition, the distance B between the centers of the adjacent battery cells 100 in contact with one surface of the cooling tube 310 is a distance set to make a contact angle of the battery cells 100 and the cooling tube 310 as a predetermined angle, for example 60 degrees, and may be changed in conjunction with the distance C, explained later. The distance C between the centers of the battery cells 100 disposed to face each other with the cooling tube 310 interposed therebetween is a distance reflecting the thickness of the cooling tube 310, and may be determined in conjunction with the distance B between the centers of the adjacent battery cells 100 in contact with one side of the cooling tube 310.

The distances A to C may be set as optimal distances for closer adhesion among the battery cells 100, the cooling tube 310 and the side structure unit 400. Specifically, the optimal distance may be determined in consideration of the diameter of the battery cells 100, the thickness of the cooling tube 310, and the contact angle ($\theta$) between the battery cell 100 and the cooling tube 310, and the like. For example, in this embodiment, the diameter of the battery cells 100 may be provided as 46 mm, and the thickness of the cooling tube 310 may be provided as 2.5 mm.

Meanwhile, the optimal distance may mean a distance when the contact angle ($\theta$) between the battery cell 100 and the cooling tube 310 is 600 or thereabouts. Here, the pitch (P1) between the contact parts of the cooling tube 310 may be linked with the spacing of the battery cells 100, and in this embodiment, the pitch (P1) may be provided as 49 mm.

The distance (d1) between the battery cells 100 placed to face each other in a diagonal direction with the cooling tube 310 being interposed therebetween may be determined in conjunction with the assembling property between the battery cells 100 and the cooling tube 310, the thickness of the cooling tube 310 and the cooling tube 310, the thickness of a coating agent or glue for adhesion between battery cells 100, and the like. For example, the distance (d1) may be prepared in consideration of both the thickness of the cooling tube 310 and the thickness of the coating agent or glue coated on both sides of the cooling tube 310. Specifically, when the thickness of the cooling tube 310 is 2.5 mm, the thickness of the coating agent (e.g., epoxy coating) is 0.25 mm at the maximum, and the thickness of the glue is 0.1 mm, the distance (d1) may be prepared in consideration of all of the thickness (2.5 mm) of the cooling tube 310, and the thickness (2*0.25 mm) of the coating agent and the thickness (2*0.1 mm) of the glue applied to both sides of the cooling tube 310.

Meanwhile, the end of the inter-wing 413 provided between the first cell accommodation portion 411 and the second accommodation portion 412 of the main plates 410 may be formed shorter than one surface of the battery cells 100 in contact with the cooling tube 310 in order to prevent interference with the cooling tubes 310 facing the main plates 410.

For example, the distance (P2) between the end of the inter-wing 413 of the main plate 410 and the center of the battery cell 100 may be prepared as a distance capable of avoiding interference with the cooling tube 310 in consideration of the diameter of the battery cells 100, the thickness of the cooling tube 310, or the like. For example, the distance (P2) between the end of the inter-wing 413 and the center of the battery cell 100 may be provided as 15 mm.

Meanwhile, thicknesses of the first cell accommodation portion 411 and the second cell accommodation portion 412 of the main plate 410 may be prepared in consideration of the assembling properties with the battery cells 100.

Specifically, the thickness of the first cell accommodation portion 411 and the second cell accommodation portion 412 of the main plate 410 may be prepared in consideration of the distance (d2) between the battery cells 100, and the minimum thickness (t) of the first cell accommodation portion 411 and the second cell accommodation portion 412 may be approximately half of the distance (d2) between the battery cells 100. For example, in this embodiment, the distance (d2) between the battery cells 100 may be provided as 1.5 mm, and the minimum thickness (t) of the first cell accommodation portion 411 and the second cell accommodation portion 412 may be provided as approximately 0.75 mm, specifically 0.7 mm.

Accordingly, when the battery cells 100 are accommodated in the first cell accommodation portion 411 and the second cell accommodation portion 412 of the main plate 410, a predetermined gap space g may be formed at the first cell accommodation portion 411 and the second cell accommodation portion 412.

When the battery cells 100 are respectively accommodated in the cell accommodation portions 411, 412, the gap space g may be formed in the remaining region except for the innermost partial region of the concave shape of the first cell accommodation portion 411 and the second cell accommodation portion 412. Here, the innermost partial region of the concave shape of the first cell accommodation portion 411 and the second cell accommodation portion 412 may refer to an area disposed opposite to the protruding portion of the inter-wing 413 on the inner surface of the concave shape of the first cell accommodation portion 411 and the second cell accommodation portion 412.

Accordingly, when the battery cells 100 are accommodated in the first cell accommodation portion 411 and the second cell accommodation portion 412 of the main plate 410, the battery cells 100 contact the inner surfaces of portion 411 and the second cell accommodation portion 412 only in the innermost partial region of the concave shape, and may be spaced apart by the gap space g in the inner surfaces of the first cell accommodation portion 411 and the second cell accommodation portion 412 other than the innermost partial region of the concave shape. Meanwhile, the innermost partial region of the concave shape in contact with the battery cells 100 may be coated with an adhesive that is bonded to the battery cells 100.

In addition, when the battery cells 100 are accommodated in the first cell accommodation portion 411 and the second cell accommodation portion 412 of the main plate 410, the inter-wing 413 may also be disposed to be spaced apart from the battery cells 100 by the gap space g.

In this embodiment, through the gap space g as above, when assembling the battery cells 100 and the main plate 410, specifically, when the battery cells 100 are accommodated in the first cell accommodation portion 411 and the second cell accommodation portion 412, it is possible to remarkably improve the assembly performance by preventing the battery cells 100 from interfering or colliding with the first cell accommodation portion 411, the second cell accommodation portion 412, the inter-wing 413, or the like.

In addition, in this embodiment, through the gap space g, the assembly tolerance of components may be absorbed to a large extent, and thus it is also possible to significantly reduce problems such as misassembly or assembly defect caused by the assembly tolerance or the like.

Moreover, the gap space g may be filled with the filling member 500, explained later. Since the filling member 500 is filled in the gap space g as described above in this embodiment, the filling amount of the filling member 500 between the battery cells 100 may be further secured.

Therefore, in this embodiment, through the filling member 500 filled in the gap space g, the battery cells 100 may be more stably supported in the first cell accommodation portion 411 and the second cell accommodation portion 412 of the main plate 410.

Moreover, through the filling member 500 filled in the gap space g, when an event such as thermal runaway occurs at the battery cells 100, electric connection or thermal runaway to adjacent battery cells 100 may be more effectively prevented.

Figure 21:
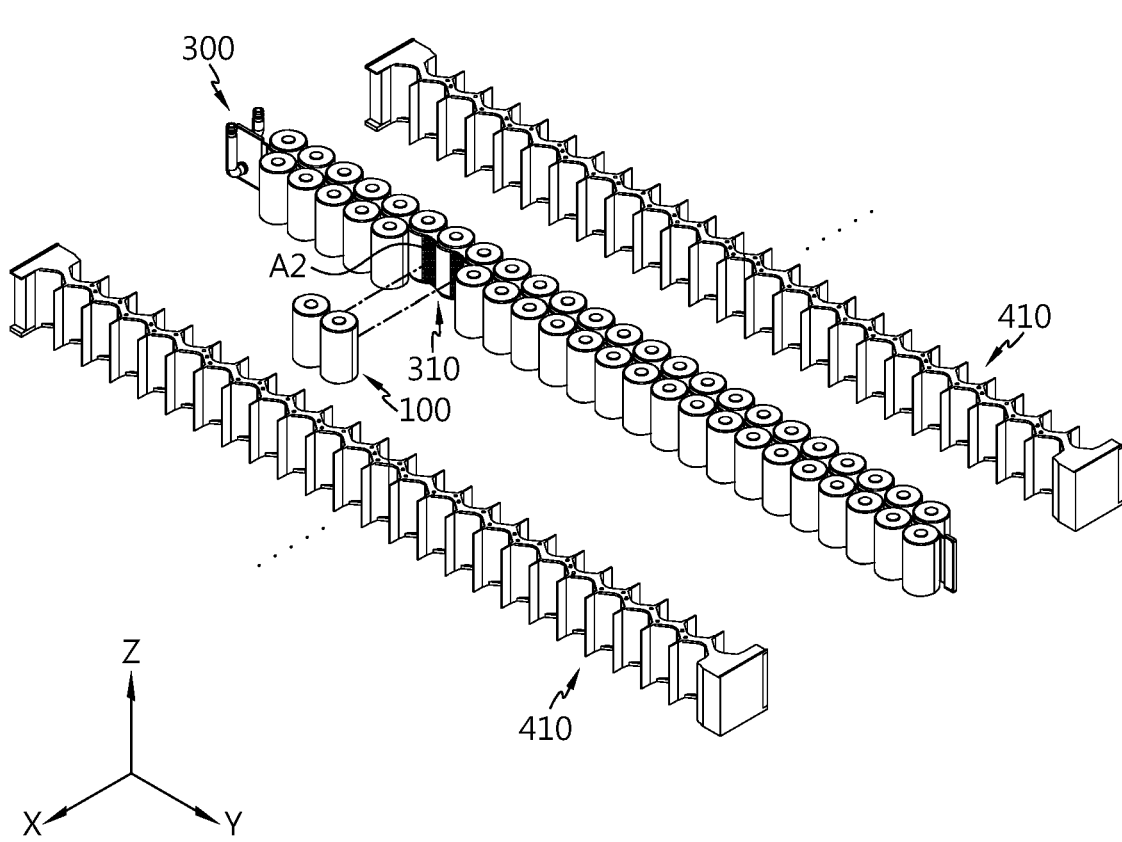
FIGS. 21 to 23 are diagrams for illustrating a contact structure of the battery cells of FIG. 20 with the cooling units.
Figure 22:
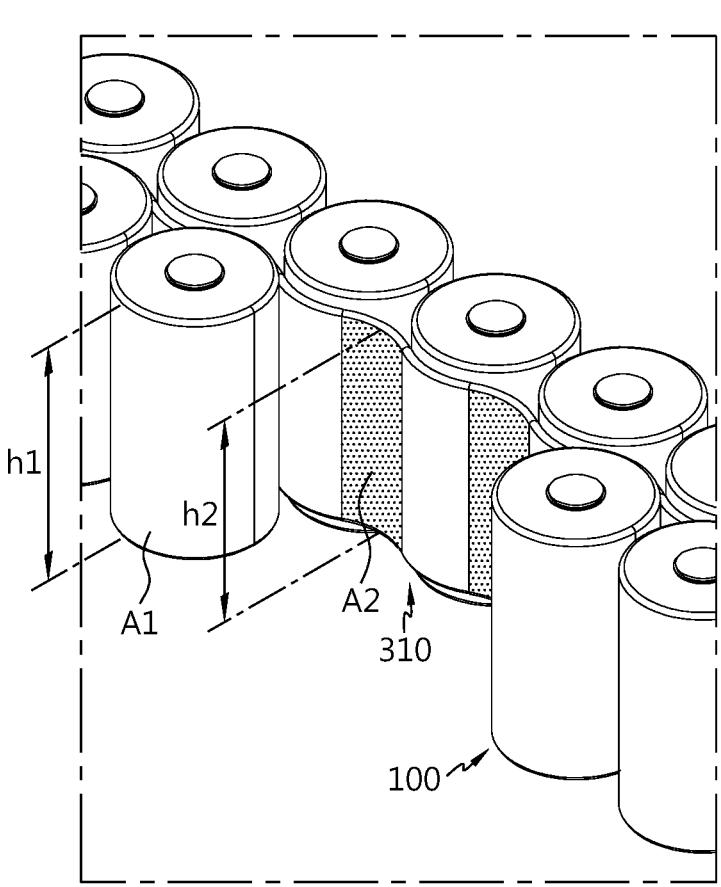
Figure 23:
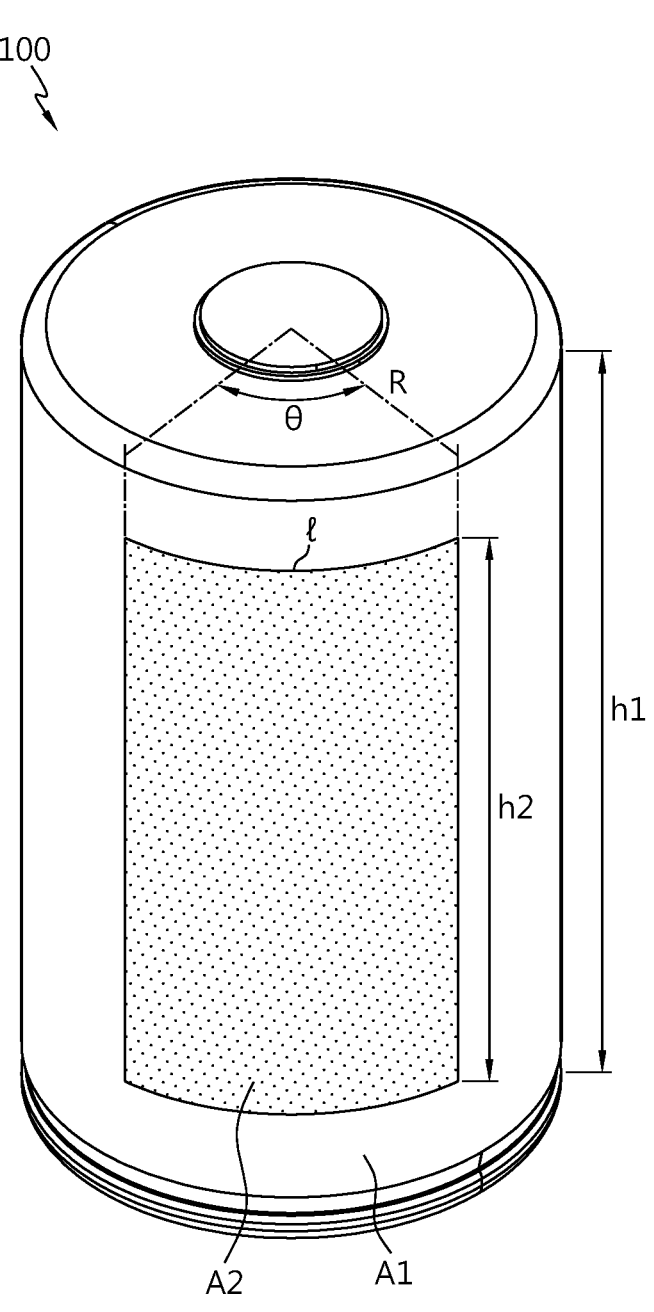

FIGS. 21 to 23 are diagrams for illustrating a contact structure of the battery cells of FIG. 20 with the cooling units.

Referring to FIGS. 21 to 23, the outer surface of the battery cells 100 may be in contact with the cooling tube 310 of the cooling unit 300 in the height direction (Z-axis direction). Here, the contact area (A2) between the battery cells 100 and the cooling tube 310 may be determined according to the contact angle (θ) between the battery cell 100 and the cooling tube 310, the height (h2) of the cooling tube 310, or the like in consideration of assembly property, optimal cooling performance, or the like.

In this embodiment, the contact area (A2) of the cooling tube 310 of the battery cell 100 may be in the range of approximately 14% to 15% of the total area (A1) of the outer surface of the battery cell 100.

For example, in this embodiment, the radius (R) of the battery cell 100 may be 23 mm, the height (h1) may be 80 mm, the height (h2) of the cooling tube 310 may be 70 mm, and the contact angle (θ) between the battery cell 100 and the cooling tube 310 may be 60°. In this case, the total area (A1) of the outer surface of the battery cell 100 may be determined as the product of the circumferential length (2πR), namely the base length (2πR), and the outer side height (h1) of the battery cell 100. Accordingly, the total area (A1) of the outer surface of the battery cells 100 may be 0.368 πm², and when π is replaced with 3.14, it may be approximately 1.16 m². In addition, the contact area (A2) of the cooling tube 310 of the battery cell 100 may be determined as the product of the arc length (l) according to the contact angle (θ) and the height (h2) of the cooling tube 310. Here, the arc length (l) may be derived using the following equation.

$$l = 2\pi R \times \frac{\theta}{360} \qquad \text{[Equation 1]}$$

Accordingly, the arc length (l) may be approximately 0.077 πm, and if π is substituted with 3.14, it may be approximately 0.242 m. Accordingly, the contact area (A2) of the cooling tube 310 of the battery cell 100 may be approximately 0.169 m² by multiplying the arc length (l) by 70 mm, which is the height (h2) of the cooling tube 310.

As described above, in this embodiment, the contact area (A2) of the cooling tube 310 of the battery cell 100 may be provided in the range of approximately 14.5% of the total area (A1) of the outer surface of the battery cell 100 so as to secure the optimal cooling performance and also the assembly property with the cooling tube 310.

In embodiments, the height (h1) of the battery cell 100 is greater than the height (h2) of the cooling tube 310 to avoid contact between the cooling tube 310 and the connection bus bar unit 230 in order to prevent possibility of a short between the cooling tube 310 and the connection bus bar unit 230.

Figure 24:
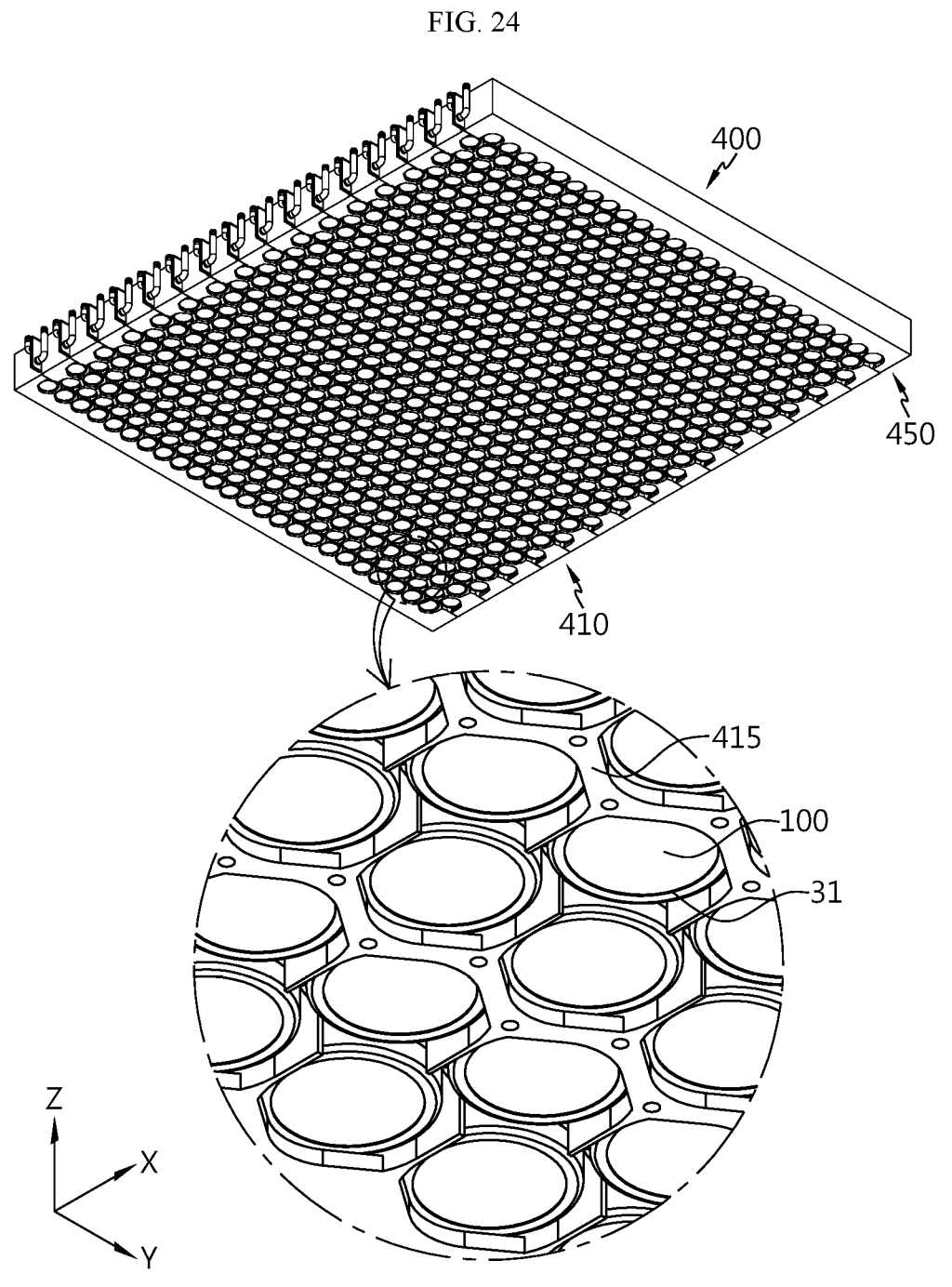
Figure 25:
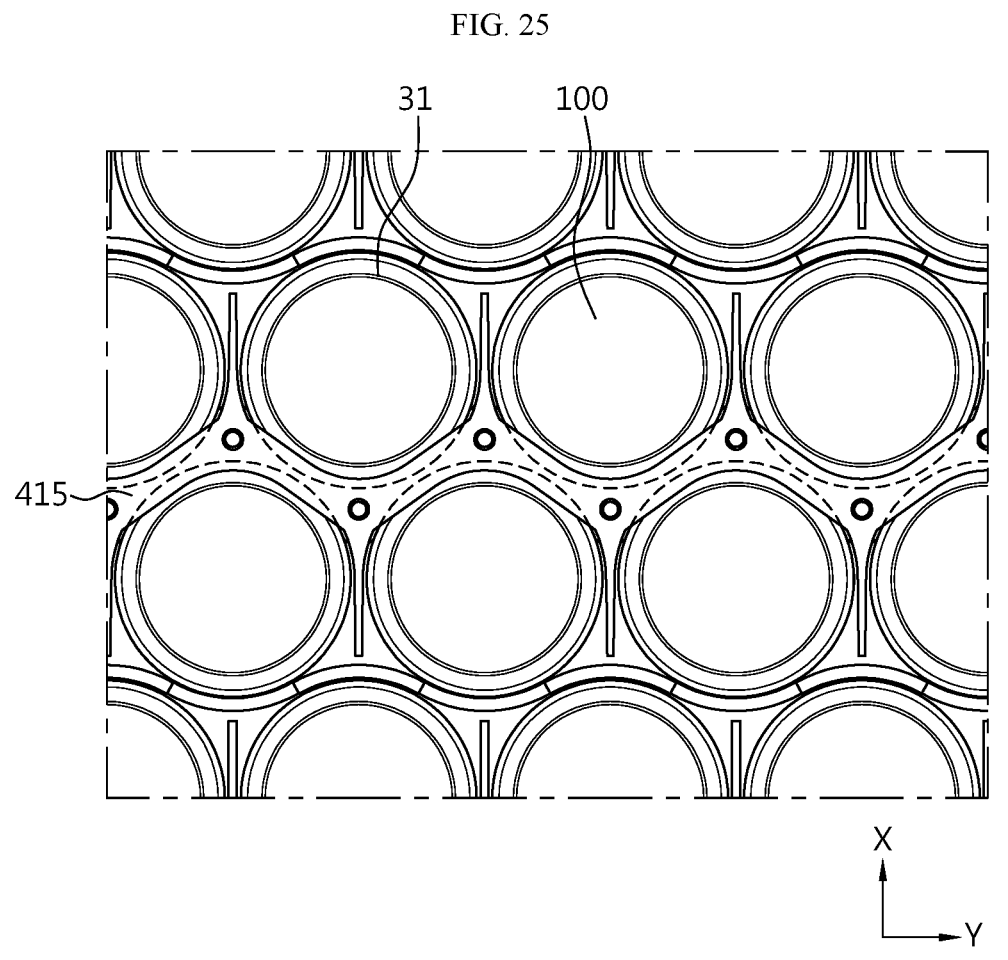
Figure 26:
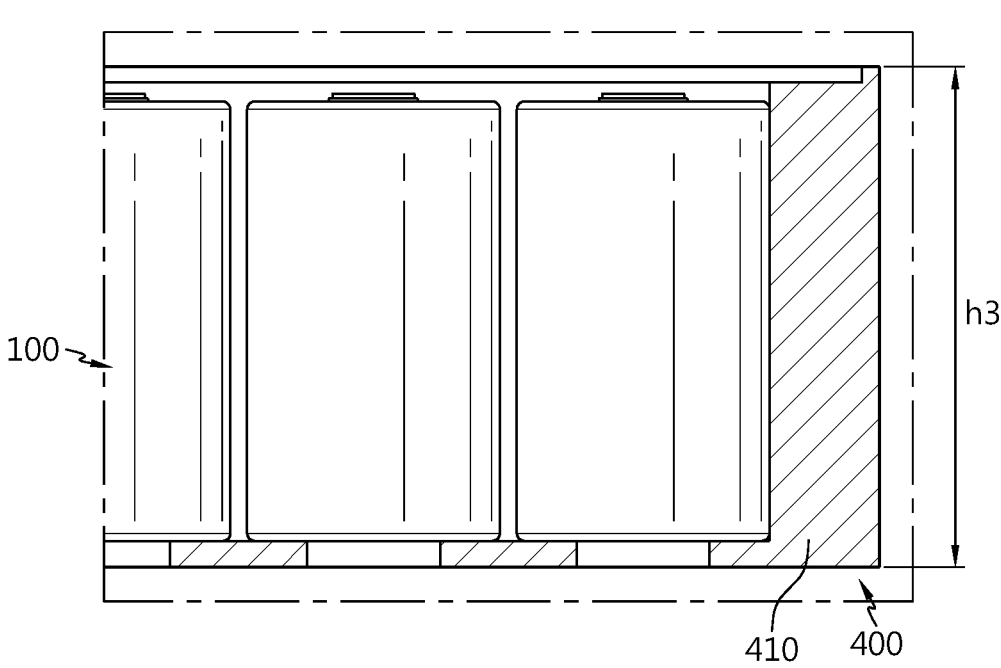
FIG. 26 is a side view showing a main part of the side structure unit of FIG. 24.

FIG. 24 is a bottom view showing the side structure unit when the side structure unit of FIG. 15 is coupled to the battery cells, FIG. 25 is an enlarged bottom view showing a main part of the side structure unit of FIG. 24, and FIG. 26 is a side view showing a main part of the side structure unit of FIG. 24.

Referring to FIGS. 24 to 26, the bottom rib 415 of the side structure unit 400 may be provided protrude downward (−Z-axis direction) further to the bottom portion of the battery cells 100, without interfering with the venting portion 31 of the battery cells 100. Accordingly, when gas is discharged through the venting portion 31 due to overheating of the battery cells 100, the gas may be discharged more quickly without interference of the bottom rib 415.

Moreover, the bottom rib 415 may be provided to cover one side of the bottom portion of the battery cells 100, so that when the battery cells 100 may be fixed in the side structure unit 400 more firmly when being accommodated in the side structure unit 400.

As a result, the height (h3) of the side structure unit 400 may be provided to be greater than the height of the battery cells 100 so as to cover both the upper and lower sides of the battery cells 100 in the height direction (Z-axis direction). For example, in this embodiment, since the height of the battery cells 100 is 80 mm, the height (h3) of the side structure unit 400 may be longer than the height (h3) of the battery cells 100 at both upper and lower sides of the battery cells 100.

Moreover, the height (h3) of the side structure unit 400 may be provided as a height that may cover up to the thickness of the bus bar assembly 200 and the filling member 500 placed on the battery cells 100. Specifically, the height (h3) of the side structure unit 400 may be provided in the range of approximately 85 mm and 95 mm in consideration of all of them. More specifically, the height (h3) of the side structure unit 400 may be provided as 90.3 mm, and approximately 90 mm.

Referring to FIG. 2 again, the filling member 500 may be filled in a space between the cooling unit 300 and the plurality of battery cells 100 in the height direction (Z-axis direction) of the battery pack 1. Meanwhile, in FIG. 2, the filling member 500 is indicated by a dotted line in a hexahedral shape for convenience of understanding, and the filling member 500 may be filled in the entire space between the cooling unit 300 and the plurality of battery cells 100.

The filling member 500 may cover the upper side and the lower side of the battery pack 1 (see FIG. 2) to form a pack case structure of the battery pack 1 together with the side structure unit 400.

In addition, the filling member 500 may more stably fix the plurality of battery cells 100 and increase heat dissipation efficiency of the plurality of battery cells 100 to further improve the cooling performance of the battery cells 100.

The filling member 500 may be made of a potting resin. The potting resin may be formed by injecting a dilute resin material into the plurality of battery cells 100 and curing the same. Here, the injection of the resin material may be performed at a room temperature of approximately 15° C. to 25° C. to prevent thermal damage to the plurality of battery cells 100.

Specifically, the filling member 500 may be made of a silicon resin. The present disclosure is not limited thereto, and the filling member 500 may be made of other resin materials that may improve the fixing and heat dissipation efficiency of the battery cells 100, in addition to the silicon resin.

More specifically, since the filling member 500 covers the portion of the battery cells 100 not in contact with the cooling tube 310, the filling member 500 may guide the thermal equilibrium of the battery cells 100 and prevent the cooling deviation of the battery cells 100, thereby preventing local degradation of the battery cells 100. In addition, the safety of the battery cells 100 may also be significantly improved by preventing local degradation of the battery cells 100.

In addition, the filling member 500 may perform an insulating role of preventing electric connection to adjacent battery cells 100 when at least one specific battery cell 100 is damaged due to an abnormal situation among the plurality of battery cells 100.

In addition, the filling member 500 may include a material having high specific heat performance. Accordingly, the filling member 500 may increase the thermal mass to delay the temperature rise of the battery cells 100 even in situations such as rapid charging and discharging of the battery cells 100, thereby preventing the rapid temperature rise of the battery cells 100.

In addition, the filling member 500 may include a glass bubble. The glass bubble may lower the specific gravity of the filling member 500 to increase the energy density relative to weight.

In addition, the filling member 500 may include a material having high heat resistance. Accordingly, when a thermal event caused by overheating occurs in at least one specific battery cell 100 among the plurality of battery cells 100, the filling member 500 may effectively prevent thermal runaway toward adjacent battery cells.

In addition, the filling member 500 may include a material having a high flame retardant performance. Accordingly, when a thermal event caused by overheating occurs in at least one specific battery cell 100 among the plurality of battery cells 100, the filling member 500 may minimize the risk of fire occurrence.

The filling member 500 may also be filled in the bus bar assembly 200 in addition to the battery cells 100. Specifically, the filling member 500 may be filled in the bus bar assembly 200 to cover the upper side of the bus bar assembly 200.

Here, the filling member 500 may be filled continuously between the bus bar assembly 200 and the battery cells 100 in the upper and lower direction (Z-axis direction) of the battery cells 100, without an isolated space or a separated space between the bus bar assembly 200 and the battery cells 100.

Since the filling member 500 according to this embodiment is continuously filled without interruption in the battery cells 100 and the bus bar assembly 200, it is possible to realizing even heat dissipation without causing heat dissipation deviation in the area between the battery cells 100 and the bus bar assembly 200, thereby significantly improving the cooling performance of the battery pack 1.

Moreover, the filling member 500 may be filled in a portion other than the outer side of the side surface of the side structure unit 400. Here, the filling member 500 may be continuously filled in the battery cells 100, the bus bar assembly 200 and the side structure unit 400 without interruption. Accordingly, the cooling performance of the battery pack 1 may be further improved.

Hereinafter, the formation of the pack case structure through the injection of the filling member 500 will be described in more detail.

Figure 27:
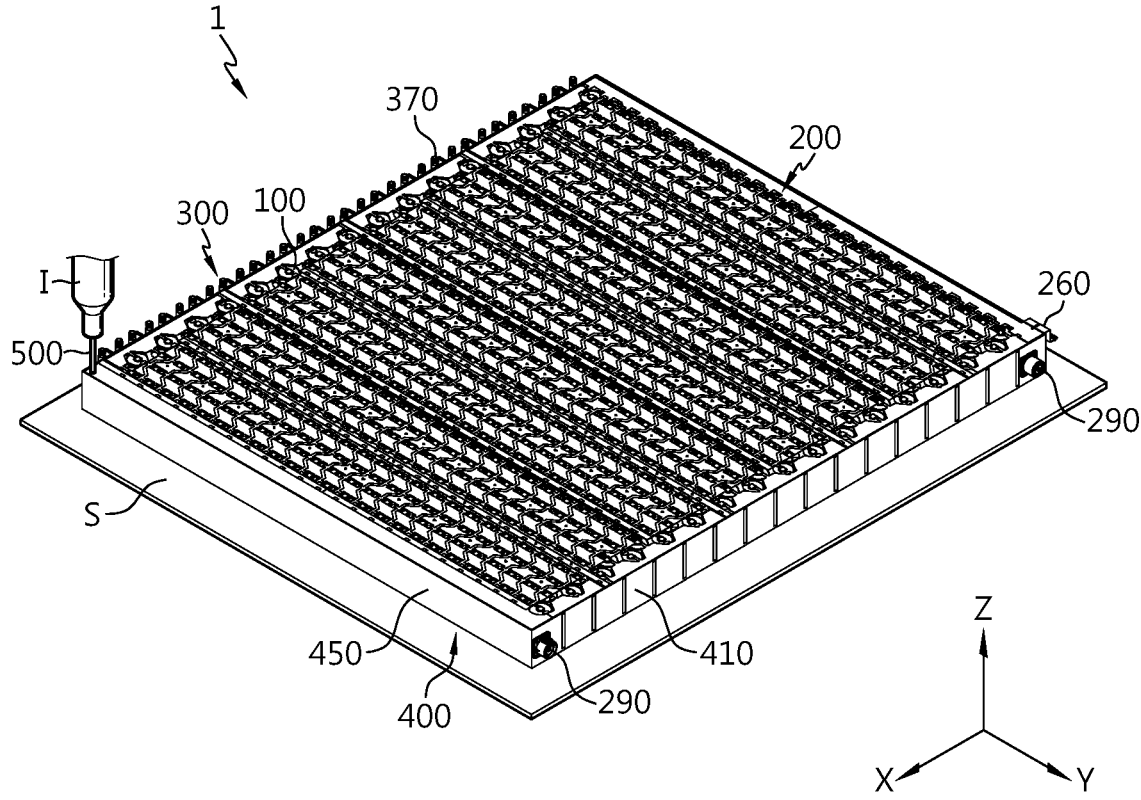
FIGS. 27 to 29 are diagrams for illustrating the formation of a pack case structure by injecting a filling member into the battery pack of FIG. 2.
Figure 28:
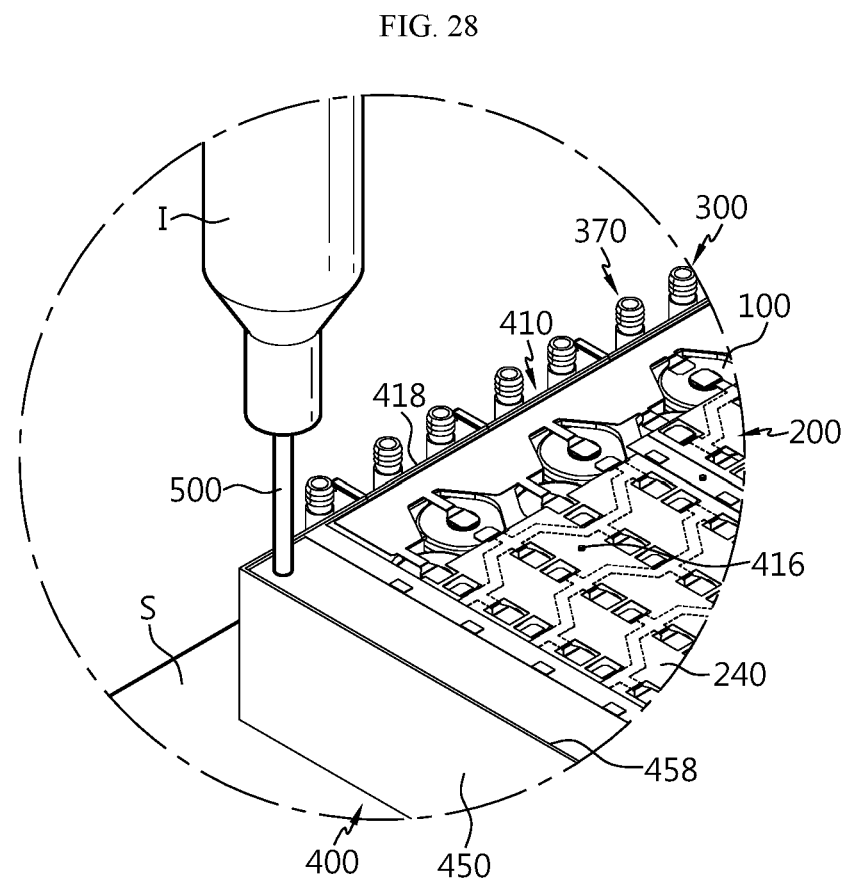
Figure 29:
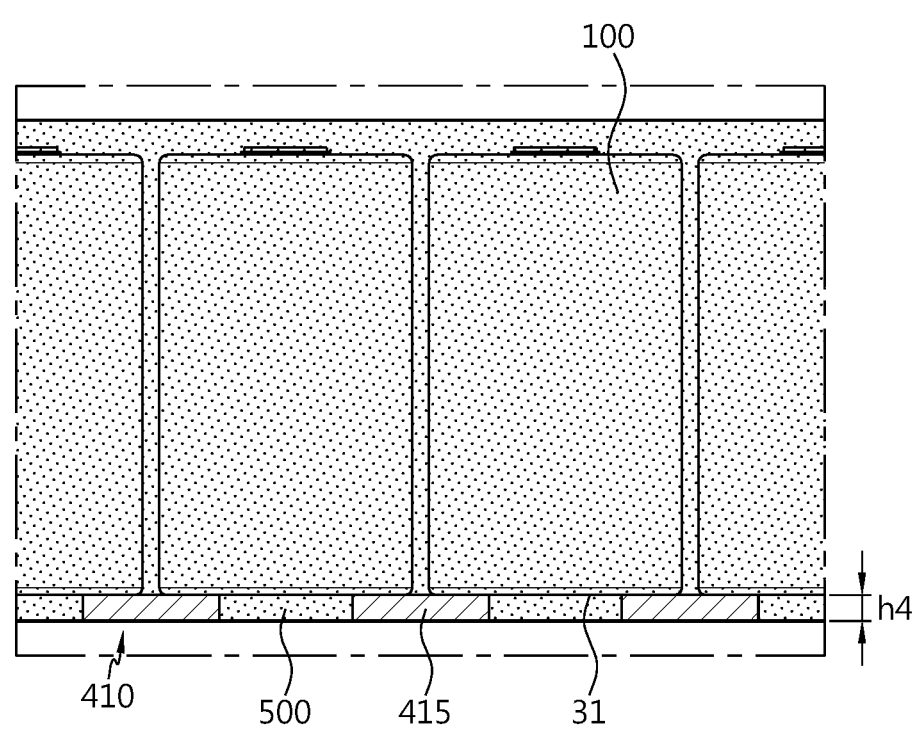

FIGS. 27 to 29 are diagrams for illustrating the formation of a pack case structure by injecting a filling member into the battery pack of FIG. 2.

Referring to FIGS. 27 to 29, a manufacturer or the like may inject and apply the filling member 500 provided as the silicon resin by using a resin injection device I to form the pack case structure of the upper side and the lower side of the battery pack 1 (see FIG. 2) by means of the filling member 500 provided as the resin material. Specifically, the filling member 500 may be filled up to the protrusion height h4 of the bottom rib 415 while covering the upper side of the bus bar assembly 200 in the upper direction (+Z-axis direction) of the battery pack 1 and covering the lower side of the battery cells 100 in the lower direction (−Z-axis direction) of the battery pack 1. Here, the protrusion height h4 of the bottom rib 415 may be designed to a predetermined height in consideration of the injection amount of the filling member 500.

In the injection and coating process of the filling member 500 by using the resin injection device I, an injection guider S may be provided to the bottom portion of the side structure unit 400 in order to prevent resin leakage in the lower direction (−Z-axis direction) when the filling member 500 is injected. The injection guider S may be made of a Teflon material or the like for easy detachment after the filling member 500 is cured.

In the injection and coating process of the filling member 500, the side structure unit 400 may serve as a mold for preventing the resin leaking while supporting the battery cells 100 and the cooling unit 300 together with the injection guider S.

Accordingly, in this embodiment, by means of the side structure unit 400, during the injection and coating process of the filling member 500, an additional injection guiding jig structure in the side direction is not required, thereby significantly improving working efficiency while reducing the manufacturing cost.

Moreover, since the side structure unit 400 guides the accurate arrangement of the connection bus bar unit 230 by means of the bus bar guide protrusion 416 inserted into the connection bus bar unit 230, it is possible to effectively prevent the connection bus bar unit 230 from being twisted or misaligned when the filling member 500 is injected.

In addition, by means of the guide protrusion 418 and the end guide protrusion 458 formed at the edge of the upper surface of the side structure unit 400, when the filling member 500 is injected, the injection accuracy of the filling member 500 is increased, so that the filling member 500 may be easily injected to cover the bus bar assembly 200 more securely, and it is also possible to effectively prevent the filling member 500 from overflowing.

Here, the side structure unit 400 exposes components such as the interconnection board 260, the connector terminal 290 and the cooling fluid inlet/outlet portion 370, which are connected to an external device, and thus a problem such as interference with these components may not occur while injecting or applying the filling member 500.

Accordingly, in this embodiment, since a pack case structure of the battery pack 1 (see FIG. 1) is formed by means of the side structure unit 400 and the filling member 500, the assembly process of the battery pack 1 may be simplified compared to the prior art where the pack case structure is formed as a complicated assembly of a plurality of plates, thereby significantly lowering the manufacturing cost to secure the cost competitiveness.

Moreover, in this embodiment, by means of the pack case structure prepared using the side structure unit 400 and the filling member 500, compared to the prior art where the pack case structure is provided as a cell frame structure composed of an assembly of a plurality of plates, the entire size of the battery pack 1 may be reduced, thereby significantly increasing the energy density.

Figure 30:
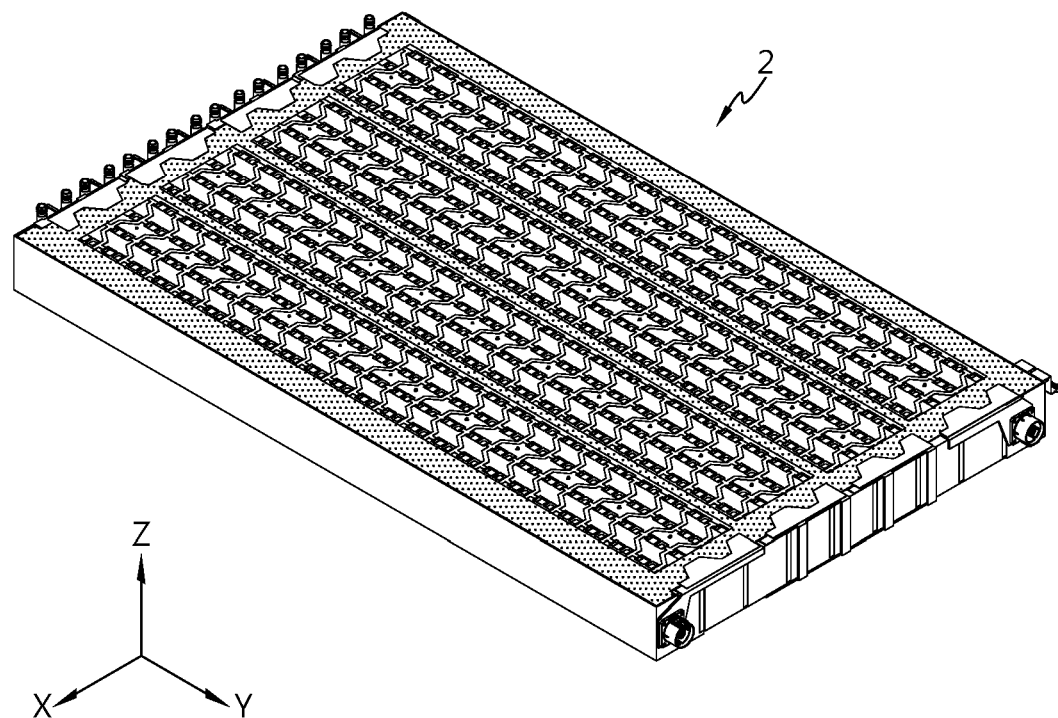
FIG. 30 is a diagram for illustrating a battery pack according to another embodiment of the present disclosure.
Figure 31:
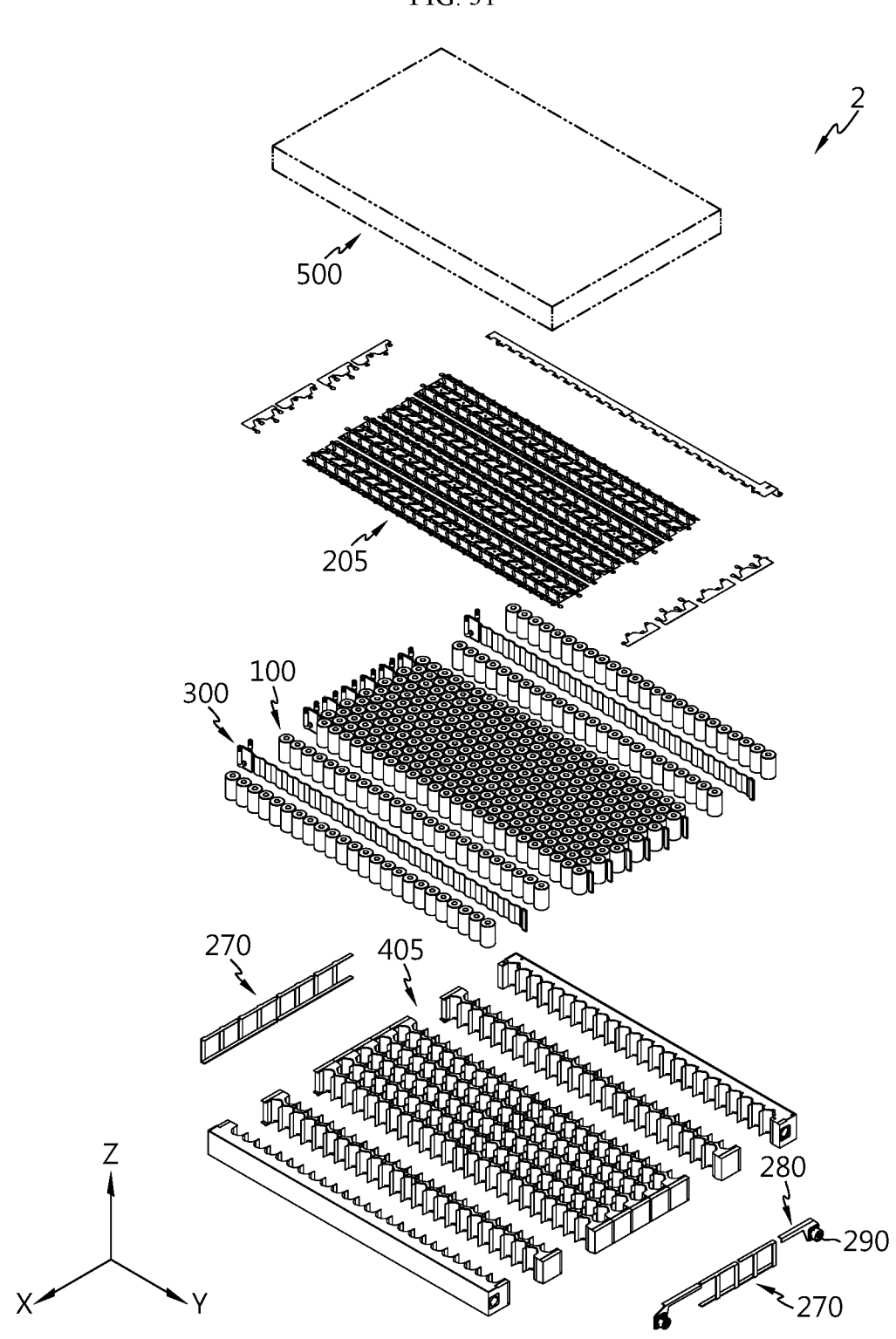
FIG. 31 is an exploded perspective view showing the battery pack of FIG. 30.

FIG. 30 is a diagram for illustrating a battery pack according to another embodiment of the present disclosure, and FIG. 31 is an exploded perspective view showing the battery pack of FIG. 30.

Since the battery pack 2 according to this embodiment is similar to the battery pack 1 of the former embodiment, features substantially identical or similar to the former embodiment will not be described in detail, and features different from the former embodiment will be described in detail.

Referring to FIGS. 30 and 31, the battery pack 2 may include a plurality of battery cells 100, a bus bar assembly 205, a cooling unit 300, a side structure unit 405, and a filling member 500.

The plurality of battery cells 100, the cooling unit 300 and the filling member 500 are substantially identical or similar to the former embodiment and thus will not be described in detail.

The bus bar assembly 205 will be described in more detail with reference to the following related drawings.

Figure 32:
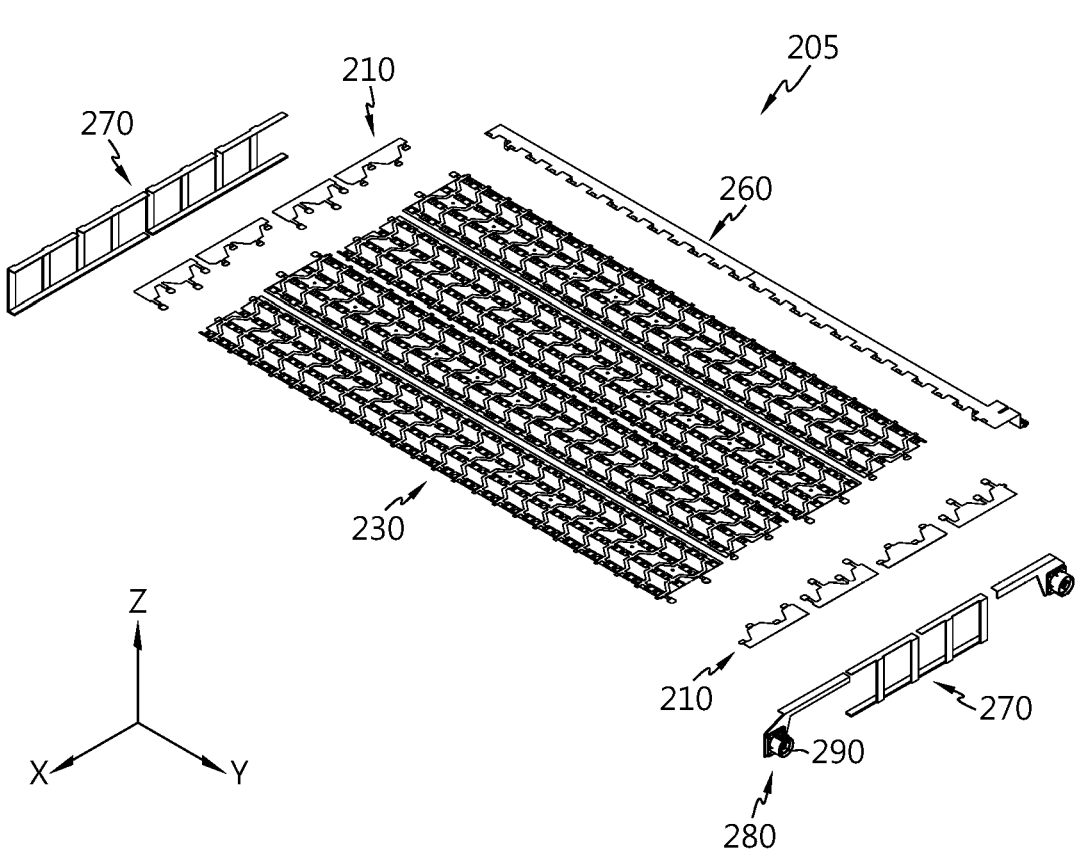
FIG. 32 is a diagram for illustrating a bus bar assembly of the battery pack of FIG. 30.
Figure 33:
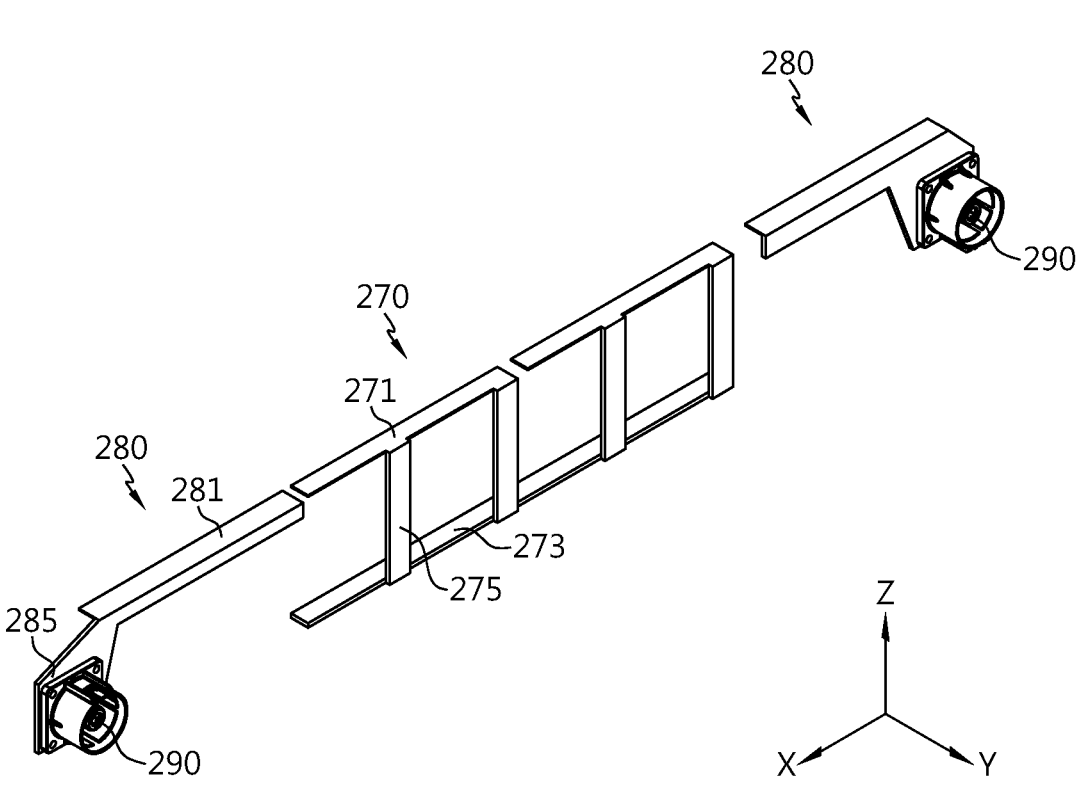
FIG. 33 is a diagram for illustrating a high-voltage bus bar unit of the bus bar assembly of FIG. 32.

FIG. 32 is a diagram for illustrating a bus bar assembly of the battery pack of FIG. 30, and FIG. 33 is a diagram for illustrating a high-voltage bus bar unit of the bus bar assembly of FIG. 32.

Referring to FIGS. 32 and 33 along with FIG. 31, the bus bar assembly 205 may include a main bus bar unit 210, a connection bus bar unit 230, an interconnection board 260, a high-voltage bus bar unit 270, 280 and a connector terminal 290.

The main bus bar unit 210, the connection bus bar unit 230 and the interconnection board 260 are substantially identical or similar to the former embodiment and thus will not be described in detail.

The high-voltage bus bar unit 270, 280 is for securing the electrical safety of the bus bar assembly 200, and may be formed to have a thickness greater than that of the main bus bar unit 210. As an example, in this embodiment, the thickness of the main bus bar unit 210 may be provided as 0.4 mm, and the thickness of the high-voltage bus bar unit 270, 280 may be provided as 4 mm, which is greater than the thickness of the main bus bar unit 210.

The high-voltage bus bar units 270, 280 may include a high-voltage line member 270 and a connector mounting member 280.

The high-voltage line member 270 is disposed at the bottom of the main bus bar 210 and may be provided with a predetermined length for stable current flow. The high-voltage line member 270 may be mounted to both ends of the main plate 410 of the side structure unit 405, explained later, along the width direction (X-axis direction) of the battery pack 2. The high-voltage line member 270 may be provided in plural according to the number or capacity of the battery cells 100 of the battery pack 2. That is, the number of the high-voltage line members 270 may vary according to the number or capacity of the battery cells 100.

Hereinafter, the high-voltage line member 270 will be described in more detail.

The high-voltage line member 270 may include a first high-voltage line portion 271, a second high-voltage line portion 273, and a connection line portion 275.

The first high-voltage line portion 271 is formed to have the predetermined length and may be placed on the main plate 410 to be disposed at the bottom of the main bus bar 210. Here, the first high-voltage line portion 271 may be formed to have a greater thickness than the main bus bar 210 in consideration of current capacity. The first high-voltage line portion 271 may be placed on a first line accommodation portion 419a of the main plate 410, explained later.

The second high-voltage line portion 273 may be spaced apart from the first high-voltage line portion 271 in the height direction (Z-axis direction) of the battery pack 2 and may be placed on the bottom of the main plate 410. The second high-voltage line portion 271 may be formed to have the same thickness as the first high-voltage line portion 271, and may form a current path together with the first high-voltage line portion 271.

The connection line portion 275 connects the first high-voltage line portion 271 and the second high-voltage line portion 273, and may be disposed at both sides of the main plate 410 in the height direction (Z-axis direction) of the main plate 410. The connection line portion 275 may be integrally formed with the first high-voltage line portion 271 and the second high-voltage line portion 273, may form the current path together with the first high-voltage line portion 271 and the second high-voltage line portion 273.

In embodiments, one of the first high-voltage line portion 271 and the second high-voltage line portion 273 may include a disconnected portion to ensure that a current follows from the first high-voltage line portion 271 to the second high-voltage line portion 273 or vice-versa through the connection line portion 275.

The connection line portion 275 may be provided in plural. The plurality of connection line portions 275 may be disposed to be spaced apart from each other by a predetermined distance in the width direction (X-axis direction) of the battery pack 2. Moreover, the connection line portion 275 may be disposed between the cooling units 300 to prevent interference with the cooling unit 300 in the width direction (X-axis direction) of the battery pack 2.

The connector mounting member 280 may be provided as a pair. The pair of connector mounting members 280 are disposed between the high-voltage line members 270 and may be mounted to a pair of end plates 450 (see FIG. 34) of the side structure unit 405, explained later.

The pair of connector mounting members 280 may include a high-voltage line portion 281 and a connector connection portion 285.

The high-voltage line portion 281 is formed to have a predetermined length, and may be placed on the end plate 450 to be disposed on the bottom of the main bus bar 210. The high-voltage line portion 281 may be placed on a connector mounting member accommodation portion 459 of the end plate 450, explained later. The upper side of the high-voltage line portion 281 may be disposed on the same line as the first high-voltage line portion 271 in the width direction (X-axis direction) of the battery pack 2.

The connector connection portion 285 may extend from the high-voltage line portion 281 and may be disposed on the side surface of the end plate 450 in the height direction (Z-axis direction). The connector terminal 290, explained later, may be mounted to the connector connection portion 285.

The connector terminal 290 is provided as a pair and may be connected to the connector mounting member 280. Specifically, the pair of connector terminals 290 may be mounted to the connector connection portion 285 of each connector mounting member 280, respectively. The pair of connector terminals 290 may be mounted on the pair of end plates 450, explained later, in a state of being connected to the connector mounting member 280.

In this embodiment, it is possible to enhance the electrical safety of the battery pack 2 and further increase the efficiency during charging and discharging by guiding a stable current flow in the battery pack 2 through the high-voltage bus bar units 270, 280.

Figure 34:
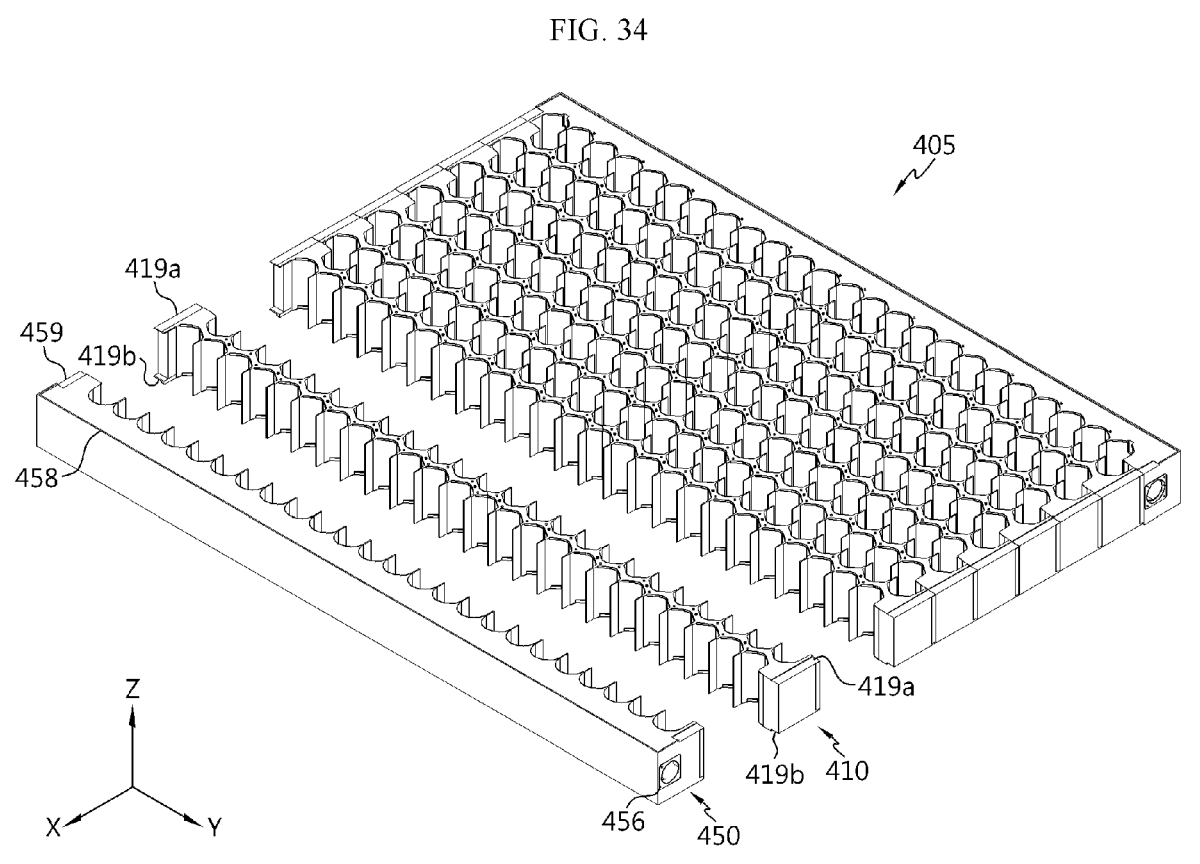
Figure 35:
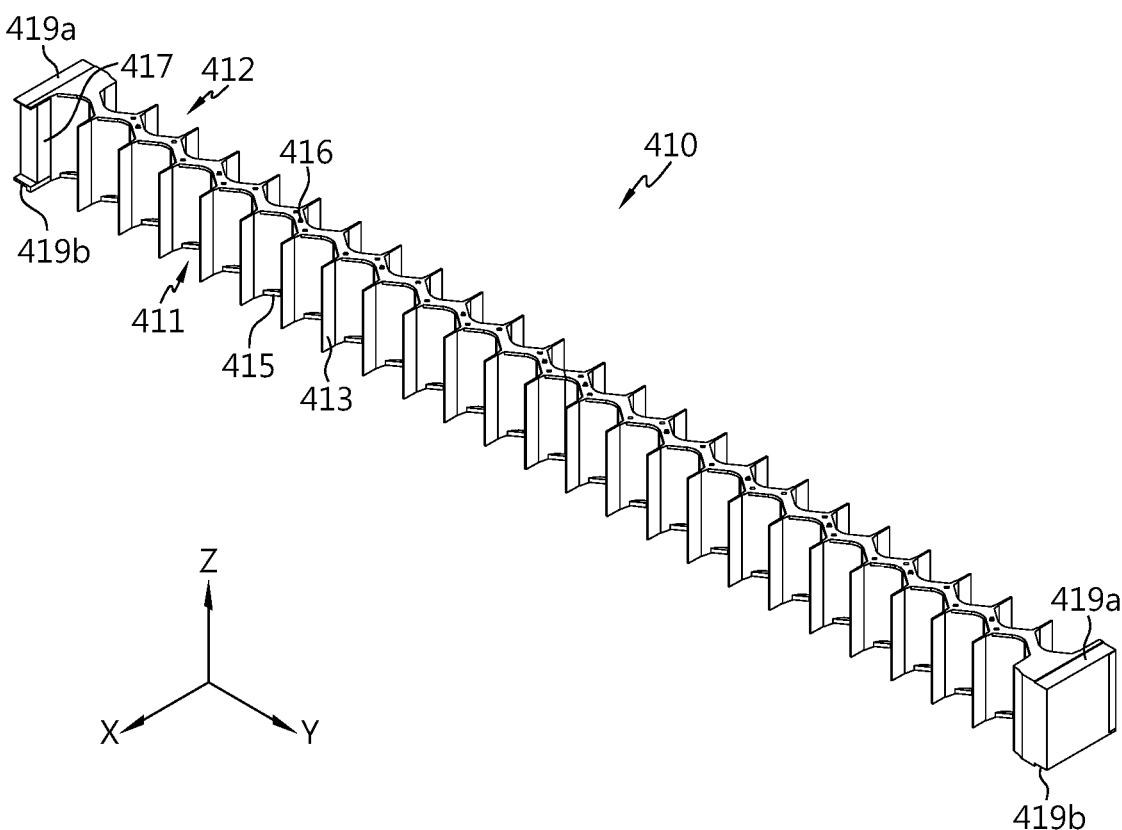
FIG. 35 is a diagram for illustrating a main plate of the side structure unit of FIG. 33.
Figure 36:
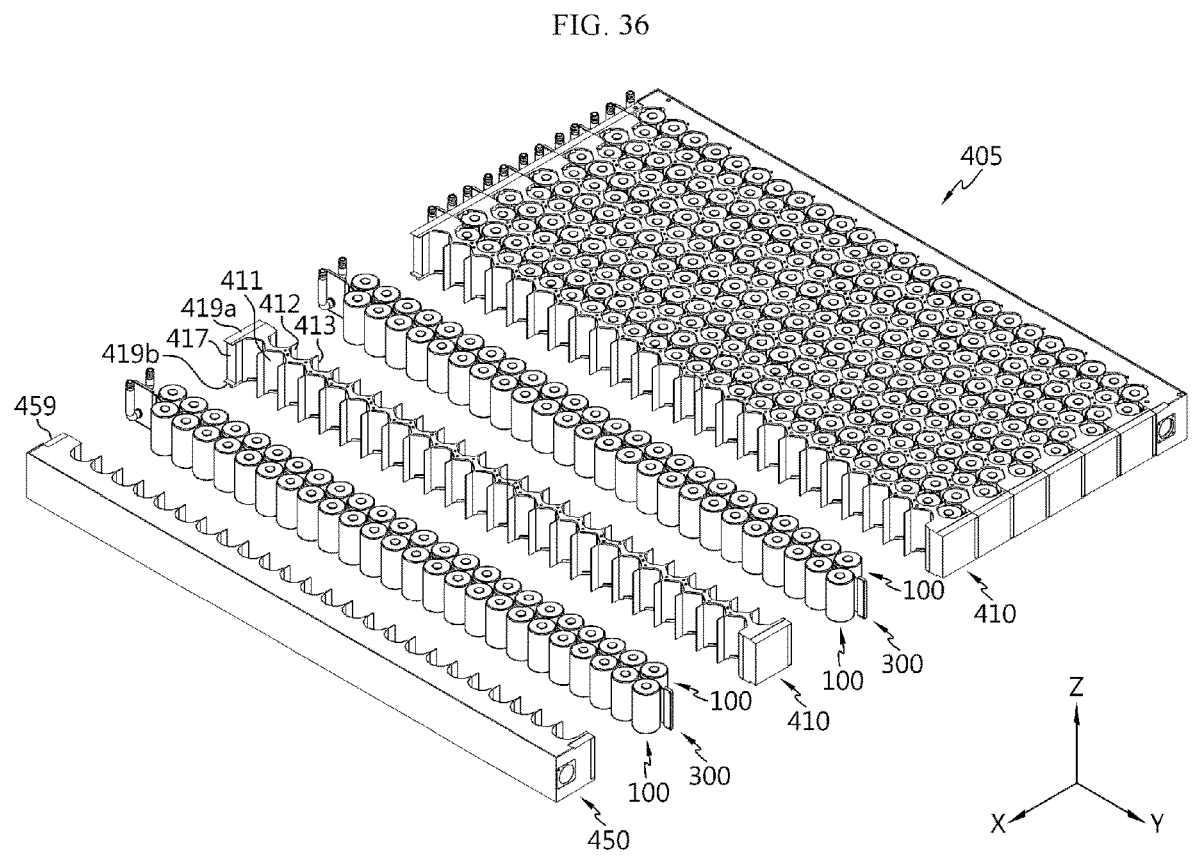
Figure 37:
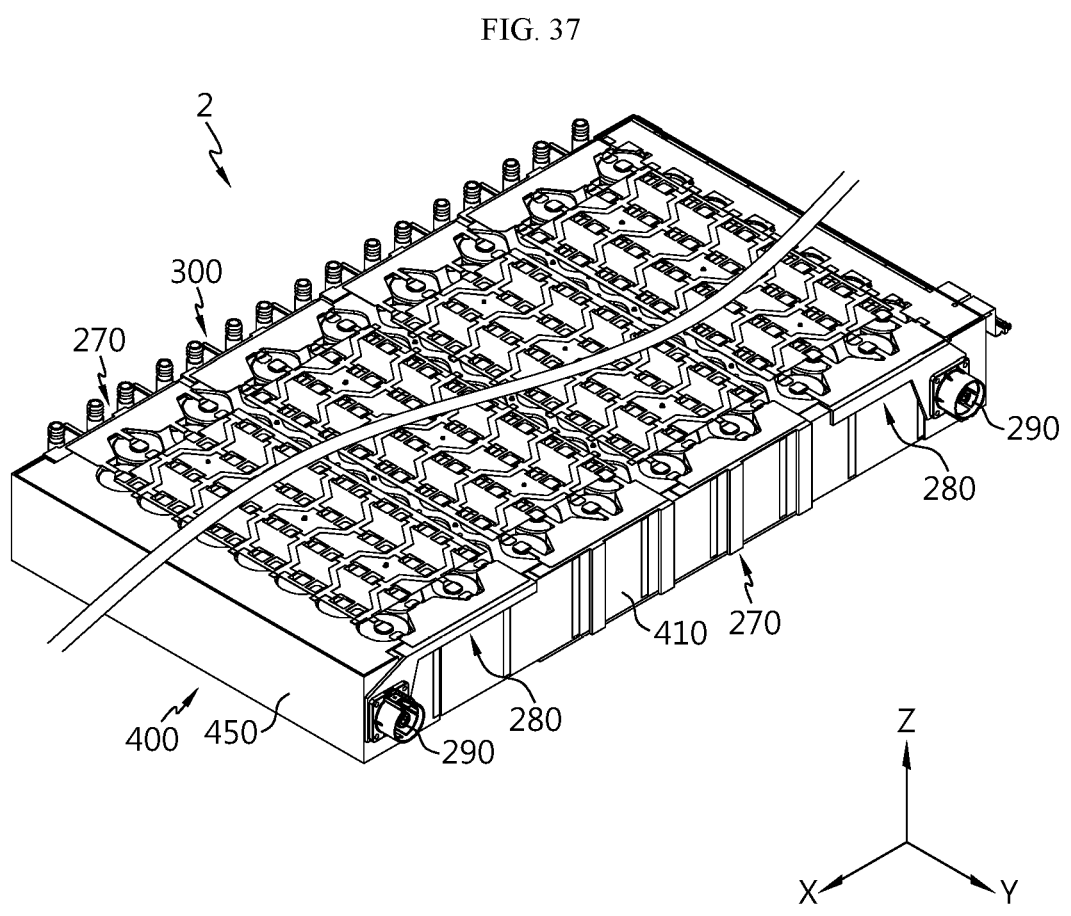
FIGS. 37 to 40 are diagrams for illustrating a mounting structure of the side structure unit of FIG. 34 and a high-voltage bus bar unit.
Figure 38:
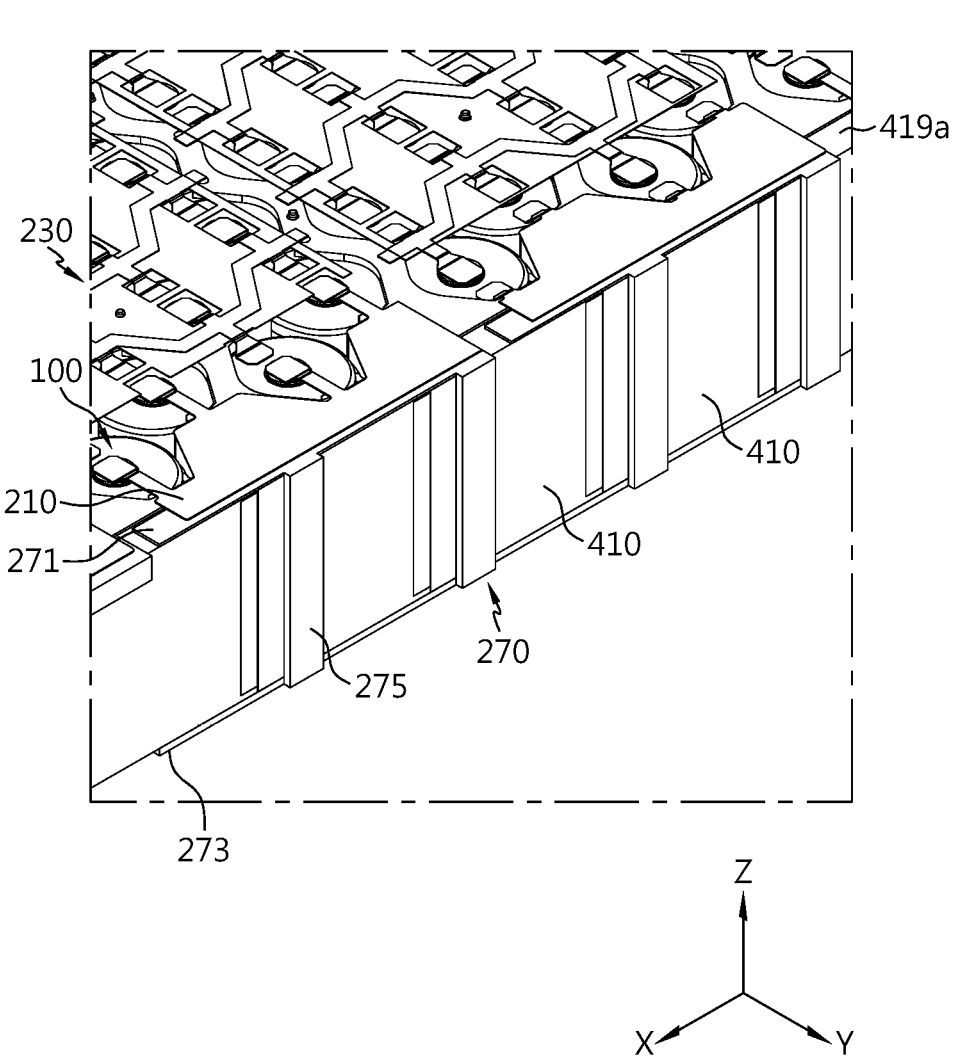
Figure 39:
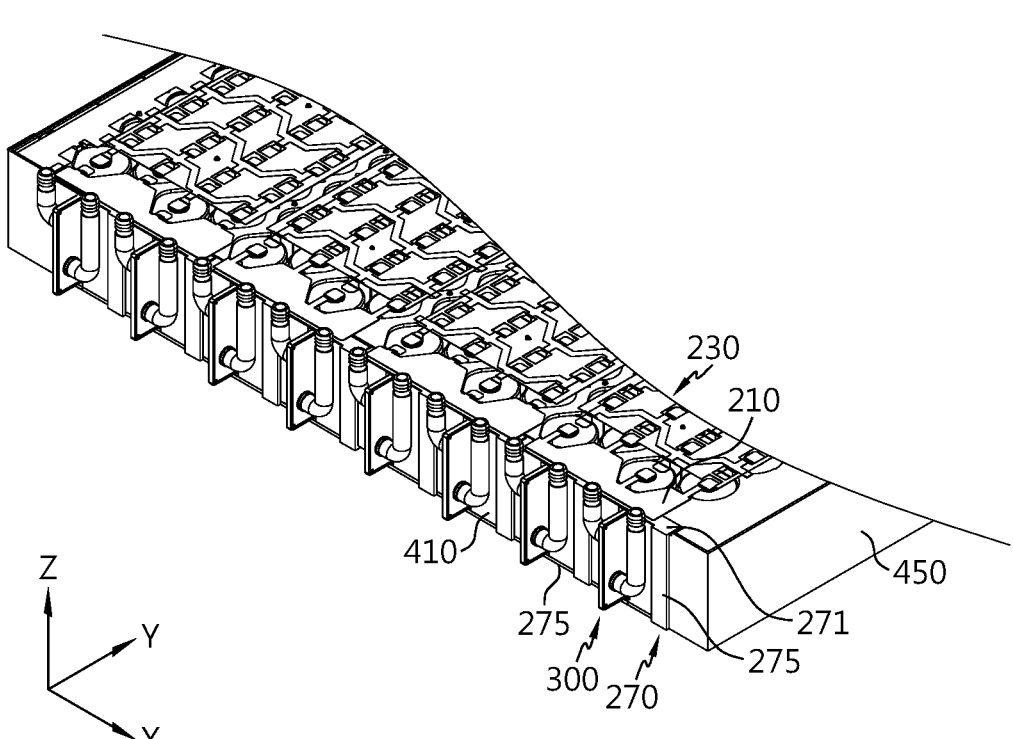
Figure 40:
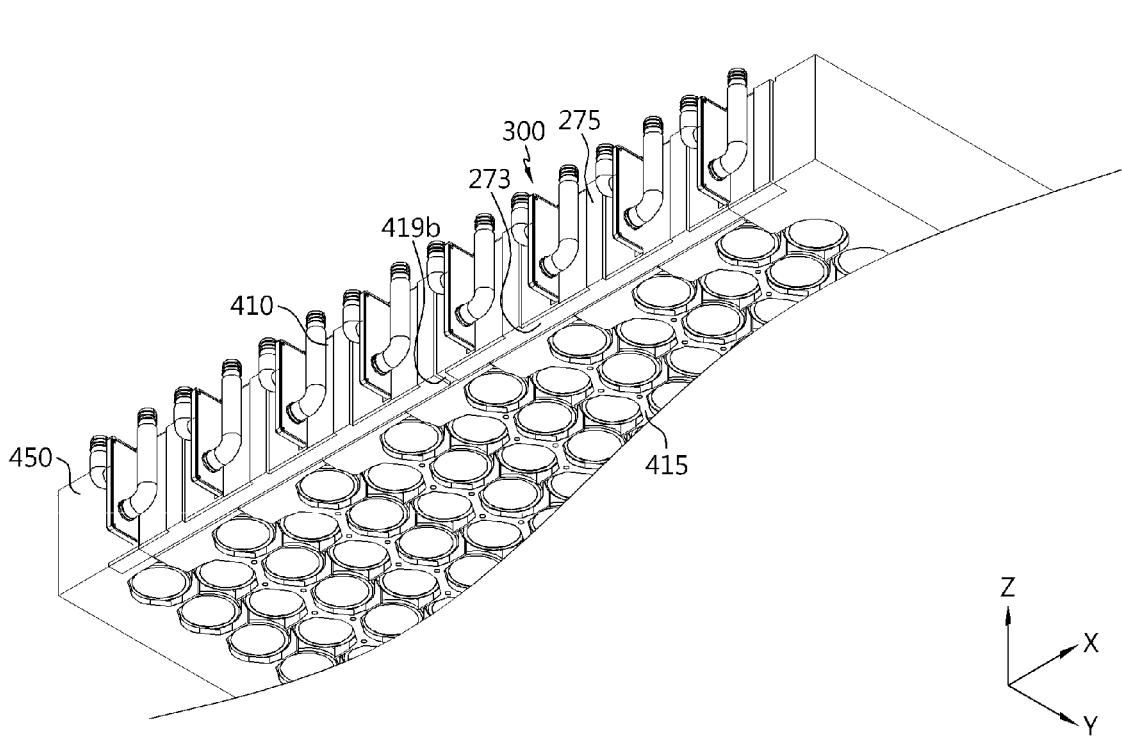

FIG. 34 is a diagram for illustrating a side structure unit of the battery pack of FIG. 30, FIG. 35 is a diagram for illustrating a main plate of the side structure unit of FIG. 33, FIG. 36 is a diagram for illustrating an arrangement relationship of the battery cells and the cooling units through the side structure unit of FIG. 34, and FIGS. 37 to 40 are diagrams for illustrating a mounting structure of the side structure unit of FIG. 34 and a high-voltage bus bar unit.

Referring to FIGS. 34 to 40 along with FIG. 31, the side structure unit 405 may include a plurality of main plates 410 and a pair of end plates 450.

Each of the plurality of main plates 410 may include a first cell accommodation portion 411, a second cell accommodation portion 412, an inter-wing 413, a bottom rib 415, a bus bar guide protrusion 416, a cooling unit insert groove 417 and a high-voltage line member accommodation portion 419a, 419b.

The first cell accommodation portion 411, the second cell accommodation portion 412, the inter-wing 413, the bottom rib 415, the bus bar guide protrusion 416 and the cooling unit insert groove 417 are substantially identical or similar to the former embodiment and thus will not be described in detail.

The high-voltage line member accommodation portion 419a, 419b may be formed at both ends of the main plate 410 in the longitudinal direction (Y-axis direction). The first high-voltage line portion 271 and the second high-voltage line portion 273 of the high-voltage line member 270 may be placed on the high-voltage line member accommodation portion 419a, 419b.

The high-voltage line member accommodation portions 419a, 419b may include a first line accommodation portion 419a and a second line accommodation portion 419b.

The first line accommodation portion 419a may accommodate the first high-voltage line portion 271 and may be formed at the edge of the upper end (+Z-axis direction) of both ends of the main plate 410 in the longitudinal direction (Y-axis direction). The first line accommodation portion 419a may be stepped to a predetermined depth to prevent the battery pack 2 from protruding upward toward the upper side (+Z-axis direction) when the first high-voltage line portion 271 is accommodated. Here, the predetermined depth may be at least equal to the thickness of the first high-voltage line portion 271.

The second line accommodation portion 419b may accommodate the second high-voltage line portion 273 and may be formed at the edge of the lower end (-Z-axis direction) of both ends of the main plate 410 in the longitudinal direction (Y-axis direction). The second line accommodation portion 419b may be stepped to a predetermined depth to prevent the battery pack 2 from protruding downward (-Z-axis direction) when the second high-voltage line portion 273 is accommodated. Here, the predetermined depth may be at least equal to the thickness of the second high-voltage line portion 273.

The pair of end plates 450 may include a terminal hole 456, an end guide protrusion 458, and a connector mounting member accommodation portion 459.

The terminal hole 456 and the end guide protrusion 458 are similar to the former embodiment and thus will not be described in detail.

The connector mounting member accommodation portion 459 may accommodate the high-voltage line portion 281 and may be formed at the edge of the upper end (+Z-axis direction) of both ends of the end plate 450 in the longitudinal direction (Y-axis direction). The connector mounting member accommodation portion 459 may be stepped to a predetermined depth to prevent the battery pack 2 from protruding toward the upper side (+Z-axis direction) when the high-voltage line portion 281 is accommodated. Here, the predetermined depth may be at least equal to the thickness of the high-voltage line portion 281.

Moreover, the connector mounting member accommodation portion 459 may accommodate a part of the first high-voltage line portion 271 that is placed on the first line accommodation portion 419a of the main plate 410 adjacent to the end plate 450 at a side opposite to the connector terminal 290. To this end, the connector mounting member accommodation portion 459 may be disposed on the same line as the first line accommodation portion 419a in the width direction (X-axis direction) of the battery pack 2.

Figure 41:
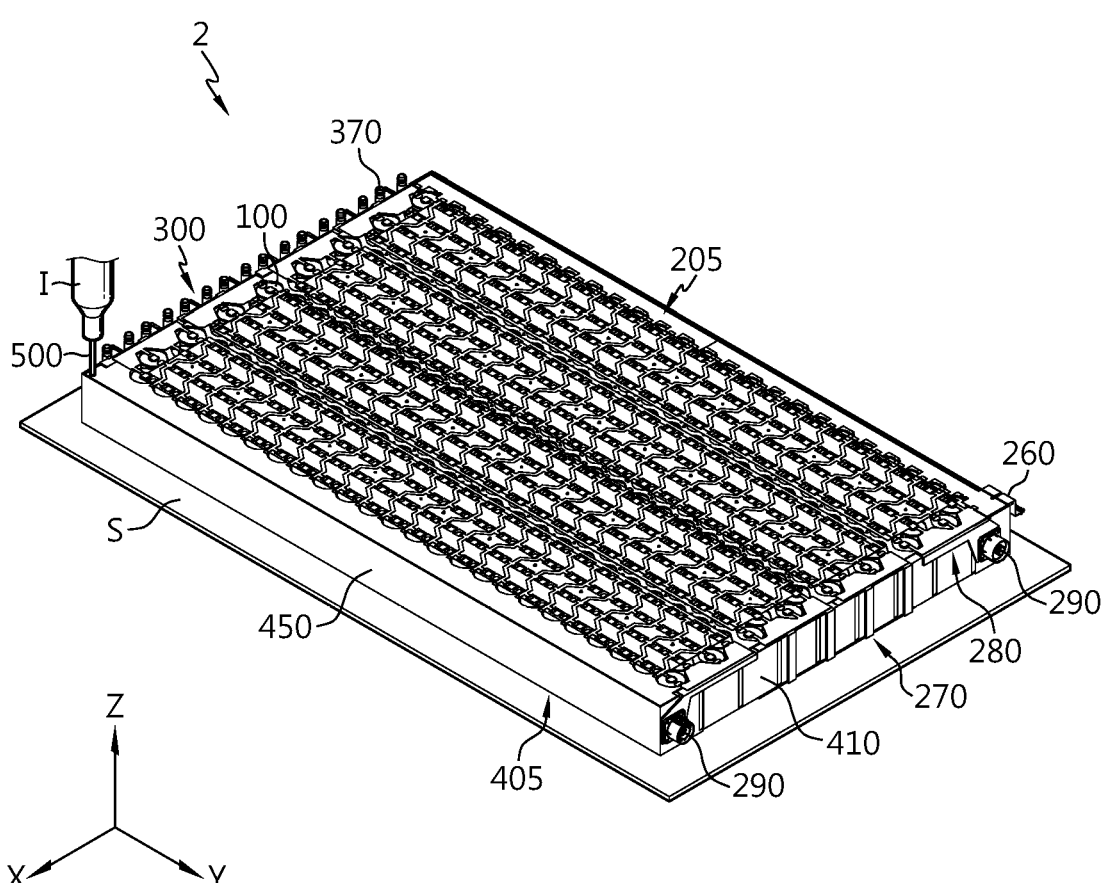
FIGS. 41 and 42 are diagrams for illustrating the injection of a filling member into the battery pack of FIG. 30.
Figure 42:
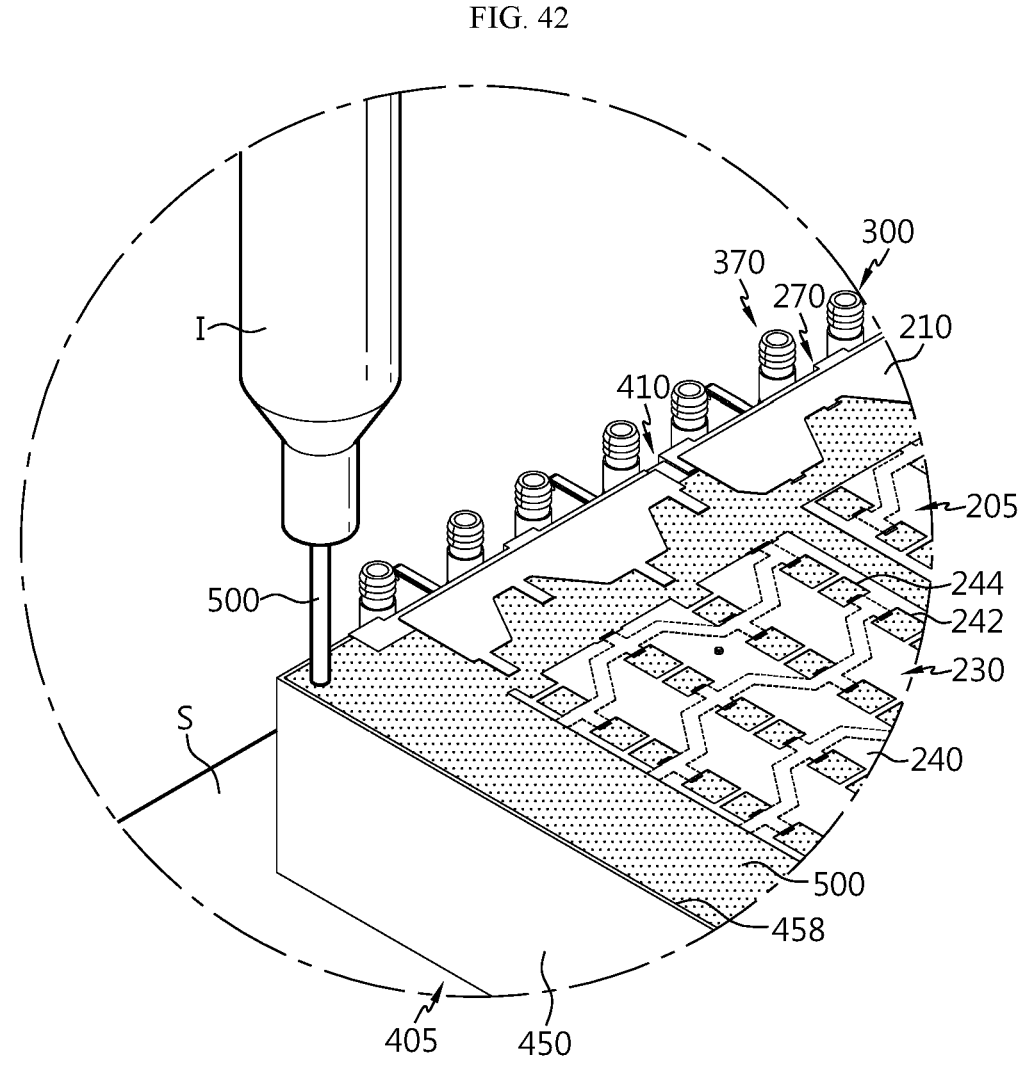

FIGS. 41 and 42 are diagrams for illustrating the injection of a filling member into the battery pack of FIG. 30.

Referring to FIGS. 41 and 42, the manufacturer or the like may form the pack case structure of the upper and lower portions of the battery pack 2 (see FIG. 30) by injecting and applying the filling member 500 provided with the silicon resin by mans of the resin injection device I and the injection guider S.

In this embodiment, the filling member 500 may be filled at the upper side (+Z-axis direction) of the battery pack 2 to cover a part of the main bus bar 210 and the connection bus bar 230 of the bus bar assembly 200.

Here, the filling member 500 may be filled to cover only the electrode connection portion of the battery cells 100 electrically connected to the main bus bar 210 and the connection bus bar 230, at the upper side (+Z-axis direction) of the main bus bar 210 and the connection bus bar 230 placed on the upper side (+Z-axis direction) of the side structure unit 400. That is, the filling member 500 may be filled in the main bus bar 210 and the connection bus bar 230 to a height that can cover only the electrode connection portion bent downward (−Z-axis direction) for the electrical connection.

Specifically, the filling member 500 may be filled to cover only the positive electrode bus bar hole 242 and the negative electrode bus bar hole 244 of the connection bus bar 230. More specifically, the filling member 500 may be filled until it is flush with the horizontal portion of the main bus bar 210 and the horizontal portion of the bus bar cover 240. Accordingly, after the filling member 500 is completely filled, on the upper surface (+Z-axis direction) of the battery pack 2, the horizontal portion of the main bus bar 210 and the bus bar cover 240 of the connection bus bar 230 may be partially exposed.

As described above, in this embodiment, since the filling member 500 covers only the electrode connection portion of the battery cells 100 that are electrically connected to the main bus bar 210 and the connection bus bar 230 of the bus bar assembly 200 at the upper side (+Z-axis direction) of the battery pack 1, it is possible to optimize the application amount of the filling member 500 made of the silicon resin while effectively ensuring the safety of the electrical connection.

Figure 43:
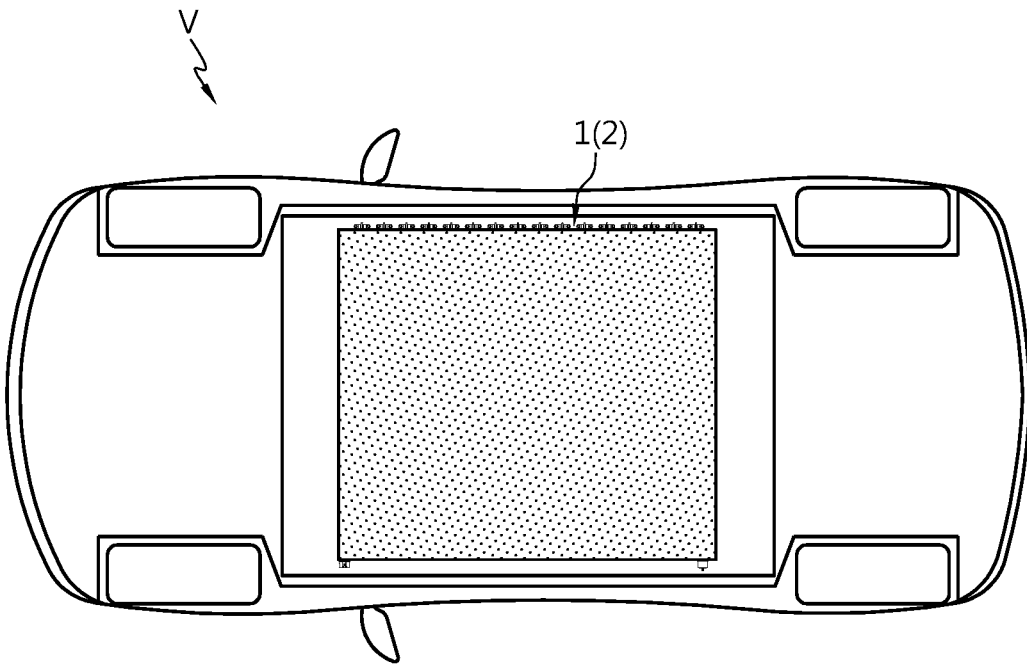
FIG. 43 is a diagram for illustrating a vehicle according to an embodiment of the present disclosure.

FIG. 43 is a diagram for illustrating a vehicle according to an embodiment of the present disclosure.

Referring to FIG. 43, a vehicle V may be provided as an electric vehicle or a hybrid electric vehicle, and may include at least one battery pack 1, 2 of the former embodiment as an energy source.

In this embodiment, since the battery pack 1, 2 described above is provided in a compact structure having a high energy density, when the battery pack 1 is mounted to the vehicle V, it is easy to implement a modular structure of a plurality of battery packs 1, 2, and a relatively high degree of mounting freedom may be secured even for various internal space shapes of the vehicle V. That is, in this embodiment, the at least one battery pack 1, 2 may be provided as a battery pack case structure that is easy to implement in a modular structure and has a high degree of mounting freedom.

In addition, a longitudinal direction of the at least one battery pack 1, 2 may be arranged approximately perpendicular to a length direction of the vehicle V so that the side structure units 400 provide protection to the plurality of battery cells 100 during a front or rear collision of the vehicle V.

According to various embodiments as above, it is possible to provide a battery pack 1, 2 capable of securing rigidity while increasing energy density, and a vehicle V including the battery pack 1.

In addition, according to various embodiments as above, it is possible to provide a battery pack 1, 2 capable of improving cost competitiveness and manufacturing efficiency, and a vehicle V including the battery pack 1.

Moreover, according to various embodiments as above, it is possible to provide a battery pack 1, 2 capable of improving cooling performance, and a vehicle V including the battery pack 1, 2.

The present disclosure has been described in detail. However, it should be understood that the detailed description and specific examples, while indicating example embodiments of the disclosure, are given by way of illustration only, since various changes and modifications within the scope of the disclosure will become apparent to those skilled in the art from this detailed description.

What is claimed is:

1. A battery pack, comprising:
a plurality of battery cells;
a bus bar assembly having a first side and a second side, the second side of the bus bar assembly provided to a first side of the plurality of battery cells and electrically connected to the plurality of battery cells;
a cooling unit disposed at the second side of the bus bar assembly and arranged between the plurality of battery cells along a longitudinal direction of the battery pack; and
a side structure unit configured to accommodate the cooling unit and the plurality of battery cells and configured to form a first section of an outer surface of the battery pack,
wherein the bus bar assembly is disposed at only one side of the plurality of battery cells, and
wherein the side structure unit includes a bottom rib formed to protrude in a lower direction further than a second side of the plurality of battery cells, and the bottom rib exposes a venting portion of the plurality of battery cells without interfering with the venting portion.

2. The battery pack according to claim 1,
wherein the side structure unit is configured to support the plurality of battery cells, secure rigidity of the plurality of battery cells and form a side appearance of the battery pack.

3. The battery pack according to claim 1,
wherein the side structure unit is made of a plastic resin material.

4. The battery pack according to claim 1,
wherein the bottom rib is configured to cover one side of a periphery of the second side of the plurality of battery cells.

5. The battery pack according to claim 1, further comprising:
a filling member configured to cover a first side and a second side of the battery pack to form a pack case structure of the battery pack together with the side structure unit.

6. The battery pack according to claim 5,
wherein the filling member forms a second section of the outer surface of the battery pack together with the first section of the outer surface of the battery pack formed by the side structure unit.

7. The battery pack according to claim 5,
wherein the filling member is made of a potting resin.

8. The battery pack according to claim 7,
wherein the filling member is made of a silicon resin.

9. The battery pack according to claim 5,
wherein the filling member is continuously filled between the bus bar assembly and the plurality of battery cells without an isolated space or a separated space between the bus bar assembly and the plurality of battery cells in a longitudinal direction of the plurality of battery cells.

10. The battery pack according to claim 5, wherein the filling member is filled in a portion other than an outer side of a side surface of the side structure unit.

11. The battery pack according to claim 5, wherein the side structure unit further includes an upper portion that contacts the bus bar assembly and a bottom portion at the second side of the plurality of battery cells, and wherein a portion of the filling member is located at the bottom portion the side structure unit, and covers the second side of the plurality of battery cells.

12. A battery pack case structure, comprising at least one battery pack according to claim 1.

13. A vehicle comprising: the battery pack case structure according to claim 12, wherein a longitudinal direction of the at least one battery pack is arranged approximately perpendicular to a length direction of the vehicle so that the side structure unit provides protection to the plurality of battery cells during a front or rear collision of the vehicle.

14. The battery pack according to claim 1, wherein the plurality of battery cells are in compression in a height direction of a cylindrical can of each of the plurality of battery cells.

15. A battery pack, comprising: a plurality of battery cells arranged in the battery pack; a side structure unit forming a support structure that arranges the plurality of battery cells in the battery pack, the side structure unit including a first main plate and a second main plate that support the plurality of battery cells from opposite sides; a cooling unit disposed between the plurality of battery cells at a halfway point between the first main plate and the second main plate; and a bus bar assembly provided to one side of the plurality of battery cells and electrically connected to the plurality of battery cells, wherein the bus bar assembly is disposed at only one side of the plurality of battery cells, and wherein each of the first main plate and the second main plate includes a bottom rib formed to protrude in a lower than another side of the plurality of battery cells, and the bottom rib exposes a venting portion of the plurality of battery cells without interfering with the venting portion.

16. The battery pack according to claim 15, wherein each of the first main plate and the second main plate includes a cell accommodation portion that accommodates the plurality of battery cells respectively, and wherein a gap is located between the cooling unit and each of the first main plate and the second main plate.

17. The battery pack according to claim 15, wherein the bus bar assembly is coupled to first main plate or the second main plate.

18. The battery pack according to claim 15, wherein the side structure unit fixes the bus bar assembly and accommodates the plurality of battery cells such that the venting portion of the plurality of battery cells is positioned on a second side of the bus bar assembly.

19. The battery pack according to claim 15, wherein a height of the side structure unit is greater than a height of the plurality of battery cells.

20. The battery pack according to claim 1, wherein the side structure unit fixes the bus bar assembly and accommodates the plurality of battery cells such that the venting portion of the plurality of battery cells is positioned on the second side of the bus bar assembly.

21. The battery pack according to claim 1, wherein a height of the side structure unit is greater than a height of the plurality of battery cells.

22. The battery pack according to claim 1, wherein a portion of the bottom rib that overlaps and supports a periphery of the second side of the plurality of battery cells extends between an outer surface of a cylindrical can of the plurality of battery cells and the venting portion of the plurality of battery cells, respectively.

23. The battery pack according to claim 15, wherein a portion of the bottom rib that overlaps and supports a periphery of the another side of the plurality of battery cells extends between an outer surface of a cylindrical can of the plurality of battery cells and the venting portion of the plurality of battery cells, respectively.

* * * * *